(12) United States Patent
Goi

(10) Patent No.: US 10,718,899 B2
(45) Date of Patent: Jul. 21, 2020

(54) OPTICAL DEVICE, WAVELENGTH DIVISION MULTIPLEXING TRANSMITTER, WAVELENGTH DIVISION MULTIPLEXING RECEIVER, AND WAVELENGTH DIVISION MULTIPLEXING TRANSMISSION AND RECEIVING SYSTEM

(71) Applicant: FUJIKURA LTD., Tokyo (JP)

(72) Inventor: Kazuhiro Goi, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/370,421

(22) Filed: Mar. 29, 2019

(65) Prior Publication Data

US 2019/0302363 A1 Oct. 3, 2019

(30) Foreign Application Priority Data

Mar. 30, 2018 (JP) ................. 2018-069038

(51) Int. Cl.
*G02B 6/12* (2006.01)
*G02B 6/122* (2006.01)
*H04J 14/02* (2006.01)

(52) U.S. Cl.
CPC ......... *G02B 6/12007* (2013.01); *G02B 6/122* (2013.01); *H04J 14/0297* (2013.01)

(58) Field of Classification Search
CPC ................................................. G02B 6/12007
See application file for complete search history.

(56) References Cited

U.S. PATENT DOCUMENTS 6,324,318 B1 11/2001 Suzuki
6,915,075 B1 7/2005 Oberg et al.
(Continued)

FOREIGN PATENT DOCUMENTS

JP 2000-183817 A 6/2000
JP 2002-505546 A 2/2002
(Continued)

OTHER PUBLICATIONS

Jinguji, K., "Synthesis of Coherent Two-Port Optical Delay-Line Circuit with Ring Waveguides," Journal of Lightwave Technology, vol. 14, No. 8, pp. 1882-1898, 1996. (17 pages).
(Continued)

*Primary Examiner* — Sung H Pak
(74) *Attorney, Agent, or Firm* — Osha Liang LLP

(57) ABSTRACT

An optical device includes: a first port group P including n ports $P_i$; a second port Q; and a wavelength multiplexer/demultiplexer disposed between the first port group P and the second port Q. In a case where light beams $L_i$ of predetermined different n wavelengths $\lambda_i$ corresponding to the respective ports $P_i$ are inputted to the wavelength multiplexer/demultiplexer, the wavelength multiplexer/demultiplexer combines the light beams $L_i$ into light L and outputs the light L to the second port Q. In a case where light L' is inputted to the second port Q, the wavelength multiplexer/demultiplexer separates the light L' into light beams $L'_i$ of the wavelengths $\lambda_i$ and outputs the light beams $L'_i$ to the corresponding ports $P_i$.

13 Claims, 17 Drawing Sheets

(56) References Cited

U.S. PATENT DOCUMENTS

| | | | | |
|---|---|---|---|---|
| 7,003,189 B1* | 2/2006 | Fang | ................... | H04J 14/0227 |
| | | | | 385/16 |
| 2005/0226620 A1* | 10/2005 | Feuer | .................. | H04J 14/0212 |
| | | | | 398/83 |
| 2014/0126903 A1* | 5/2014 | Kaneoka | ............. | H04J 14/0205 |
| | | | | 398/48 |

FOREIGN PATENT DOCUMENTS

| | | |
|---|---|---|
| JP | 2002-169131 A | 6/2002 |
| JP | 2013126193 A | 6/2013 |

OTHER PUBLICATIONS

Jinguji, K. et al., "Synthesis of Coherent Two-Port Lattice-Form Optical Delay-Line Circuit," Journal of Lightwave Technology, vol. 13, No. 1, p. 73-82, 1995. (10 pages).

Orcutt, J. S. et al.; "Monolithic Silicon Photonics at 25 Gb/s," in Optical Fiber Communication Conference, col. 1, p. Th4H.1., 2016 (3 pages).

* cited by examiner

E-E'

OPTICAL DEVICE, WAVELENGTH DIVISION MULTIPLEXING TRANSMITTER, WAVELENGTH DIVISION MULTIPLEXING RECEIVER, AND WAVELENGTH DIVISION MULTIPLEXING TRANSMISSION AND RECEIVING SYSTEM

CROSS-REFERENCE TO RELATED APPLICATIONS

The present application claims priority under 35 U.S.C. § 119 to Japanese Patent Application No. 2018-069038, filed Mar. 30, 2018. The contents of this application are incorporated herein by reference in their entirety.

BACKGROUND

The present invention relates to an optical device, a wavelength division multiplexing transmitter, a wavelength division multiplexing receiver, and a wavelength division multiplexing transmission and receiving system.

In recent years, optical communications employing a wavelength multiplexing communication method have begun to come into widespread use not only as long-distance communications but also as short-distance communications. Examples of such short-distance communications include communications in a data center.

A wavelength division multiplexing transmission and receiving system used in optical communications employing a wavelength multiplexing communication method includes a substrate-type optical waveguide device which functions as a transmitter or a receiver. The substrate-type optical waveguide device, which is known as a planar lightwave circuit (PLC), includes: a substrate having waveguides provided thereon; and a plurality of optical components which are integrated in the vicinity of a surface of the substrate. Such a substrate-type optical waveguide device can be read as an optical device recited in Claims of the present application.

Non-patent Literature 1 discloses a wavelength division multiplex transmitter and a wavelength division multiplex receiver both of which include a plurality of optical components integrated on a single substrate and use different wavelengths of light beams as carrier waves. In many cases, the transmitter includes laser diodes provided on the substrate as individual optical sources for emitting different wavelengths of light beams as carrier waves. With a plurality of laser diodes of different emission wavelengths, the transmitter can output laser different wavelengths of light beams as carrier waves.

CITATION LIST

Patent Literature

[Patent Literature 1]
Japanese Patent Application Publication, Tokukai, No. 2002-169131 (publication date: Jun. 14, 2002)

Non-Patent Literature

[Non-Patent Literature 1]
J. S. Orcutt, et al., "Monolithic Silicon Photonics at Gb/s," in Optical Fiber Communication Conference, 2016, Col. 1, P. Th4H.1.

Unfortunately, there is a case where the laser diodes suddenly become unable to emit laser light beams. In a case where any of a plurality of laser diodes provided in a transmitter employing a wavelength multiplexing communication method has become unable to emit a laser light beam, it is considered to replace that transmitter with a new transmitter. Unfortunately, the replacement of the transmitter involves loss of time due to a replacement work and monetary loss caused by preparation of a new transmitter.

In order to reduce such losses, FIG. 1 of Patent Literature 1 discloses a Mach-Zehnder modulator (an aspect of a substrate-type optical waveguide device) which is designed so as to secure redundancy in case of an event in which any of laser diodes become unable to emit a laser light beam. Specifically, the Mach-Zehnder modulator includes two laser diodes and an electrode provided along an optical waveguide. The Mach-Zehnder modulator, by switching between voltages to be applied to the electrode, emits modulated light beams having the same pattern of waveform no matter which of these two laser diodes is driven. That is, in a case where one of the laser diodes serves as an ordinary optical source for emitting an ordinary laser light beam, another one of the laser diodes functions as a spare optical source for emitting a spare laser light beam. Thus, this Mach-Zehnder modulator secures redundancy in case of an event in which the laser diode serving as an ordinary optical source becomes unable to emit a laser light beam.

However, in a case where the technique disclosed in Patent Literature 1 is used in the transmitter disclosed in Non-patent Literature 1, the transmitter which uses different wavelengths of light beams (n light beams) as carrier waves is required to include n ordinary optical sources and n spare optical sources. That is, this transmitter is required to include 2n laser diodes. Such a configuration requires so many laser diodes, even for redundancy. Thus, this configuration is impractical.

SUMMARY

One or more embodiments of an optical device including a n:1 wavelength multiplexer/demultiplexer, with use of at least one spare light beam, secure redundancy in case of the occurrence of an event in which any of the light beams $L_i$ having predetermined wavelengths $\lambda_i$ (i=1, 2, ..., n) has not been inputted to a corresponding one or more of the ports.

An optical device in accordance with one or more embodiments of the present invention is an optical device including:

a first port group P including n ports $P_i$ (i=1, 2, ... ; n);
a second port Q; and
a wavelength multiplexer/demultiplexer being provided between the first port group P and the second port Q,
the wavelength multiplexer/demultiplexer, (1) in a case where light beams $L_i$ of predetermined different n wavelengths $\lambda_i$ (i=1, 2, ..., n) corresponding to the respective ports $P_i$ have been inputted to the wavelength multiplexer/demultiplexer, combining the light beams $L_i$ into light L and outputting the light L to the second port Q, and, (2) in a case where light L' has been inputted to the second port Q, separating the light L' into light beams $L'_i$ of the wavelengths $\lambda_i$ and outputting the light beams $L'_i$ to the corresponding ports $P_i$,
wherein one port is selected as a selected port $P_S$ from among the ports $P_i$, and
in a case where a light beam $L_{SP}$ of a wavelength $\lambda_{SP}$ different from the wavelengths $\lambda_i$ has been inputted to the selected port $P_S$, the light beam $L_{SP}$ is outputted to the second port Q, and, in a case where a light beam $L'_{SP}$ of the wavelength $\lambda_{SP}$ has been inputted to the second port Q, the light beam $L'_{SP}$ is outputted to the selected port $P_S$.

Further, a wavelength division multiplexing transmitter in accordance with one or more embodiments of the present invention includes:

an optical device in accordance with one or more embodiments of the present invention;

modulators $M_i$ having respective input ports $PI_i$ (i=1, 2, ..., n) and respective output ports $PO_i$, wherein the output ports $PO_i$ are connected to corresponding ports $P_i$;

optical sources $OS_i$, connected to the corresponding input ports $PI_i$, being configured to output respective light beams $L_i$;

a spare optical source $OS_{SP}$ being configured to output a light beam $L_{SP}$; and a spare optical source switch, provided between the spare optical source $OS_{SP}$ and the input ports $PI_i$, being configured to select one input port as a selected input port from among the input ports $PI_i$ under control from an external member and input the light beam $L_{SP}$ to the selected input port.

Still further, a wavelength division multiplexing receiver in accordance with one or more embodiments of the present invention includes:

an optical device in accordance with one or more embodiments of the present invention; and photodetectors $D_i$ having respective light receiving elements $D_{OPi}$ (i=1, 2, ..., n) coupled to corresponding ports $P_i$.

Yet further, a wavelength division multiplexing transmission and receiving system in accordance with one or more embodiments of the present invention includes:

a wavelength division multiplexing transmitter in accordance with one or more embodiments of the present invention;

a wavelength division multiplexing receiver in accordance with one or more embodiments of the present invention; and an optical fiber connecting between a second port Q of the wavelength division multiplexing transmitter and a second port Q of the wavelength division multiplexing receiver.

An optical device in accordance with one or more embodiments of the present invention is an optical device including an n:1 wavelength multiplexer/demultiplexer, and uses at least one spare light beam. This makes it possible to secure redundancy in case of the occurrence of an event in which any of the light beams $L_i$ having predetermined wavelengths $\lambda_i$ (i=1, 2, ..., n) has not been inputted to a corresponding one or more of the ports. Further, the wavelength division multiplexing transmitter, wavelength division multiplexing receiver, and wavelength division multiplexing transmission and receiving system in accordance with one or more embodiments of the present invention produce the same effect as the effect produced by an optical device in accordance with one or more embodiments of the present invention.

DETAILED DESCRIPTION

Figure 1:
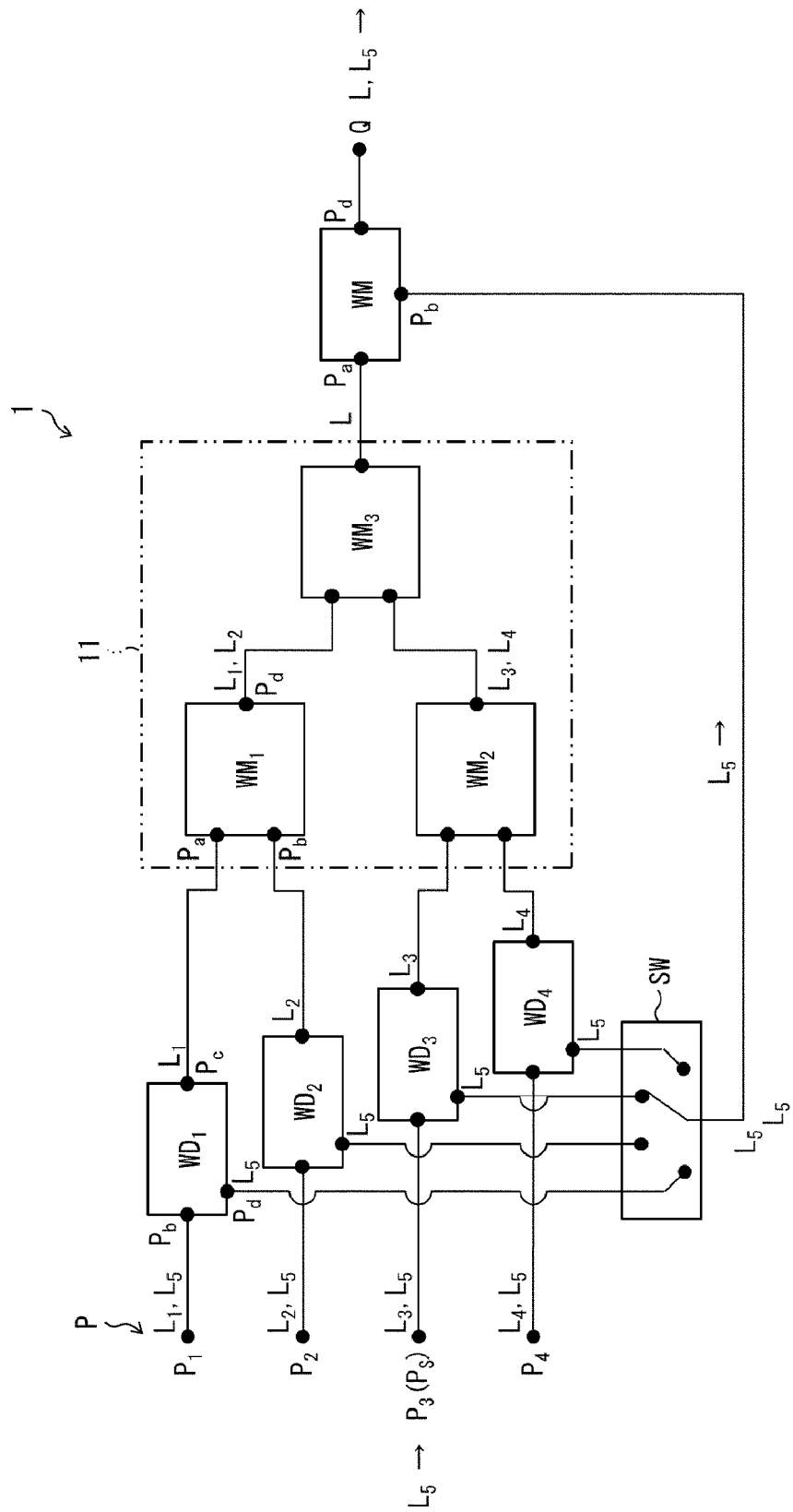
FIG. 1 is a block diagram illustrating an optical device in accordance with one or more embodiments of the present invention.
Figure 2:
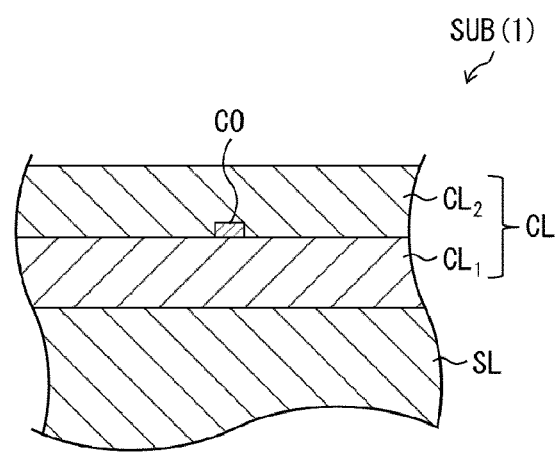
FIG. 2 is a cross-sectional view illustrating a waveguide which constitutes part of the optical device illustrated in FIG. 1.

The following will describe an optical device 1 in accordance with one or more embodiments of the present invention with reference to FIGS. 1 to 4. FIG. 1 is a block diagram illustrating the optical device 1. FIG. 2 is a cross-sectional view illustrating a waveguide which constitutes part of the optical device 1. FIG. 3A is a plan view illustrating a wavelength splitter $WD_i$ included in the optical device 1. FIG. 3B is a plan view illustrating a wavelength combiner $WM_1$ included in the optical device 1. FIG. 4A is a plan view illustrating a variation of the wavelength splitter $WD_1$. FIG. 4B is a plan view illustrating a variation of the wavelength combiner $WM_1$.

(Substrate SUB)

The optical device 1 is an example of a substrate-type optical waveguide device or a device known as a planar lightwave circuit (PLC). The optical device 1 includes a substrate SUB (illustrated in FIG. 2) and a plurality of optical components (not illustrated in FIG. 2). As illustrated in FIG. 2, the substrate SUB includes a silicon layer SL, a core CO, and a cladding CL. The cladding CL is constituted by a lower cladding layer $CL_1$ and an upper cladding layer $CL_2$.

In one or more embodiments, the substrate SUB is produced based on a silicon-on-insulator (SOI) substrate. The silicon layer SL and the lower cladding layer $CL_1$ are a silicon substrate and a buried oxide (BOX) layer of the SOI substrate, respectively. The core CO is obtained by subjecting a single crystal silicon layer of the SOI substrate to micromachining by use of, for example, a photolithographic technique. The upper cladding layer $CL_2$ is obtained by depositing silicon oxide on the lower cladding layer $CL_1$ and the core CO so that side surfaces and an upper surface of the core CO having been subjected to micromachining are coated with silicon oxide.

Note that in one or more embodiments, a silicon-based semiconductor substrate is employed as the substrate SUB. Alternatively, a material making up the substrate SUB may be a semiconductor material (e.g., InP) other than Si or may be an insulating material typified by quartz.

(Optical Components)

The plurality of optical components in one or more embodiments are formed by patterning the core CO into a particular shape in a plan view. Thus, it can be said that these optical components are integrated in the vicinity of a surface of the substrate SUB. Patterning the core CO into a particular shape allows the core surrounded by the cladding CL to have not only the function of guiding light but also the function of serving as the optical components.

The optical device 1 includes, as these optical components, wavelength splitters $WD_1$ to $WD_4$, a wavelength combiner WM, and wavelength combiners $WM_1$ to $WM_3$ (see FIG. 1).

Figure 3A:
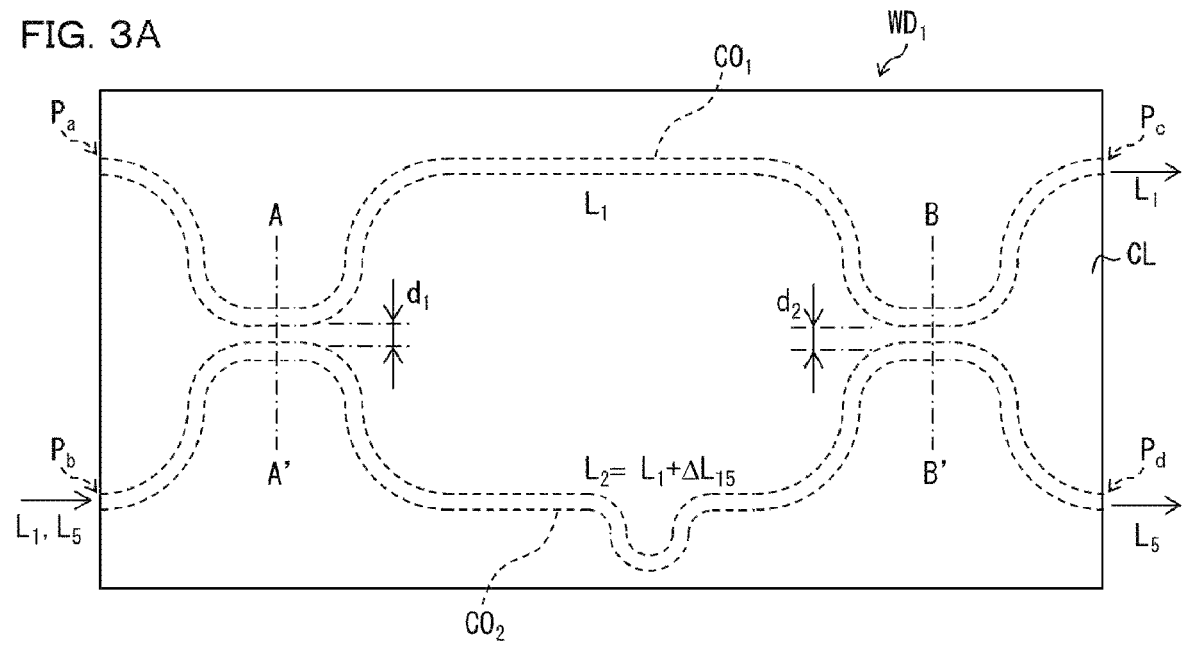
FIG. 3A is a plan view illustrating a wavelength splitter included in the optical device illustrated in FIG. 1.

As illustrated in FIG. 3A, the wavelength splitter $WD_1$ is constituted by a first waveguide $CO_1$, a second waveguide $CO_2$, and a cladding CL. The first waveguide $CO_1$ and the second waveguide $CO_2$ are each an aspect of the core CO described earlier. Accordingly, the cladding CL surrounds the first waveguide $CO_1$ and the second waveguide $CO_2$.

In one or more embodiments, one end and another end of the first waveguide $CO_1$ are referred to as port $P_a$ and port $P_c$ of the wavelength splitter $WD_1$, respectively. Further, one end and another end of the second waveguide $CO_2$ are referred to as port $P_b$ and port $P_d$ of the wavelength splitter $WD_1$, respectively.

In the vicinity of one end side of the wavelength splitter $WD_1$, the ports $P_a$ and $P_b$ are spaced from each other so that no optical interaction occurs between the first waveguide $CO_1$ and the second waveguide $CO_2$. Similarly, in the vicinity of another end side of the wavelength splitter $WD_1$, the ports $P_c$ and $P_d$ are spaced from each other so that no optical interaction occurs.

Thus, the wavelength splitter $WD_1$ includes: (1) a first close region in which the first waveguide $CO_1$ and the second waveguide $CO_2$ are close to each other; (2) a spaced region in which the first waveguide $CO_1$ and the second waveguide $CO_2$ are spaced from each other again; and (3) a second close region in which the first waveguide $CO_1$ and the second waveguide $CO_2$ are close to each other again. In FIG. 3A, a line A-A' is illustrated in the middle of the first close region, and a line B-B' is illustrated in the middle of the second close region. The line A-A' and the line B-B' are lines orthogonal to the first waveguide $CO_1$ and the second waveguide $CO_2$. A distance $d_1$ between the first waveguide $CO_1$ and the second waveguide $CO_2$ in the first close region and a distance $d_2$ between the first waveguide $CO_1$ and the second waveguide $CO_2$ in the second close region are set to distances at which optical interactions occur between the first waveguide $CO_1$ and the second waveguide $CO_2$. Note that the distance $d_1$ and the distance $d_2$ may be equal to each other. Hereinafter, in a case where it is not particularly necessary to distinguish between the distance $d_1$ and the distance $d_2$, the distance $d_1$ and the distance $d_2$ are referred to collectively as a distance d.

In the first waveguide $CO_1$, a segment starting from the line A-A' and ending at the line B-B' is referred to as a first arm part. Similarly, in the second waveguide $CO_2$, a segment starting from the line A-A' and ending at the line B-B' is referred to as a second arm part. As illustrated in FIG. 3A, the second arm part includes a partially curved segment. Thus, an optical path length $L_2$ of the second arm part is greater than an optical path length $L_1$ of the first arm part. Specifically, an optical path length difference between the optical path lengths of the respective curved segments, i.e. the optical path length $L_1$ and the optical path length $L_2$, is $\Delta L_{15}$, and the optical path length $L_2$ is expressed by $L_2 = L_1 + \Delta L_{15}$.

In a case where the optical path length $L_1$ and the optical path length $L_2$ are equal to each other, the wavelength splitter $WD_1$ functions as a 50:50 coupler. The 50:50 coupler is a coupler which causes light having entered the port $P_a$ or the port $P_b$ to exit the port $P_c$ and the port $P_d$ at a nearly equal intensity, i.e. a coupler in which a distribution ratio between the port $P_c$ and the port $P_d$ is 50:50. Such a 50:50 coupler is configured such that, by adjusting the optical path length difference $\Delta L_{15}$ as appropriate, a distribution ratio of light having entered the port $P_a$ or the port $P_b$ can be controlled so as to fall within a range from approximately 100:0 to 0:100. In the example illustrated in FIG. 3B, the optical path length difference $\Delta L_{15}$ is adjusted so that the distribution ratio between the port $P_c$ and the port $P_d$ is approximately 100:0 with respect to a light beam $L_1$ having entered the port $P_b$, and the distribution ratio between the port $P_c$ and the port $P_d$ is approximately 0:100 with respect to a light beam $L_5$ having entered the port $P_b$. Thus, in the wavelength splitter $WD_1$ in accordance with one or more embodiments, the port $P_b$ is a light entering port, and the port $P_c$ and the port $P_d$ are light exiting ports.

In one or more embodiments, the port $P_a$ of the wavelength splitter $WD_1$ is a dummy port which is used as neither the light entering port nor the light exiting port. Thus, the wavelength splitter $WD_1$ functions as a 1:2 wavelength splitter. Further, it is possible that the port $P_a$ of the wavelength splitter $WD_1$ is terminated so as not to reflect a light beam other than the light beam $L_1$ and the light beam $L_5$ from the first arm part and the second arm part. According to this configuration, it is possible to prevent a light beam other than the light beam $L_1$ and the light beam $L_5$ from exiting the ports $P_c$ and $P_d$.

Figure 3B:
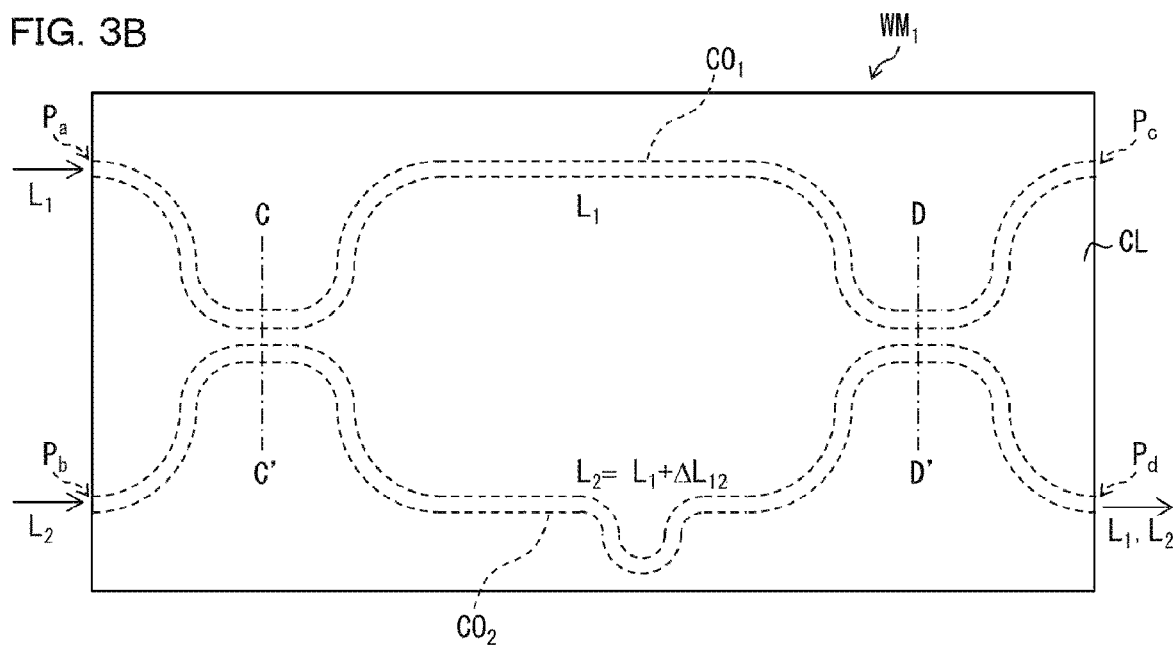
FIG. 3B is a plan view illustrating a wavelength combiner included in the optical device illustrated in FIG. 1.

Note that the wavelength splitter $WD_1$, when the light entering port and the light exiting ports are reversed, functions as the wavelength combiner $WM_1$ (see FIG. 3B). Specifically, in a case where the port $P_c$ and port $P_d$ of the wavelength splitter $WD_1$ are caused to serve as the light entering ports, the light beam $L_1$ is caused to enter the port $P_c$, and the light beam $L_5$ is caused to enter the port $P_d$, the light beam $L_1$ and light beam $L_5$ are caused to exit the port $P_b$ which serves as the light exiting port.

Further, the wavelength combiner $WM_1$ configured as described above, by undergoing appropriate adjustments of the optical path length difference between the curved segments, can be controlled such that the distribution ratio between the port $P_c$ and the port $P_d$ is approximately 0:100 with respect to the light beam $L_1$ having entered the port $P_a$, and the distribution ratio between the port $P_c$ and the port $P_d$ is approximately 0:100 with respect to a light beam $L_2$, having entered the port $P_b$, having a wavelength of $\lambda_2$. In other words, the wavelength combiner $WM_1$ can combine or separate the light beam $L_1$ and the light beam $L_2$. In one or more embodiments, the port $P_c$ of the wavelength combiner $WM_1$ is a dummy port, and the wavelength combiner $WM_1$ functions as a 2:1 wavelength combiner.

Note that the wavelength splitter $WD_1$ or the wavelength combiner $WM_1$ can combine or separate various light beams of different wavelengths, by undergoing appropriate adjustments of the optical path lengths of the curved segments. That is, the wavelength splitters $WD_2$ to $WD_4$, the wavelength combiner WM, and the wavelength combiners $WM_2$ and $WM_3$ all of which are illustrated in FIG. 1 each have a configuration similar to the configuration of the wavelength splitter $WD_1$ and can be realized by setting an optical path length difference as appropriate. Thus, the descriptions of the wavelength splitters $WD_2$ to $WD_4$, the wavelength combiner WM, and the wavelength combiners $WM_2$ and $WM_3$ are omitted.

(Optical Device 1)

As illustrated in FIG. 1, the optical device 1 is an optical device including: a first port group P including n ports $P_i$ (i=1, 2, . . . ; n); a second port Q; and a wavelength multiplexer/demultiplexer 11 provided between the first port group P and the second port Q.

The wavelength multiplexer/demultiplexer 11, in a case where light beams $L_i$ of predetermined different n wavelengths $\lambda_i$ (i=1, 2, . . . , n) corresponding to the respective ports $P_i$ have been inputted to the wavelength multiplexer/demultiplexer 11, combines the light beams $L_i$ into light L and outputs the light L to the second port Q. Further, the wavelength multiplexer/demultiplexer 11, in a case where light L' has been inputted to the second port Q, separates the light L' into light beams $L'_i$ of the wavelengths $\lambda_i$ and outputs the light beams $L'_i$ to the corresponding ports $P_i$.

In one or more embodiments, the wavelength multiplexer/demultiplexer 11, in a case where light beams $L_1$, $L_2$, $L_3$, and $L_4$ of predetermined different wavelengths $\lambda_1$, $\lambda_2$, $\lambda_3$, and $\lambda_4$ have been inputted to the ports $P_1$, $P_2$, $P_3$, and $P_4$ which are brought into correspondence with the light beams $L_1$, $L_2$, $L_3$, and $L_4$, combines the light beams $L_1$, $L_2$, $L_3$, and $L_4$ into light L and outputs the light L to the second port Q.

Further, the wavelength multiplexer/demultiplexer 11, in a case where light L', which is combined light of light beams $L'_1$, $L'_2$, $L'_3$, and $L'_4$ of predetermined different wavelengths $\lambda_1$, $\lambda_2$, $\lambda_3$, and $\lambda_4$, has been inputted to the second port Q, separates the light L' into the light beams $L'_1$, $L'_2$, $L'_3$, $L'_4$ and outputs the light beams $L'_1$, $L'_2$, $L'_3$, $L'_4$ to the corresponding ports $P_1$, $P_2$, $P_3$, and $P_4$.

Assume that one port selected from among the ports $P_i$ (the ports $P_1$, $P_2$, $P_3$, and $P_4$ in one or more embodiments) is a selected port $P_S$. The selected port $P_S$ is a port to which a light beam $L_i$ brought into correspondence with that port has not been inputted. FIG. 1 illustrates, as an example of selection, a case where the port $P_3$ has been selected as the selected port $P_S$. In other words, FIG. 1 illustrates, as an example, a case where the light beam $L_3$ has not been inputted to the port $P_3$. Note, however, that in the optical device 1, any of the ports $P_1$ to $P_4$ can be selected as the selected port $P_S$.

The optical device 1 is configured such that a light beam $L_5$ of a wavelength $\lambda_5$, which is different from the wavelengths $\lambda_i$ ($\lambda_1$, $\lambda_2$, $\lambda_3$, and $\lambda_4$ in one or more embodiments), is inputted to the selected port $P_S$. The wavelength $\lambda_5$ and the light beam $L_5$ are examples of a wavelength $\lambda_{SP}$ and a light beam $L_{SP}$ in the claims, respectively. The optical device 1 is configured such that in a case where a light beam $L_5$ has been inputted to the port $P_3$ which serves as the selected port $P_S$, the light beam $L_5$ passes through the wavelength splitter $WD_3$, the switch SW, and the wavelength combiner WM and is outputted to the second port Q, and in a case where a light beam $L'_5$ of a wavelength $\lambda_5$ has been inputted to the second port Q, the light beam $L'_5$ passes through the wavelength combiner WM, the switch SW, and the wavelength splitter $WD_3$ and is outputted to the selected port $P_S$ (see FIG. 1). The light beam $L_5$ is an example of a light beam $L'_{SP}$ in the claims.

Note that in a case where the port $P_1$ is selected as the selected port $P_S$, the optical device 1 is configured, although not illustrated, such that the light beam $L_5$ passes through the wavelength splitter $WD_1$, the switch SW, and the wavelength combiner WM and is outputted to the second port Q, and in a case where the light beam $L'_5$ of the wavelength $\lambda_5$ has been inputted to the second port Q, the light beam $L'_5$ passes through the wavelength combiner WM, the switch SW, and the wavelength splitter $WD_1$ and is outputted to the selected port $P_S$. In a case where the port $P_2$ and the port $P_4$ are each selected as the selected port $P_S$, a similar operation is carried out as in the case where the port $P_1$ and the port $P_3$ are each selected as the selected port $P_S$.

Note that FIG. 1 illustrates the flows of only the light beams $L_1$ to $L_4$, light beam $L_5$, and light L from the first port group P toward the second port Q. However, flows of the light L', light beam $L'_5$, and light beams $L'_1$ to $L'_4$ from the second port Q toward the first port group P are similar to those of the light L, light beam $L_5$, and the light beams $L_1$ to $L_4$, respectively, except that the light L', light beam $L'_5$, and light beams $L'_1$ to $L'_4$ flow opposite to the directions of the flows of the light L, light beam $L_5$, and the light beams $L_1$ to $L_4$, respectively.

The optical device 1 configured as described above is an optical device that includes a n:1 wavelength multiplexer/demultiplexer 11. The optical device 1 is configured such that the light beam $L_5$ of the wavelength $\lambda_5$ is inputted to the selected port $P_S$, which is a port $P_i$ to which a light beam $L_i$ previously brought into correspondence with that port $P_i$ has not been inputted. In other words, the optical device 1 need only be configured such that the light beam $L_5$ is supplied as a spare light beam corresponding to each of the light beams $L_i$, and does not need to be configured such that n spare light beams are supplied. This means, as discussed later with reference to FIG. 16, that a wavelength division multiplexing transmitter need only have one spare optical source $OS_{SP}$ which is a spare optical source. Thus, the optical device 1 includes the n:1 wavelength multiplexer/demultiplexer 11, and, by using one spare light beam, can secure redundancy in case of the occurrence of an event in which any of the light beams $L_i$ having predetermined wavelengths $\lambda_i$ (i=1, 2, . . . , n) has not been inputted to a corresponding one or more of the ports.

Note that an optical device in accordance with one or more embodiments of the present invention need only be configured so as to use at least one spare light beam, and may be configured so as to use a plurality of spare light beams as discussed with reference to FIGS. 14 and 15. Thus, according to an optical device in accordance with one or more embodiments of the present invention, it is possible to secure any level of redundancy.

In the optical device 1, the wavelength multiplexer/demultiplexer 11 is constituted by the wavelength combiners $WM_1$ to $WM_3$. The wavelength combiner $WM_1$ is configured as illustrated in FIG. 3B, and the wavelength combiners $WM_2$ and $WM_3$ are configured in the same manner as in the wavelength combiner $WM_1$ except for an optical path length difference between the optical path length $L_1$ and the optical path length $L_2$.

The wavelength combiner $WM_1$, in a case where the light beams $L_1$ and $L_2$ are caused to enter the ports $P_a$ and $P_b$, respectively, combines the light beams $L_1$ and $L_2$ and causes combined light of the light beams $L_1$ and $L_2$ to exit the port $P_d$.

Similarly, the wavelength combiner $WM_2$, in a case where the light beams $L_3$ and $L_4$ are caused to enter the ports $P_a$ and $P_b$, respectively, combines the light beams $L_3$ and $L_4$ and causes combined light of the light beams $L_3$ and $L_4$ to exit the port $P_d$.

The wavelength combiner $WM_3$, in a case where the combined light of the light beams $L_1$ and $L_2$ and the combined light of the light beams $L_3$ and $L_4$ are caused to enter the ports $P_a$ and $P_b$, respectively, combines the combined light of the light beams $L_1$ and $L_2$ and the combined light of the light beams $L_3$ and $L_4$ into the light L and causes the light L to exit the port $P_d$. The light L having exited the port $P_d$ enters the port $P_a$ of the wavelength combiner WM (described later).

As described above, the wavelength multiplexer/demultiplexer 11 combines the light beams $L_1$, $L_2$, $L_3$, and $L_4$ into the light L. Similarly, the light L' having entered the port $P_d$ of the wavelength combiner $WM_3$ is separated into the light beams $L'_1$, $L'_2$, $L'_3$, and $L'_4$ by the wavelength multiplexer/demultiplexer 11. The light beams $L'_1$, $L'_2$, $L'_3$, and $L'_4$ into which the light L' has been separated are caused to exit the ports $P_a$ and $P_b$ of the wavelength combiner $WM_1$ and the ports $P_a$ and $P_b$ of the wavelength combiner $WM_2$, respectively.

The optical device 1 further includes: wavelength splitters $WD_i$ (i=1, 2, 3, and 4) which are provided between the corresponding ports $P_i$ and the wavelength multiplexer/demultiplexer 11; a wavelength combiner WM which is provided between the second port Q and the wavelength multiplexer/demultiplexer; and a switch SW which is provided between the wavelength splitters $WD_i$ and the wavelength combiner WM and is arranged in parallel to the wavelength multiplexer/demultiplexer.

Each of the wavelength splitters $WD_i$ couples the light beam $L_i$ or the light beam $L'_i$ between a corresponding one of the ports $P_i$ and the wavelength multiplexer/demultiplexer, and couples the light beam $L_5$ or the light beam $L'_5$ between a corresponding one of the ports $P_i$ and the switch.

The wavelength combiner WM couples the light L or the light L' between the wavelength multiplexer/demultiplexer and the second port Q, and couples the light beam $L_5$ or the light beam $L'_5$ between the switch and the second port Q.

The switch SW, under control from an external member, selects a wavelength splitter corresponding to the selected port $P_S$ as the selected wavelength splitter from among the wavelength splitters $WD_i$, and couples the light beam $L_5$ or $L'_5$ between the selected wavelength splitter and the wavelength combiner WM. In one or more embodiments, the wavelength splitter $WD_3$ is the selected wavelength splitter. Thus, as illustrated in FIG. 1, the switch SW couples the light beam $L_5$ or the light beam $L'_5$ between the wavelength splitter $WD_3$ and the wavelength combiner WM.

Figure 16:
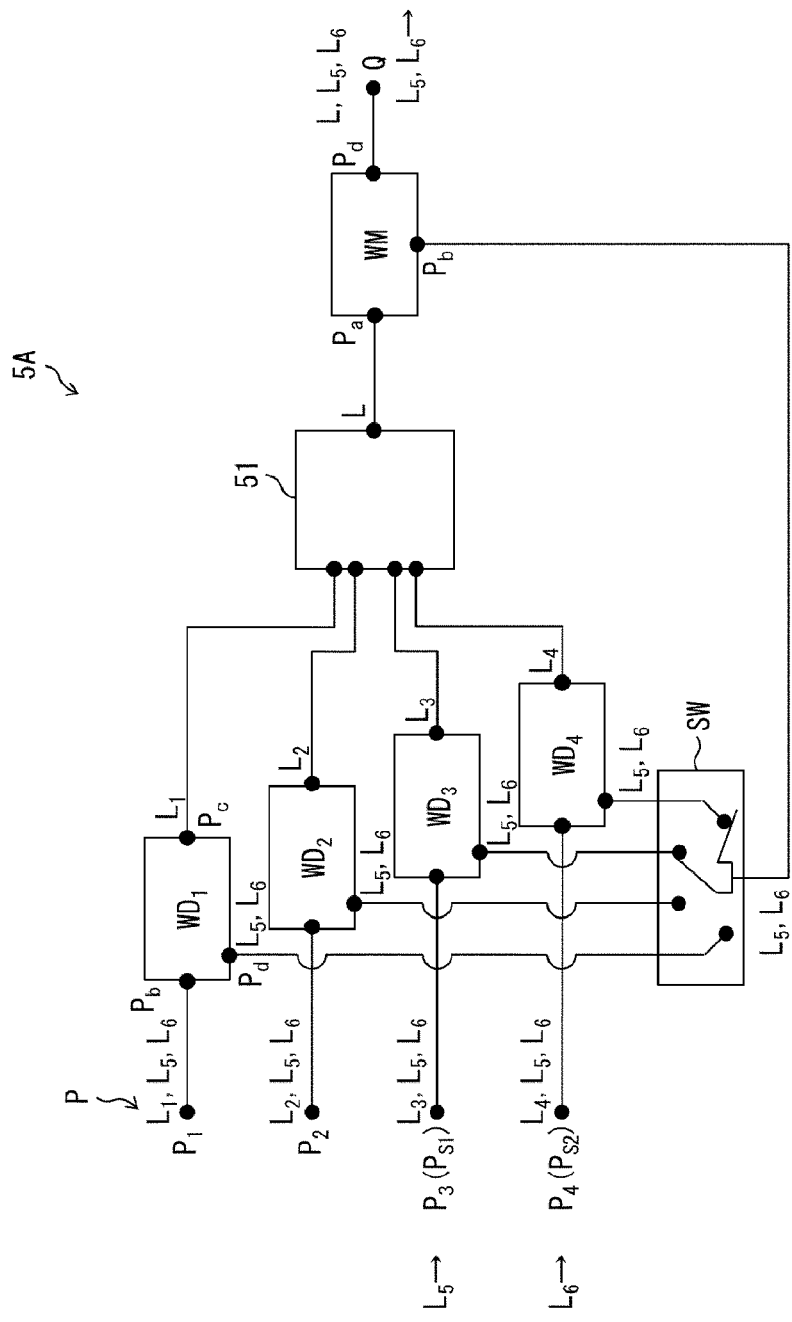
FIG. 16 is a block diagram illustrating a variation of the optical device illustrated in FIG. 15.

A control section which controls the switch SW outside the optical device 1 will be described later with reference to FIG. 16.

In Japanese Patent Application Publication, *Tokukai*, No. 2000-183817 (publication date: Jun. 30, 2000; hereinafter referred to as Patent Literature 2), FIG. 1 illustrates a transmitter (a wavelength division multiplexing transmission apparatus in Patent Literature 2). Unlike the transmitter illustrated in FIG. 1 of Patent Literature 2, the optical device 1 does not need to secure redundancy by use of optical four-wave mixing. This allows the optical device 1 to consume less power than the transmitter illustrated in FIG. 1 of Patent Literature 2.

The transmitter illustrated in FIG. 1 of Patent Literature 2 includes: n laser diodes (working light sources in Patent Literature 2); one protection light source; and one wavelength converting part. The wavelength converting part is configured to receive a laser light beam ($\lambda_{xj}$ in Patent Literature 2) emitted by any of the n laser diodes and a laser light beam ($\lambda_p$ in Patent Literature 2) emitted by the protection light source. The wavelength converting part outputs phase-conjugate light emitted by the optical four-wave mixing of a laser light beam (probe light) emitted by any of the n laser diodes and a laser light beam (pump light) emitted by the protection light source. The transmitter disclosed in Patent Literature 2 is configured such that any of the wavelengths of laser light beams emitted by the n laser diodes is selected as the wavelength of the probe light to be inputted to the wavelength converting part so that the wavelength of the phase-conjugate light can be identical to any of the wavelengths of laser light beams emitted by the n laser diodes. The transmitter illustrated in FIG. 1 of Patent Literature 2 includes the wavelength converting part, thereby securing redundancy in case of a failure of any one of the n laser diodes to emit a laser light beam.

Unfortunately, this transmitter consumes a lot of power. This occurs because of inefficient wavelength conversion of the wavelength converting part using the optical four-wave mixing.

In Japanese Translation of PCT International Application, *Tokuhyo*, No. 2002-505546 (publication date: Feb. 19, 2002; hereinafter referred to as Patent Literature 3), FIG. 2 illustrates a wavelength division multiplexing device (WDM equipment in Patent Literature 3). Unlike the wavelength division multiplexing device illustrated in FIG. 2 of Patent Literature 3, the optical device 1 does not need to secure redundancy with use of a (n+m):1 light multiplexer/demultiplexer.

The wavelength division multiplexing device illustrated in FIG. 2 of Patent Literature 3 is provided at each end of a single optical fiber pair. This wavelength division multiplexing device constitutes part of a wavelength division multiplexing link (bidirectional WDM link in Patent Literature 3). This wavelength division multiplexing device includes: n ordinary transponders (three transponders in Patent Literature 3); m spare transponder (one transponder in Patent Literature 3); and a (n+m):1 light multiplexer/demultiplexer (optical multiplexer or combiner in Patent Literature 3) having n+m input ports (four input ports in Patent Literature 3) and one output port. Each of the spare transponders includes, not only a spare optical source, but also other members such as a modulator for modulating a laser light beam emitted by the spare optical source and an electric circuit for driving the modulator.

In a case where any one of these three ordinary transponders has failed, the wavelength division multiplexing device transmits n laser light beams of different wavelengths to another wavelength division multiplexing device with use of the spare transponder and the (n+1)-th input port corresponding to that spare transponder. In this way, the wavelength division multiplexing device secures redundancy in case of a failure of any one of the n ordinary transponders to emit a laser light beam.

On the contrary, the light entering port and the light exiting port of the wavelength multiplexer/demultiplexer 11 are configured so as to be n:1. Thus, even in a case where switching is performed from an malfunctioned ordinary optical source to a spare optical source which produces a light beam of a wavelength different from the wavelengths of the ordinary optical sources, it is possible to use the configuration of electric drive systems (such as modulators and electric circuits for driving the modulators) arranged for driving the ordinary optical sources. That is, according to the optical device 1, it is possible to secure redundancy without any changes to the configuration of the electric drive systems arranged for driving the ordinary optical sources. In this point, the optical device 1 is different from the wavelength division multiplexing device illustrated in FIG. 2 of Patent Literature 3. Thus, the optical device 1 enables reduction in substrate size and allows for redundancy with less power consumption, as compared to the wavelength division multiplexing device illustrated in FIG. 2 of Patent Literature 3.

In Japanese Patent Application Publication, *Tokukai*, No. 2013-126193 (publication date: Jun. 24, 2013; hereinafter referred to as Patent Literature 4), FIG. 1 illustrates a wavelength division multiplexing device (a wavelength multiplexing optical transmission system in Patent Literature 4). Unlike the wavelength division multiplexing device illustrated in FIG. 1 of Patent Literature 4, the optical device 1 does not need to have a filter module mounted on a substrate. Further, unlike the wavelength division multiplexing device illustrated in FIG. 1 of Patent Literature 4, the optical device 1 does not need to have a heating section. Thus, the optical device 1 does not require a transmitter capable of performing outputs corresponding to the individual wavelengths and does not require complex control or expensive parts, as compared to the wavelength division multiplexing device illustrated in FIG. 1 of Patent Literature 4.

The wavelength division multiplexing device illustrated in FIG. 1 of Patent Literature 4, includes a plurality of ordinary transponders, one spare transponder (redundancy transponder in Patent Literature 4), and a filer module having the wavelength tuning function. In a case where any one of the plurality of ordinary transponders has failed, this wavelength division multiplexing device (1) outputs a laser light beam with use of the spare transponder, and (2), with use of the filter module, converts the wavelength of the outputted laser light beam into a wavelength of a laser light beam to be outputted from the failed transponder. In this way, the wavelength division multiplexing device transmits, to the outside, a plurality of laser beams having the same wavelengths as before the occurrence of the failure. The filter module includes a filter section and a heating section, and is configured such that the temperature of the filter section is changed by use of the heating section so that the center wavelength at a passband can be changed. This wavelength division multiplexing device secures redundancy in case of a failure of any one of the plurality of ordinary transponders to emit a laser light beam.

Unfortunately, this wavelength division multiplexing device has an increased substrate size. This occurs because of the need to mount the filter module on the substrate. In addition, this wavelength division multiplexing device consumes a lot of power. This occurs because of the filter module including the heating section.

Most of transponders includes, not only an optical source, but also other members such as a modulator for modulating a laser light beam emitted by the optical source and an electric circuit for driving the modulator. Thus, each of the spare transponders is required to include, not only a spare optical source, but also other members such as a modulator for modulating a laser light beam emitted by the spare optical source and an electric circuit for driving the modulator.

Figure 17:
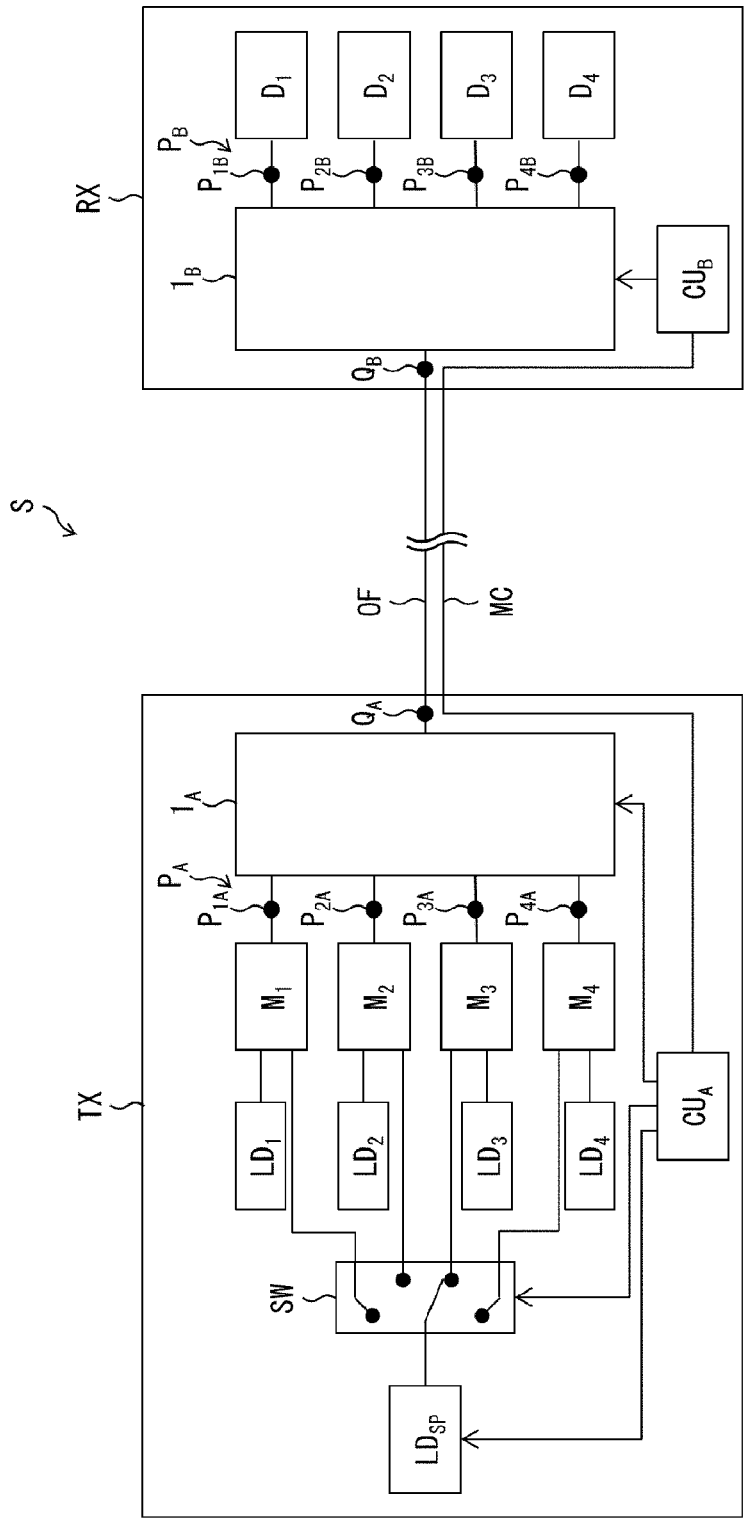
FIG. 17 is a block diagram illustrating a wavelength division multiplexing transmission and receiving system in accordance with one or more embodiments of the present invention.

On the contrary, a wavelength division multiplexing transmission and receiving system including the optical device 1 (e.g., a wavelength division multiplexing transmission and receiving system S illustrated in FIG. 17) need only include at least one spare optical source $OS_{SP}$ (spare laser diode $LD_{SP}$ in a case of the wavelength division multiplexing transmission and receiving system S) and does not require any functions (a modulator, an electric circuit for driving the modulator, etc.) other than the optical source. Thus, the optical device 1 allows a wavelength division multiplexing transmission and receiving system to be more compact and consume less power, as compared to a case in which the technique disclosed in Patent Literature 4 is applied.

(Variations of Wavelength Splitter and Wavelength Combiner)

Figure 4A:
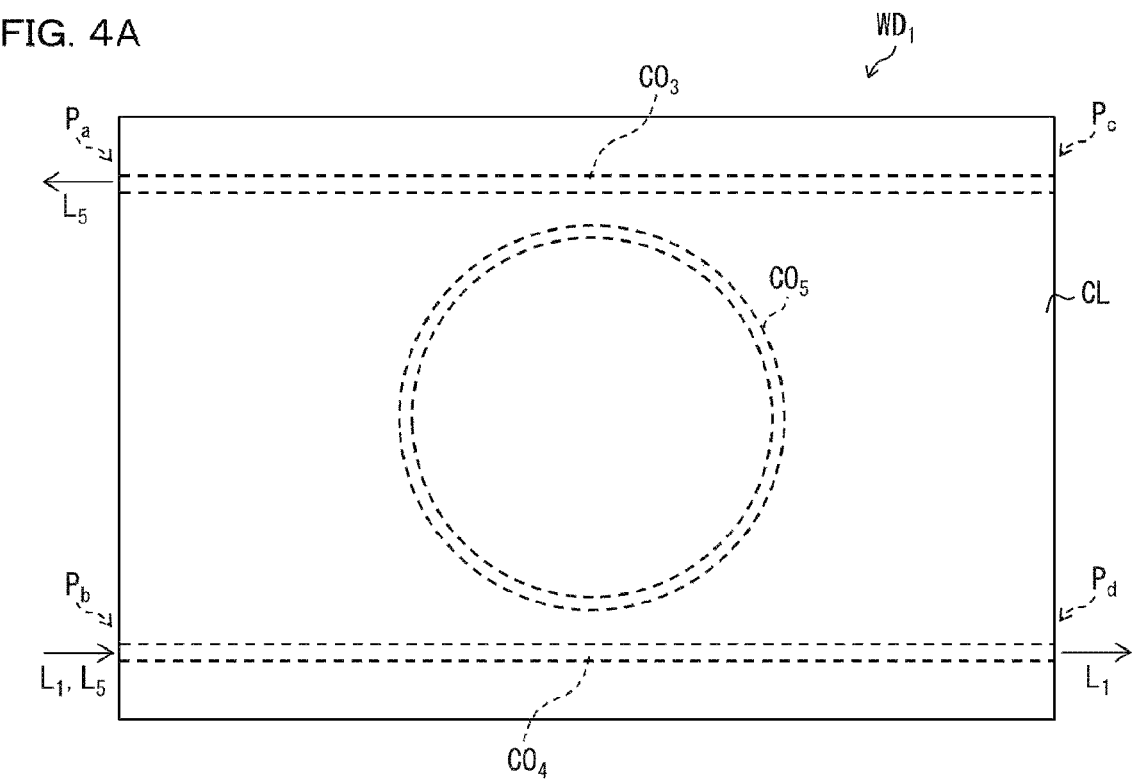
FIG. 4A is a plan view illustrating a variation of the wavelength splitter illustrated in FIG. 3A.
Figure 4B:
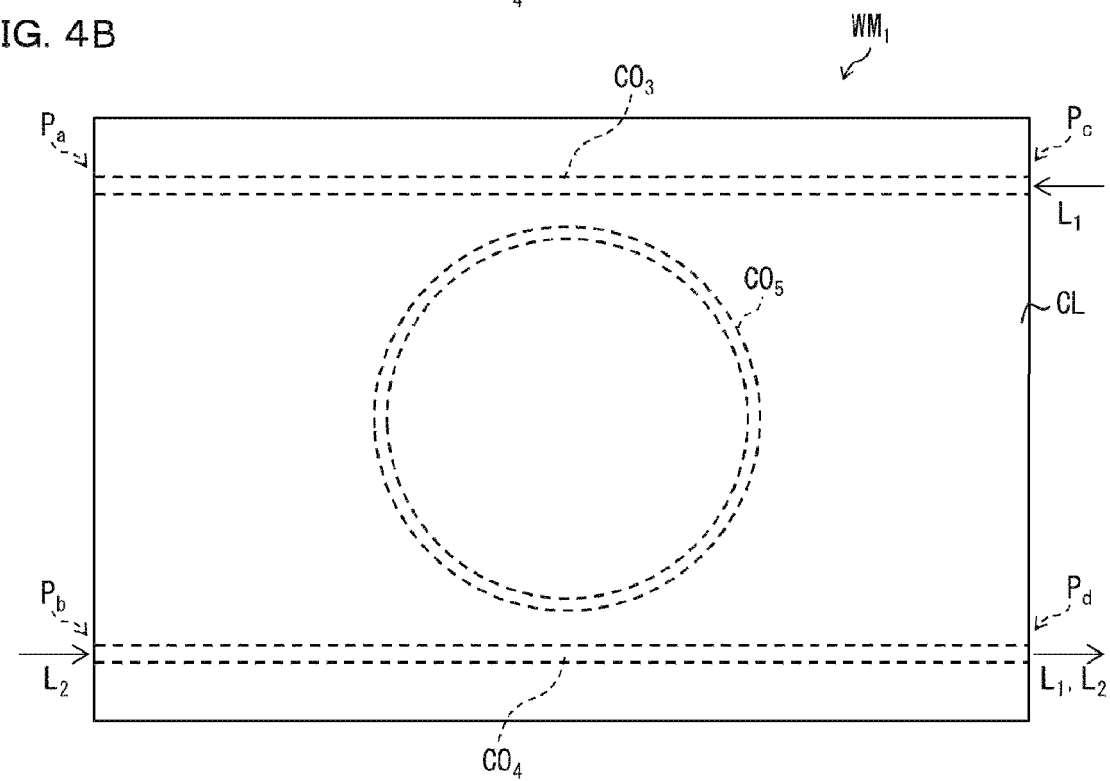
FIG. 4B is a plan view illustrating a variation of the wavelength combiner illustrated in FIG. 3B.

In the optical device 1, the wavelength splitter $WD_1$ can be configured as illustrated in FIG. 4A, and the wavelength combiner $WM_1$ can be configured as illustrated in FIG. 4B. FIG. 4A is a plan view illustrating a variation of the wavelength splitter $WD_1$. FIG. 4B is a plan view illustrating a variation of the wavelength combiner $WM_1$. Note that in the variations in accordance with one or more embodiments, the wavelength splitter $WD_1$ and the wavelength combiner $WM_1$ are taken as examples. However, each of the wavelength splitters $WD_2$ to $WD_4$ can be configured as illustrated in FIG. 4A, and each of the wavelength combiners $WM_2$ and $WM_3$ can be configured as illustrated in FIG. 4B.

As illustrated in FIG. 4A, a core of the wavelength splitter $WD_1$ in this variation is constituted by a first waveguide $CO_3$, a second waveguide $CO_4$, and a ring resonator $CO_5$. The first waveguide $CO_3$ and the second waveguide $CO_4$ are arranged side by side. One end and another end of the first waveguide $CO_3$ are referred to as port $P_a$ and port $P_c$ of the wavelength combiner $WM_1$ in this variation, respectively.

Further, one end and another end of the second waveguide $CO_4$ are referred to as port $P_b$ and port $P_d$ of the wavelength combiner $WM_1$ in this variation, respectively.

The wavelength splitter $WD_1$ in this variation can transfer light having a predetermined wavelength (light beam $L_5$ in this variation) from the second waveguide $CO_4$ to the first waveguide $CO_3$ or from the first waveguide $CO_3$ to the second waveguide $CO_4$ according to a circumferential length of the ring resonator $CO_5$.

Thus, setting the circumferential length as appropriate allows the wavelength splitter $WD_1$ to function as a wavelength splitter that separates two light beams of different wavelengths. For example, as illustrated in FIG. 4A, in a case where the port $P_b$ serves as the light entering port, and the light beam $L_1$ and the light beam $L_5$ are caused to enter the port $P_b$, the light beam $L_1$ is caused to exit the port $P_d$, while the light beam $L_5$ is caused to exit the port $P_a$. That is, the port $P_a$ and the port $P_d$ each serve as the light exiting port.

Note that the wavelength splitter $WD_1$, when the light entering port and the light exiting ports are reversed, functions as a wavelength combiner. Specifically, in a case where the port $P_a$ and port $P_d$ are caused to serve as the light entering ports, the light beam $L_1$ is caused to enter the port $P_c$, and the light beam $L_5$ is caused to enter the port $P_a$, the light beam $L_1$ and the light beam $L_5$ are caused to exit the port $P_b$ which serves as the light exiting port.

Further, the optical component configured as described above can combine or separate the light beam $L_1$ and the light beam $L_2$, by undergoing appropriate adjustment of the circumferential length. The wavelength combiner $WM_1$ in this variation (see FIG. 4B) having a configuration similar to the configuration of the wavelength splitter $WD_1$ and having a circumferential length which is set such that the light beam $L_2$ can be transferred from the second waveguide $CO_4$ to the first waveguide $CO_3$ or from the first waveguide $CO_3$ to the second waveguide $CO_4$, can combine or separate the light beam $L_1$ and the light beam $L_2$.

Note that the wavelength splitter $WD_1$ or the wavelength combiner $WM_1$ in this variation can combine or separate various light beams of different wavelengths, by undergoing appropriate adjustment of the circumferential length. That is, the wavelength splitters $WD_2$ to $WD_4$, the wavelength combiner WM, and the wavelength combiners $WM_2$ and $WM_3$ all of which are illustrated in FIG. 1 each have a configuration similar to the configuration of the wavelength splitter $WD_1$ in this variation and can be realized by setting a circumferential length as appropriate.

(Variation of Optical Device 1)

Figure 5:
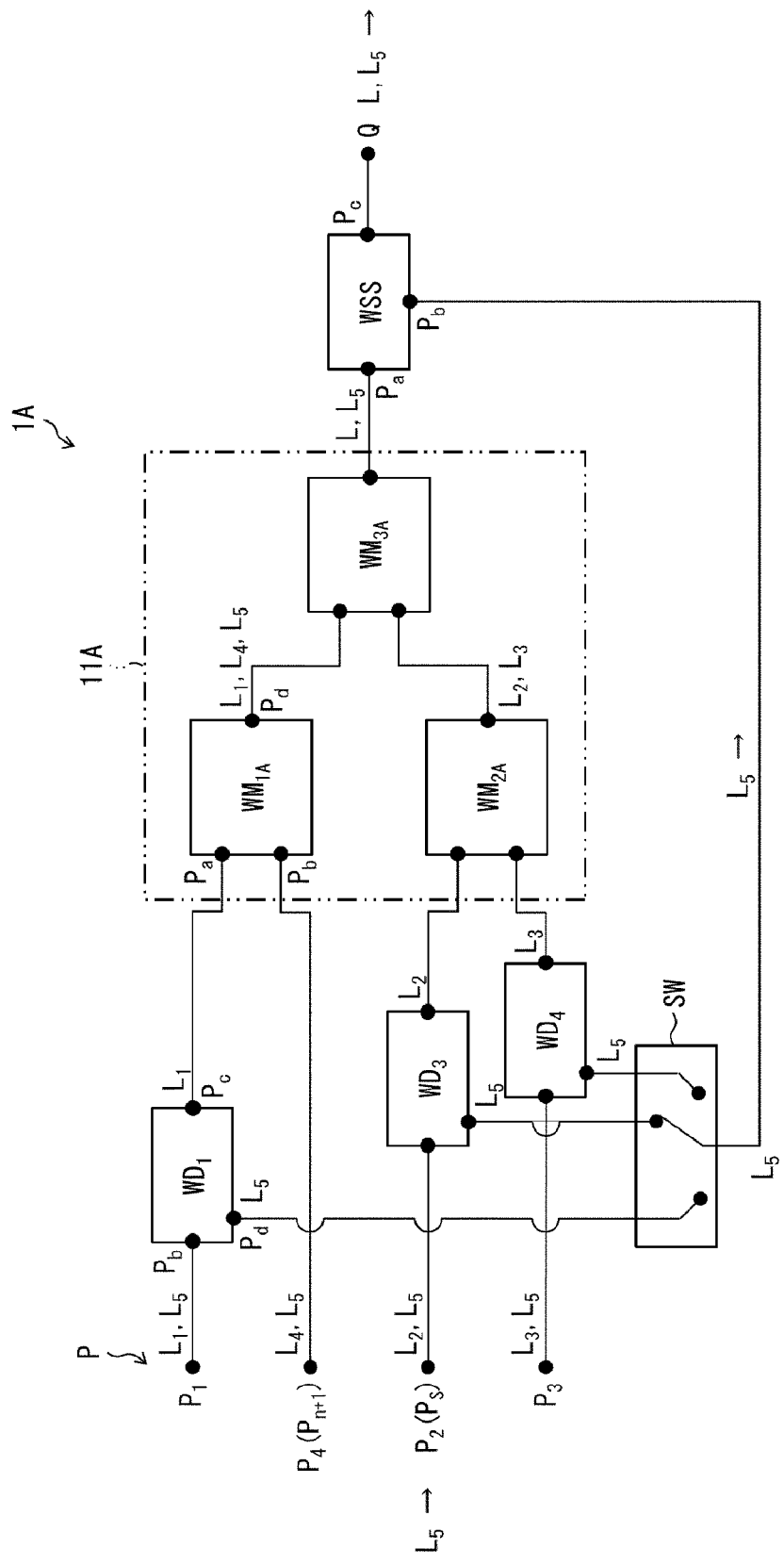
FIG. 5 is a block diagram illustrating a variation of the optical device illustrated in FIG. 1.
Figure 6A:
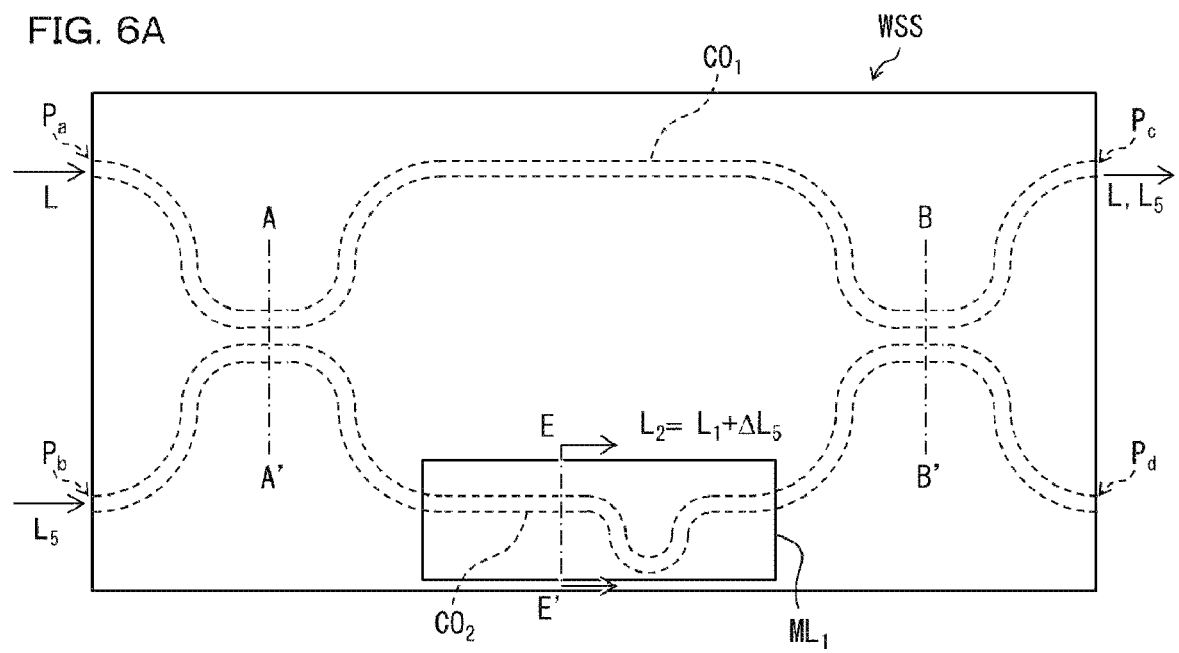
FIG. 6A is a plan view illustrating a wavelength selective switch included in the optical device illustrated in FIG. 5.
Figure 6B:
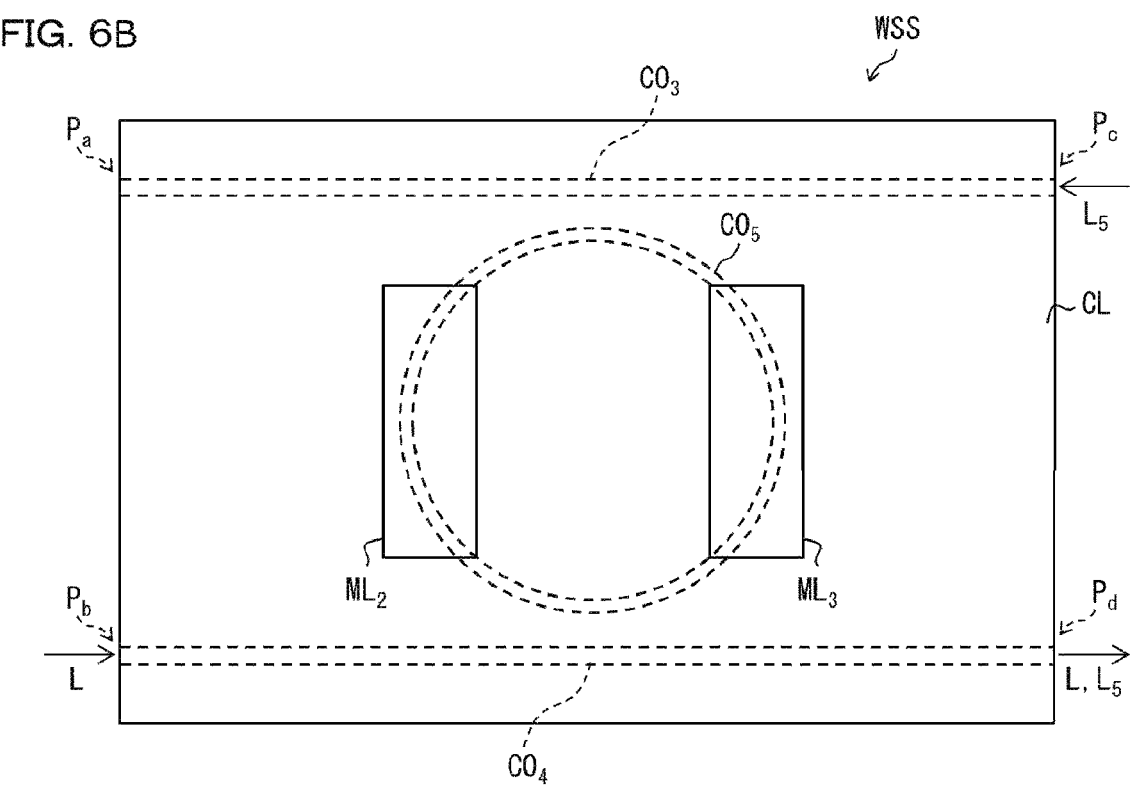
FIG. 6B is a plan view illustrating a variation of the wavelength selective switch illustrated in FIG. 6A.
Figure 7:
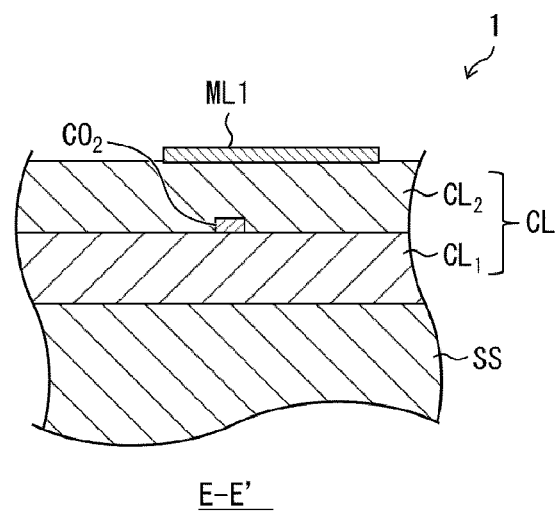
FIG. 7 is a cross-sectional view illustrating the wavelength selective switch illustrated in FIG. 6A.
Figure 8A:
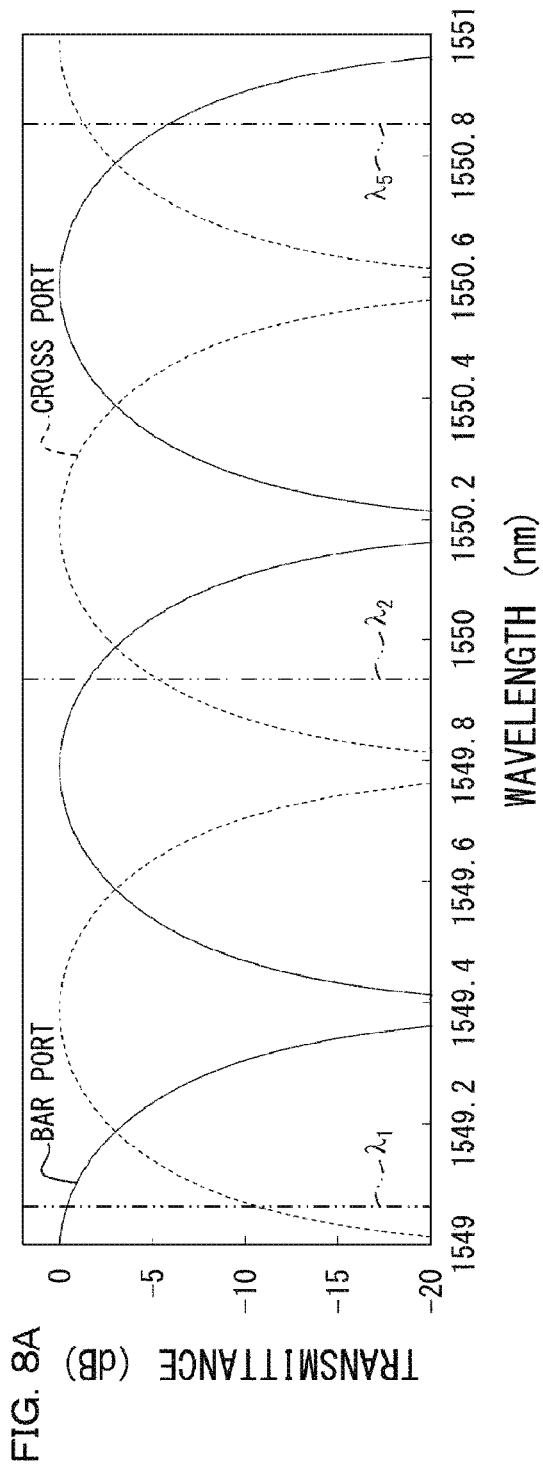
FIGS. 8A and 8B are graphs showing transmission characteristics of the wavelength selective switch illustrated in FIG. 6.
Figure 8B:
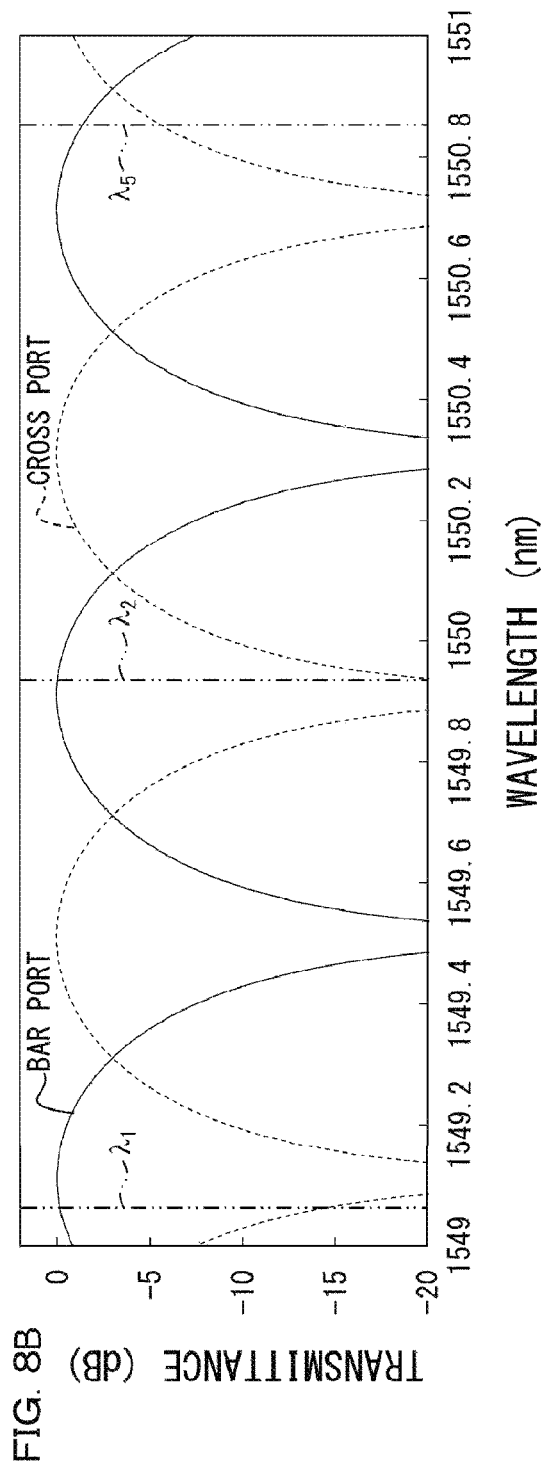

An optical device 1A, which is a variation of the optical device 1 illustrated in FIG. 1, will be described with reference to FIGS. 5 to 8. FIG. 5 is a block diagram illustrating the optical device 1A. The following description of this variation assumes that the number of ports $P_i$ of the optical device $1_A$ is four. As described later, of the ports $P_1$ to $P_4$ illustrated in FIG. 5, the ports $P_1$ to $P_3$ are an example of n ports $P_i$ recited in Claims, and the port $P_4$ is an example of a port $P_{n+1}$ recited in Claims. The port $P_4$ is arranged in parallel to the ports $P_1$ to $P_3$ and is connected directly to a wavelength multiplexer/demultiplexer 11A. FIG. 6A is a plan view illustrating a wavelength selective switch WSS included in the optical device 1A. FIG. 6B is a plan view illustrating a variation of the wavelength selective switch WSS illustrated in FIG. 6A. FIG. 7 is a cross-sectional view illustrating the wavelength selective switch WSS illustrated in FIG. 6A. Note that FIG. 7 is a cross-sectional view illustrating the wavelength selective switch WSS, viewed along a line E-E' illustrated in FIG. 6A. FIGS. 8A and 8B are graphs showing transmission characteristics of the wavelength selective switch WSS illustrated in FIG. 6. FIG. 8A shows a transmission characteristic of the wavelength selective switch WSS in which a heater is not in operation, and FIG. 8B shows a transmission characteristic of the wavelength selective switch WSS in which the heater is in operation. Note here that the transmission characteristic refers to a wavelength dependency of a transmittance of the wavelength selective switch WSS.

In the optical device 1A, the first port group P further includes the port $P_4$ (corresponding to the port $P_{n+1}$ recited in Claims) which is arranged in parallel to the ports $P_i$ and is connected directly to the wavelength multiplexer/demultiplexer 11.

Further, the optical device 1A employs the wavelength selective switch WSS as the wavelength combiner WM.

The wavelength selective switch WSS can be realized by, for example, the configuration illustrated in FIG. 6A. The wavelength selective switch WSS illustrated in FIG. 6A is obtained by adding a metal layer $ML_1$ to the configuration of the wavelength splitter $WD_1$ illustrated in FIG. 3A as a base. In this variation, a difference between the optical path length $L_1$ of the first waveguide $CO_1$ and the optical path length $L_2$ of the second waveguide $CO_2$ is an optical path length difference $\Delta L_5$. Thus, the optical path length $L_2$ is expressed by $L_2 = L_1 + \Delta L_5$.

The metal layer $ML_1$ is a thin film made of a metal, such as titanium nitride (TiN), having higher resistivity than gold (Au), copper (Cu), and aluminum (Al). The metal layer $ML_1$, when a current is flown therethrough with use of a current source (not illustrated), generates Joule heat due to its high resistivity. Thus, the metal layer $ML_1$ functions as a heater that can change the amount of generated heat in response to a value of a current flown therethrough. Note that the operation of the heater is controlled by an entity outside the optical device 1A.

In one or more embodiments, the metal layer $ML_1$ is provided on a surface of an upper cladding layer $CL_2$ with which the upper surface and side surfaces of the second waveguide $CO_2$ are coated (see FIG. 7). Thus, the Joule heat generated by flowing a current through the metal layer $ML_1$ heats the second waveguide $CO_2$.

Hereinafter, an effective optical path length of the second waveguide $CO_2$ in a state of being heated by the heater is referred to as optical path length $L_{2E}$, and a difference between the optical path length $L_1$ and the optical path length $L_{2E}$ is referred to as optical path length difference $\Delta L_{5E}$. Heating the second waveguide $CO_2$ increases an effective optical path length $L_{2E}$ of a waveguide including the second waveguide $CO_2$ which functions as a core. This is mainly because the refractive index of the second waveguide $CO_2$ increases with rise in temperature of the second waveguide $CO_2$. By heating the second waveguide $CO_2$, $L_{2E}$ satisfies $L_2 < L_{2E}$, and $\Delta L_{5E}$ satisfies $\Delta L_5 < \Delta L_{5E}$.

The transmission characteristic of the wavelength selective switch WSS, when the wavelength dependencies of effective refractive indices of the waveguides $CO_1$ and $CO_2$ are ignored, is expressed by $FSR = c/(n\Delta L_5)$ by using the optical path length difference $\Delta L_5$. Here, FSR is an abbreviation for "free spectrum range". For example, in a case where the wavelength selective switch WSS is designed so as to satisfy FSR=100 GHz at a wavelength close to 1550 nm, the transmission characteristic shown in FIG. 8A is obtained. Note that bar port output shown in FIG. 8 refers to output of light in a case where, in one waveguide (e.g., the first waveguide $CO_1$), light is caused to enter one of ports at the opposite ends (e.g., the ports $P_a$ and $P_c$) and is then caused to exit another one port (e.g., the port $P_c$). Further, cross port output shown in FIG. 8 refers to output of light in a case where light is caused to enter a port at one end of the first waveguide $CO_1$ (e.g., the port $P_a$) and is then caused to exit a port at another one end of the second waveguide $CO_2$ (e.g., the port $P_d$).

Here, in a case where the second waveguide $CO_2$ is heated by the operation of, for example, the heater, the optical path length difference between the first waveguide $CO_1$ and the second waveguide $CO_2$ increases from $\Delta L_5$ to $\Delta L_{5E}$, as described earlier. Consequently, FSR changes to $FSR = c/(n\Delta L_{5E})$. This causes the transmission characteristic of the wavelength selective switch WSS to shift to the long wavelength side as shown in FIG. 8B.

Here, assuming that the light beams $L_1$, $L_2$, and $L_5$ have wavelengths $\lambda_1$, $\lambda_2$, and $\lambda_5$, respectively, for example, $\lambda_1$=1549.1 nm, $\lambda_2$=1549.9 nm, and $\lambda_5$=1550.9 nm (all in five significant figures) are employed. In FIGS. 8A and 8B, the wavelengths $\lambda_1$, $\lambda_2$, and $\lambda_5$ are indicated by two-dot chain lines.

In a case where the heater of the wavelength selective switch WSS is not in operation, i.e. in a case where the transmission characteristic of the wavelength selective switch WSS is in the state shown in FIG. 8A, the light beams $L_1$ and $L_2$ having entered the port $P_a$ are caused to exit the port $P_c$, and the light beam $L_5$ having entered the port $P_b$ is caused to exit the port $P_c$, too.

On the other hand, in a case where the heater of the wavelength selective switch WSS is in operation, i.e. in a case where the transmission characteristic of the wavelength selective switch WSS is in the state shown in FIG. 8B, the light beams $L_1$ and $L_2$ having entered the port $P_a$ are caused to exit the port $P_c$. However, the light beam $L_5$ having entered the port $P_b$ is caused to exit the port $P_d$.

As described above, the wavelength selective switch WSS has the transmission characteristic that can be changed by changing an effective optical path length $\Delta L_{2E}$ of the second waveguide $CO_2$ with use of the heater. Consequently, the wavelength selective switch WSS enables switching of only an output port for the light beam $L_5$ between the port $P_c$ and the port $P_d$, without a need to change output ports for the light beams $L_1$ and $L_2$. In other words, (1) regardless of whether the heater is in operation, the wavelength selective switch WSS couples the light beams $L_1$ and $L_2$ between the bar ports (between the port $P_a$ and the port $P_c$ and between the port $P_b$ and the port $P_d$), (2) when the heater is not in operation, the wavelength selective switch WSS couples the light beam $L_5$ between the bar ports, and (3) when the heater is in operation, the wavelength selective switch WSS couples the light beam $L_5$ between the cross ports.

The above description has dealt with the light beams $L_1$, $L_2$, and $L_5$ only. However, for the light beams $L_3$ and $L_4$ as well, the wavelengths $\lambda_3$ and $\lambda_4$ are set such that the light beams $L_3$ and $L_4$ are coupled between the bar ports regardless of whether the heater is in operation.

The wavelength selective switch WSS illustrated in FIG. 6A is an example of a simple wavelength selective switch constituted by one Mach-Zehnder interferometer (MZI). Thus, FIGS. 8A and 8B show that the light beams $L_1$, $L_2$, and $L_5$ are also outputted through individual ports opposite the output ports for the light beams $L_1$, $L_2$, and $L_5$. That is, FIGS. 8A and 8B show that there is a room for improvement of distribution ratios of the respective light beams $L_1$, $L_2$, and $L_5$.

These distribution ratios can be improved by applying, to the wavelength selective switch WSS, the technique disclosed in Non-Patent Literature 2 (K. Jinguji and M. Kawachi, "Synthesis of Coherent Two-Port Lattice-Form Optical Delay-Line Circuit," J. Lightwave Technol., vol. 13, no. I, p. 73, 1995.) or the technique disclosed in Non-Patent Literature 3 (K. Jinguji, "Synthesis of coherent two-port optical delay-line circuit with ring waveguides," J. Lightwave Technol., vol. 14, no. 8, pp. 1882-1898, 1996.). Non-Patent Literature 2 discloses a wavelength selective switch WSS including multiple MZIs, and Non-Patent Literature 3 discloses a wavelength selective switch WSS including a ring-loaded MZI. By using the technique disclosed in Non-Patent Literature 2 or the technique disclosed in Non-Patent Literature 3, it is possible to improve a wavelength selective switch WSS. Specifically, by causing a wavelength selective switch WSS to have multiple MZIs therein or to have a ring resonator loaded in the vicinity of one waveguide, it is possible to realize a wavelength selective switch WSS having flat-top output characteristics. Further, the wavelength selective switch WSS improved by using the technique disclosed in Non-Patent Literature 2 or the technique disclosed in Non-Patent Literature 3 enables reduction in crosstalk and loss.

According to the wavelength selective switch WSS configured as described above, under the condition where one port is selected as the selected port $P_S$ from among the ports $P_i$ (i=1, 2, . . . , n, n+1), (A) it is possible to couple the light beams $L_i$ (i=1, 2, . . . , n, n+1) between the wavelength multiplexer/demultiplexer 11 and the second port Q, (B) in a case where one port is selected as the selected port $P_S$ from among the ports $P_i$ (i=1, 2, . . . , n), it is possible to couple the light beam $L_5$ or $L'_5$ between the switch SW and the second port Q under control from an external member, and (C) in a case where the port $P_{n+1}$ is selected as the selected port $P_S$, it is possible to couple the light beam $L_5$ or $L'_5$ between the wavelength multiplexer/demultiplexer 11 and the second port Q under control from an external member.

As an example of a case where one port is selected as the selected port $P_S$ from among the ports $P_1$ to $P_3$, the following will describe a case where the port $P_3$ is selected as the selected port $P_S$. In this case, the light beams $L_1$, $L_2$, and $L_4$ are inputted to the port $P_a$ of the wavelength selective switch WSS, and the light beam $L_5$ having been inputted to the port $P_3$ which serves as the selected port $P_S$ is inputted to the port $P_b$ of the wavelength selective switch WSS. In such a case, the heater of the wavelength selective switch WSS is controlled such that the light beam $L_5$ is coupled between the port $P_b$ and the port $P_c$ of the wavelength selective switch WSS under control from an external member. Thus, the wavelength selective switch WSS outputs the light beams $L_1$, $L_2$, $L_4$, and $L_5$ from the port $P_c$.

In a case where the port $P_4$ is selected as the selected port $P_S$, the light beams $L_1$, $L_2$, and $L_4$ are inputted to the port $P_a$ of the wavelength selective switch WSS. In such a case, the heater of the wavelength selective switch WSS is controlled such that the light beam $L_5$ is coupled between the port $P_a$ and the port $P_c$ of the wavelength selective switch WSS under control from an external member. Thus, in this case as well, the wavelength selective switch WSS outputs the light beams $L_1$, $L_2$, $L_4$, and $L_5$ from the port $P_c$.

Further, the wavelength selective switch WSS can be realized by the configuration illustrated in FIG. 6B. The wavelength selective switch WSS illustrated in FIG. 6B is obtained by adding metal layers $ML_2$ and $ML_3$ to the configuration of the wavelength splitter $WD_1$ illustrated in FIG. 4A as a base.

According to such a configuration, the metal layers $ML_2$ and $ML_3$, like the metal layer $ML_1$, function as a heater when a current is flown therethrough. Note that the operation of the heater is controlled by an entity outside the optical device 1A.

Since it is possible to change an effective circumferential length of the ring resonator $CO_5$ according to whether to operate the heater, whether to transfer only the light beam $L_5$ between the first waveguide $CO_3$ and the second waveguide $CO_4$ can be controlled externally.

Note that, in the wavelength selective switch WSS, the circumferential length of the ring resonator $CO_5$ is configured such that (1) in a case where the heater is not in operation, the light beams $L_1$ to $L_4$ and the light beam $L_5$ are not transferred between the first waveguide $CO_3$ and the second waveguide $CO_4$, and (2) in a case where the heater is in operation, the light beam $L_5$ only is transferred between the first waveguide $CO_3$ and the second waveguide $CO_4$.

According to the wavelength multiplexer/demultiplexer 11A, in a case where light beams $L_i$ (i=1, 2, ..., n) have been inputted to the corresponding ports $P_i$ (i=1, 2, ..., n, wherein n=3 in this variation), and a light beam $L_{n+1}$ ($L_4$ in this variation) having a wavelength $\lambda_{n+1}$ ($\lambda_4$ in this variation) which is different from wavelengths $\lambda_i$ (i=1, 2, ..., n) and $\lambda_5$ has been inputted to the port $P_{n+1}$, the wavelength multiplexer/demultiplexer 11A multiplexes the light beams $L_i$ (i=1, 2, ..., n, n+1) to emit light L and outputs the light L to the second port Q.

Further, according to the wavelength multiplexer/demultiplexer 11A, in a case where light L' has been inputted to the second port Q, the wavelength multiplexer/demultiplexer 11A demultiplexes the light L' to emit light beams $L'_i$ (i=1, 2, ..., n, n+1) having wavelengths $\lambda_i$ (i=1, 2, ..., n, n+1) and outputs the light beams $L'_i$ to the corresponding ports $P_i$ (i=1, 2, ..., n, n+1).

As described earlier, the wavelength selective switch WSS, under the condition where one port is selected as the selected port $P_S$ from among the ports $P_i$ (i=1, 2, ..., n, n+1), (A) couples the light beams $L_i$ (i=1, 2, ..., n, n+1) between the wavelength multiplexer/demultiplexer 11 and the second port Q, (B) in a case where one port is selected as the selected port $P_S$ from among the ports $P_i$ (i=1, 2, ..., n), couples the light beam $L_5$ or $L'_5$ between the switch SW and the second port Q under control from an external member, and (C) in a case where the port $P_{n+1}$ is selected as the selected port $P_S$, couples the light beam $L_5$ or $L'_5$ between the wavelength multiplexer/demultiplexer 11 and the second port Q under control from an external member.

In the optical device 1A, the wavelength multiplexer/demultiplexer 11A is constituted by wavelength combiners $WM_{1A}$ to $WM_{3A}$. The wavelength combiners $WM_{1A}$ to $WM_{3A}$ are each configured in the same manner as in the wavelength combiner $WM_1$ illustrated in FIG. 3B except for an optical path length difference between the optical path length $L_1$ and the optical path length $L_2$.

The wavelength combiner $WM_{1A}$, in a case where the light beams $L_1$ and $L_4$ are caused to enter the ports $P_a$ and $P_b$, respectively, combines the light beams $L_1$ and $L_4$ and causes combined light of the light beams $L_1$ and $L_4$ to exit the port $P_d$. Further, the wavelength combiner $WM_{1A}$, in a case where the light beams $L_1$ and $L_5$ are caused to enter the ports $P_a$ and $P_b$, respectively, combines the light beams $L_1$ and $L_5$ and causes combined light of the light beams $L_1$ and $L_5$ to exit the port $P_d$.

The wavelength combiner $WM_{2A}$, in a case where the light beams $L_2$ and $L_3$ are caused to enter the ports $P_a$ and $P_b$, respectively, combines the light beams $L_2$ and $L_3$ and causes combined light of the light beams $L_2$ and $L_3$ to exit the port $P_d$.

The wavelength combiner $WM_{3A}$, in a case where the combined light of the light beams $L_1$ and $L_4$ and the combined light of the light beams $L_2$ and $L_3$ are caused to enter the ports $P_a$ and $P_b$, respectively, combines the combined light of the light beams $L_1$ and $L_4$ and the combined light of the light beams $L_2$ and $L_3$ into the light L and causes the light L to exit the port $P_d$. The wavelength combiner $WM_{3A}$, in a case where the combined light of the light beams $L_1$ and $L_5$ and the combined light of the light beams $L_2$ and $L_3$ are caused to enter the ports $P_a$ and $P_b$, respectively, combines the combined light of the light beams $L_1$ and $L_5$ and the combined light of the light beams $L_2$ and $L_3$ and causes the combined light of the light beams $L_1$, $L_2$, $L_3$, and $L_5$ to exit the port $P_d$. The light L or the combined light of the light beams $L_1$, $L_2$, $L_3$, and $L_5$, after having exited the port $P_d$, enters the port $P_a$ of the wavelength combiner WM.

As described above, the wavelength multiplexer/demultiplexer 11A combines the light beams $L_1$, $L_2$, $L_3$, and $L_4$ into the light L or combines the light beams $L_1$, $L_2$, $L_3$, and $L_5$.

Further, the light L' having entered the port $P_d$ of the wavelength combiner $WM_{3A}$ is separated into the light beams $L'_1$, $L'_2$, $L'_3$, and $L'_4$ by the wavelength multiplexer/demultiplexer 11A. The light beams $L'_1$, $L'_2$, $L'_3$, and $L'_4$ into which the light L' has been separated are caused to exit the ports $P_a$ and $P_b$ of the wavelength combiner $WM_{1A}$ and the ports $P_a$ and $P_b$ of the wavelength combiner $WM_{2A}$, respectively.

Further, the light beam $L'_5$ having entered the port $P_d$ of the wavelength combiner $WM_{3A}$ exit the port $P_b$ of the wavelength combiner $WM_{2A}$.

As described earlier, the optical device 1A employs the wavelength selective switch WSS instead of the wavelength combiner WM of the optical device 1 illustrated in FIG. 1. The wavelength selective switch WSS can switch, in accordance with output of the heater controlled by an external member, between (1) coupling the light beam $L_5$ between the port $P_a$ and the port $P_c$ and (2) coupling the light beam $L_5$ between the port $P_b$ and the port $P_c$. Thus, the optical device 1A, which is configured based on the optical device 1 but omits the wavelength splitter $WD_2$, can obtain the same effect as the effect produced by the optical device 1 by making the following changes to the optical device 1: a change from the wavelength multiplexer/demultiplexer 11 to the wavelength multiplexer/demultiplexer 11A; and a change from the wavelength combiner WM to the wavelength selective switch WSS.

Figure 9:
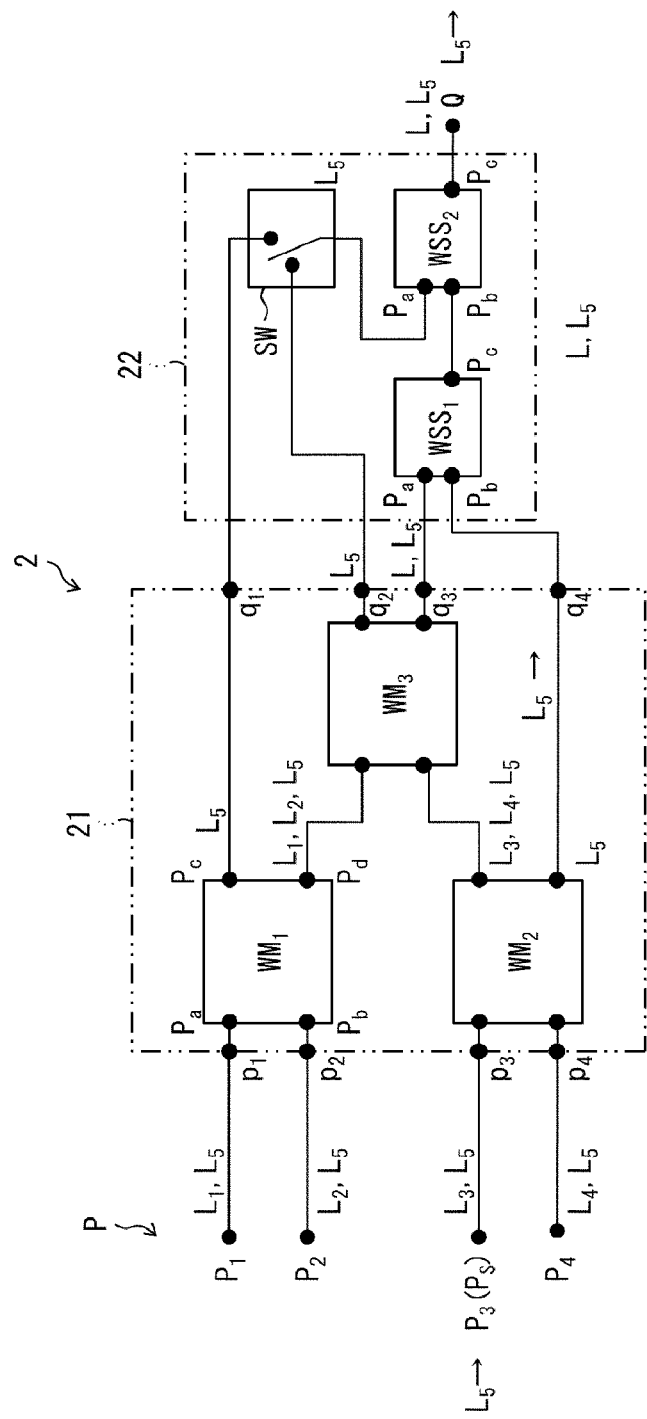
FIG. 9 is a block diagram illustrating an optical device in accordance with one or more embodiments of the present invention.

The following will describe an optical device 2 in accordance with one or more embodiments of the present invention with reference to FIG. 9. FIG. 9 is a block diagram illustrating the optical device 2. As illustrated in FIG. 9, the optical device 2 is an optical device including: a first port group P including n ports $P_i$ (i=1, 2, ..., n, wherein n=4 in one or more embodiments); a second port Q; and a wavelength multiplexer/demultiplexer 21 provided between the first port group P and the second port Q.

The wavelength multiplexer/demultiplexer 21, in a case where light beams $L_i$ of predetermined different n wavelengths $\lambda_i$ (i=1, 2, ..., n) corresponding to the respective ports $P_i$ have been inputted to the wavelength multiplexer/demultiplexer 21, combines the light beams $L_i$ into light L and outputs the light L to the second port Q. Further, the wavelength multiplexer/demultiplexer 21, in a case where light L' is inputted to the second port Q, separates the light L' into light beams $L'_i$ of the wavelengths $\lambda_i$ and outputs the light beams $L'_i$ to the corresponding ports $P_i$.

Further, the wavelength multiplexer/demultiplexer 21, in a case where light L', which is combined light of light beams $L'_1$, $L'_2$, $L'_3$, and $L'_4$ of predetermined different wavelengths $\lambda_1$, $\lambda_2$, $\lambda_3$, and $\lambda_4$, has been inputted to the second port Q, separates the light L' into the light beams $L'_1$, $L'_2$, $L'_3$, $L'_4$ and outputs the light beams $L'_1$, $L'_2$, $L'_3$, $L'_4$ to the corresponding ports $P_1$, $P_2$, $P_3$, and $P_4$.

Assume that one port selected from among the ports $P_i$ (the ports $P_1$, $P_2$, $P_3$, and $P_4$ in one or more embodiments) is a selected port $P_S$. The following description in one or more embodiments assumes that the port $P_3$ is the selected port $P_S$. The selected port $P_S$ is a port to which a light beam $L_i$ brought into correspondence with that port has not been inputted. That is, the following description in one or more embodiments takes, as an example, a case where the light beam $L_3$ has not been inputted to the port $P_3$.

The optical device 2 is configured such that a light beam $L_5$ of a wavelength $\lambda_5$, which is different from the wavelengths $\lambda_i$ ($\lambda_1$, $\lambda_2$, $\lambda_3$, and $\lambda_4$ in one or more embodiments), is inputted to the selected port $P_S$. The optical device 2 is configured such that in a case where the light beam $L_5$ has been inputted to the selected port $P_S$, the light beam $L_5$ is outputted to the second port Q, and in a case where a light beam $L'_5$ of a wavelength $\lambda_5$ has been inputted to the second port Q, the light beam $L'_5$ is outputted to the selected port $P_S$.

Note that FIG. 9 illustrates the flows of the light beams $L_1$ to $L_4$, light beam $L_5$, and light L from the first port group P toward the second port Q. However, flows of the light L', light beam $L'_5$, and light beams $L'_1$ to $L'_4$ from the second port Q toward the first port group P are similar to those of the light L, light beam $L_5$, and the light beams $L_1$ to $L_4$, respectively, except that the light L', light beam $L'_5$, and light beams $L'_1$ to $L'_4$ flow opposite to the directions of the flows of the light L, light beam $L_5$, and the light beams $L_1$ to $L_4$, respectively.

As described above, the optical device 2 has the same functions as those of the optical device 1 illustrated in FIG. 1. However, the optical device 2 achieves the same functions as those of the optical device 1 by using the configuration different from that of the optical device 1. The following description will discuss a more specific configuration of the optical device 2.

The optical device 2 further includes a switch group 22 which is provided between the wavelength multiplexer/demultiplexer 21 and the second port Q.

The wavelength multiplexer/demultiplexer 21 (1) has N ports $p_i$ (i=1, 2, ..., n) connected directly to the corresponding $P_i$ (i=1, 2, ..., n) and N ports $q_i$ (i=1, 2, ..., n) connected to the second port Q via the switch group 22. The wavelength multiplexer/demultiplexer 21, (2) in a case where the light beams $L_i$ have been inputted to the corresponding ports $P_i$, multiplexes the light beams $L_i$ to emit the light L and couples the light L to a predetermined port $q_Q$ of the ports $q_i$, (3) in a case where light L' has been inputted to the port $q_Q$, demultiplexes the light L' to emit light beams $L'_i$ of the wavelengths $\lambda_i$ and outputs the light beams to the corresponding ports $P_i$, and (4) selectively couples the light beam $L_5$ or $L'_5$ between the ports $p_i$ and the ports $q_i$.

The switch group 22, under control from an external member, couples the light beam $L_5$ or $L'_5$ between one port $q_i$ (i is any of 1, 2, ..., n) selectively coupled to the selected port $P_S$ and the second port Q.

The wavelength multiplexer/demultiplexer 21 includes a wavelength combiner $WM_1$, a wavelength combiner $WM_2$, and a wavelength combiner $WM_3$ (see FIG. 9). The wavelength combiners $WM_1$ to $WM_3$ are each configured in the same manner as in the wavelength combiner $WM_1$ illustrated in FIG. 3B. However, in the wavelength multiplexer/demultiplexer 21, each of the wavelength combiners $WM_1$ to $WM_3$ is used not as a 2:1 wavelength combiner but as a 2:2 wavelength combiner. Thus, in each of the wavelength combiners $WM_1$ to $WM_3$, the ports $P_a$ and $P_b$ are light entering ports, and the ports $P_c$ and $P_d$ are light exiting ports. In other words, in each of the wavelength combiners $WM_1$ to $WM_3$, there is no port which is used as a dummy port.

The ports $P_a$ and $P_b$ of the wavelength combiner $WM_1$ are connected to the above-described ports $p_1$ and $p_2$, respectively. The port $P_c$ of the wavelength combiner $WM_1$ constitutes the above-described port $q_1$. The port $P_d$ of the wavelength combiner $WM_1$ is connected to the port $P_a$ of the wavelength combiner $WM_3$.

The ports $P_a$ and $P_b$ of the wavelength combiner $WM_2$ are connected to the above-described ports $p_3$ and $p_4$, respectively. The port $P_c$ of the wavelength combiner $WM_2$ is connected to the port $P_b$ of the wavelength combiner $WM_3$. The port $P_d$ of the wavelength combiner $WM_2$ constitutes the above-described port $q_4$.

As described above, the ports $P_a$ and $P_b$ of the wavelength combiner $WM_3$ are connected to the port $P_d$ of the wavelength combiner $WM_1$ and the port $P_c$ of the wavelength combiner $WM_2$, respectively. The ports $P_a$ and $P_b$ of the wavelength combiner $WM_3$ constitute the above-described ports $q_2$ and $q_3$, respectively.

In the wavelength combiner $WM_1$, the optical path length difference $\Delta L_{15}$ between the optical path length $L_1$ and the optical path length $L_2$ is set such that, in a case where the light beam $L_1$ and the light beam $L_5$ are inputted to the port $P_b$, the wavelength combiner $WM_1$ couples the light beam $L_1$ between the port $P_b$ and the port $P_c$ and couples the light beam $L_5$ between the port $P_b$ and the port $P_d$. Thus, (1) the light beams $L_1$ and $L_5$ having entered the port $P_a$ via the port $p_1$ are caused to exit the port $P_d$, (2) the light beam $L_2$ having entered the port $P_b$ via the port $p_2$ is caused to exit the port $P_d$, and (3) the light beam $L_5$ having entered the port $P_b$ via the port $p_2$ is caused to exit the port $P_c$.

In the wavelength combiner $WM_2$, the optical path length difference between the optical path length $L_1$ and the optical path length $L_2$ is set such that the light beams $L_4$ and $L_5$ are transferred between the first waveguide $CO_1$ and the second waveguide $CO_2$, and the light beam $L_3$ is not transferred between the first waveguide $CO_1$ and the second waveguide $CO_2$. Thus, (1) the light beam $L_3$ having entered the port $P_a$ via the port $p_3$ is caused to exit the port $P_c$, (2) the light beam $L_5$ having entered the port $P_a$ via the port $p_3$ is caused to exit the port $P_d$, and (3) the light beams $L_4$ and $L_5$ having entered the port $P_b$ via the port $p_4$ are caused to exit the port $P_c$.

In the wavelength combiner $WM_3$, the optical path length difference between the optical path length $L_1$ and the optical path length $L_2$ is set such that the light beams $L_1$, $L_2$, and $L_5$ are transferred between the first waveguide $CO_1$ and the second waveguide $CO_2$, and the light beams $L_3$ and $L_4$ are not transferred between the first waveguide $CO_1$ and the second waveguide $CO_2$. Thus, (1) the light beams $L_1$, $L_2$, and $L_5$ having entered the port $P_a$ are caused to exit the port $P_d$, (2) the light beam $L_5$ having entered the port $P_b$ is caused to exit the port $P_c$, and (3) the light beams $L_3$ and $L_4$ having entered the port $P_b$ are caused to exit the port $P_d$.

The wavelength multiplexer/demultiplexer 21 configured as described above combines the light beams $L_1$ to $L_4$ having entered the ports $p_1$ to $p_4$, respectively, into light L and causes the light L to exit the port $q_3$ of the wavelength selective switch $WSS_i$ of the switch group 22. Further, the wavelength multiplexer/demultiplexer 21 causes the light beam $L_5$ having entered the port $p_1$ to exit the port $q_3$, causes the light beam $L_5$ having entered the port $p_2$ to exit the port $q_1$, causes the light beam $L_5$ having entered the port $p_3$ to exit the port $q_4$, and causes the light beam $L_5$ having entered the port $p_4$ to exit the port $q_2$.

Similarly, the light L' having entered the port $P_d$ of the wavelength combiner $WM_3$ is separated into the light beams $L_1$, $L_2$, $L_3$, and $L_4$ by the wavelength multiplexer/demultiplexer 21. The light beams $L_1$, $L_2$, $L_3$, and $L_4$ into which the light L' has been separated are caused to exit the ports $p_1$ to $p_4$ of the wavelength multiplexer/demultiplexer 21, respectively.

The switch group 22 includes a wavelength selective switch $WSS_i$, a wavelength selective switch $WSS_2$, and a switch SW (see FIG. 9). The wavelength selective switches $WSS_i$ and $WSS_2$ are each configured in the same manner as in the wavelength selective switch illustrated in FIG. 6A.

Note that, in FIG. 9, a port $P_a$ of the wavelength selective switch $WSS_i$ is illustrated on the left side of the wavelength selective switch $WSS_i$ (on the wavelength multiplexer/demultiplexer 21 side), a port $P_b$ of the wavelength selective switch $WSS_i$ is illustrated on the lower side of the wavelength selective switch $WSS_i$, and a port $P_c$ of the wavelength selective switch $WSS_i$ is illustrated on the right side of the wavelength selective switch $WSS_i$ (on the port Q side). Further, in FIG. 9, a port $P_a$ of the wavelength selective switch $WSS_2$ is illustrated on the upper side of the wavelength selective switch $WSS_2$, a port $P_b$ of the wavelength selective switch $WSS_2$ is illustrated on the left side of the wavelength selective switch $WSS_2$, and a port $P_c$ of the wavelength selective switch $WSS_2$ is illustrated on the right side of the wavelength selective switch $WSS_2$. In the wavelength selective switches $WSS_i$ and $WSS_2$, ports $P_d$ are dummy ports and are not illustrated in FIG. 9.

The ports $P_a$ and $P_b$ of the wavelength selective switch $WSS_i$ are connected to the ports $q_3$ and $q_4$ of the wavelength multiplexer/demultiplexer 21, respectively. The port $P_c$ of the wavelength selective switch $WSS_i$ is connected to the port $P_b$ of the wavelength selective switch $WSS_2$.

The wavelength selective switch $WSS_i$ causes combined light L of the light beams $L_1$ to $L_4$ which has entered the port $P_a$ to exit the port $P_c$, and switches, under control from an external member, between (1) causing the light beam $L_5$ having entered the port $P_a$ to exit the port $P_c$ and (2) causing the light beam $L_5$ having entered the port $P_b$ to exit the port $P_c$.

The port $P_a$ of the wavelength selective switch $WSS_2$ is connected to a light exiting port of the switch SW, the port $P_b$ of the wavelength selective switch $WSS_2$ is connected to the port $P_c$ of the wavelength selective switch $WSS_i$, and the port $P_c$ of the wavelength selective switch $WSS_2$ is connected to the port Q.

The wavelength selective switch $WSS_2$ causes the light L having entered the port $P_b$ to exit the port $P_c$ (i.e., to be outputted to the port Q), and switches, under control from an external member, between (1) causing the light beam $L_5$ having entered the port $P_a$ to exit the port $P_c$ and (2) causing the light beam $L_5$ having entered the port $P_b$ to exit the port $P_c$.

The switch SW has two light entering ports and one light exiting port. Hereinafter, the port connected to the port $q_1$ of the wavelength multiplexer/demultiplexer 21 is referred to as first light entering port, and the port connected to the port $q_2$ of the wavelength multiplexer/demultiplexer 21 is referred to as second light entering port.

The switch SW switches, under control from an external member, between (1) causing the light beam $L_5$ having entered the first light entering port to exit the light exiting port and (2) causing the light beam $L_5$ having entered the second light entering port to exit the light exiting port.

As illustrated in FIG. 9, in a case where the port $P_3$ is selected as the selected port $P_S$, under control from an external member, the wavelength selective switch $WSS_i$ causes the light beam $L_S$ having entered the port $P_b$ to exit the port $P_c$, and the wavelength selective switch $WSS_2$ causes the light beam $L_5$ having entered the port $P_b$ to exit the port $P_c$.

Although not illustrated in FIG. 9, (1) in a case where the port $P_1$ is selected as the selected port $P_S$, under control from an external member, the wavelength selective switch $WSS_i$ causes the light beam $L_5$ having entered the port $P_a$ to exit the port $P_c$, and the wavelength selective switch $WSS_2$ causes the light beam $L_5$ having entered the port $P_b$ to exit the port $P_c$, (2) in a case where the port $P_2$ is selected as the selected port $P_S$, under control from an external member, the switch SW causes the light beam $L_5$ having entered the first light entering port to exit the light exiting port, and the wavelength selective switch $WSS_2$ causes the light beam $L_5$ having entered the port $P_a$ to exit the port $P_c$, and (3) in a case where the port $P_4$ is selected as the selected port $P_S$, under control from an external member, the switch SW causes the light beam $L_5$ having entered the second light entering port to exit the light exiting port, and the wavelength selective switch $WSS_2$ causes the light beam $L_5$ having entered the port $P_a$ to exit the port $P_c$.

As described above, the optical device 2 is configured such that in a case where the light beam $L_5$ of the wavelength $\lambda_5$ different from the wavelengths $\lambda_i$ ($\lambda_1$, $\lambda_2$, $\lambda_3$, and $\lambda_4$ in one or more embodiments) has been inputted to the selected port $P_S$, the light beam $L_5$ is outputted to the second port Q, and in a case where the light beam $L'_5$ of the wavelength $\lambda_5$ has been inputted to the second port Q, the light beam $L'_5$ is outputted to the selected port $P_S$.

The optical device 2 enables elimination of an intersection of waveguides, as compared to the optical device 1 illustrated in FIG. 1. This is because the optical device 2, which includes no wavelength splitters $WD_1$ to $WD_4$ included in the optical device 1, enables elimination of branched waveguides. Consequently, the optical device 2 enables reduction in loss of the light beams $L_i$ and enables suppression of crosstalk between the light beams $L_i$ and the light beam $L_5$, as compared to the optical device 1.

Further, the optical device 2 enables reduction in number of optical components (wavelength combiners $WM_1$ to $WM_3$, wavelength selective switches $WSS_i$ and $WSS_2$, and switch SW) integrated in the vicinity of the surface of the substrate SUB, as compared to the optical device 1. Thus, the optical device 2 enables reduction in substrate size of the substrate SUB.

Even if the optical device 1 and the optical device 2 do not vary greatly in number of optical components, the optical components included in the optical device 2 are different in type from the optical components included in the optical device 1. Specifically, in the optical device 2, the light beams $L_i$ pass through the wavelength multiplexer/demultiplexer 21 and the wavelength selective switches $WSS_i$ and $WSS_2$. On the contrary, in the optical device 1, the light beams $L_i$ pass through the wavelength splitter $WD_i$, the wavelength multiplexer/demultiplexer 11, and the wavelength combiner WM. In a case where loss in the wavelength selective switches $WSS_i$ and $WSS_2$ is smaller than loss in the wavelength splitter $WD_i$ and the wavelength combiner WM, the optical device 2 enables reduction in loss of the light beams $L_i$, as compared to the optical device 1.

(Variation of Optical Device 2)

Figure 10:
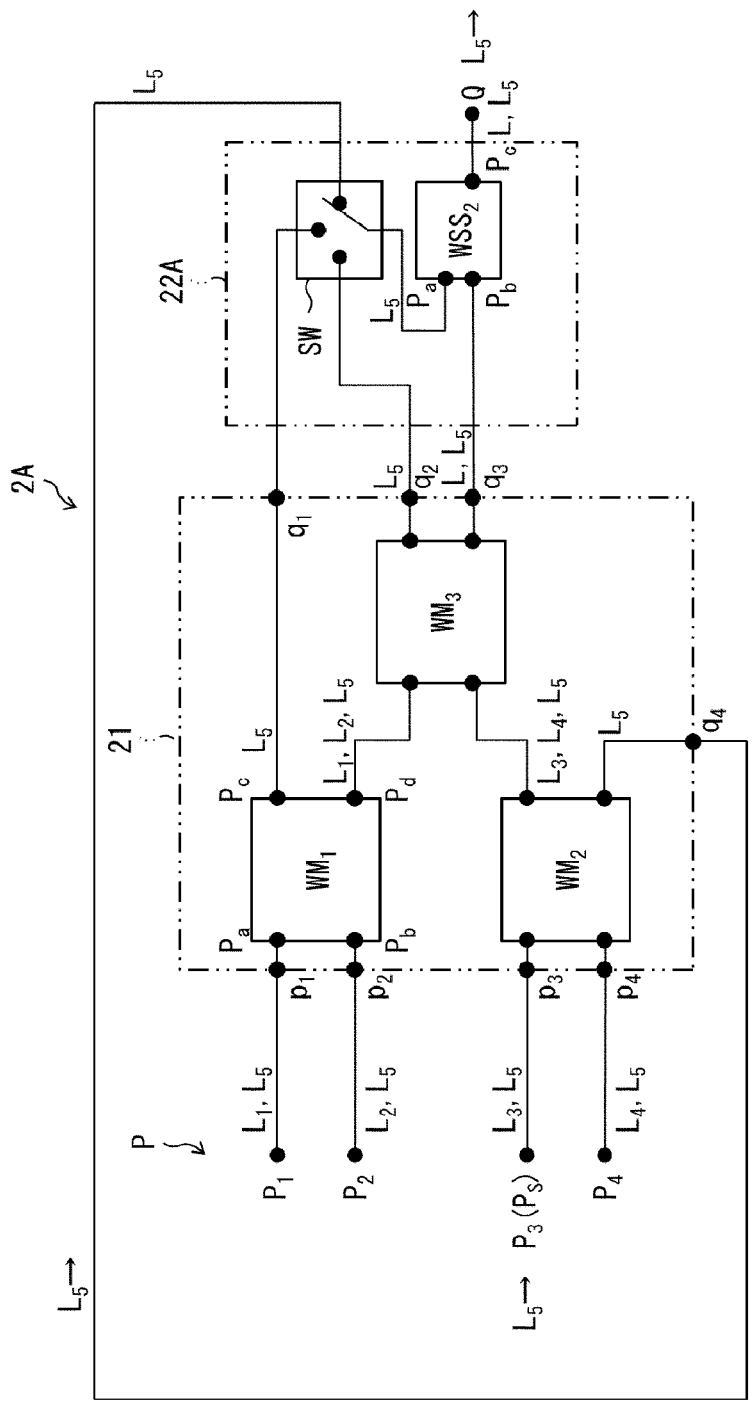
FIG. 10 is a block diagram illustrating a variation of the optical device illustrated in FIG. 9.

An optical device 2A, which is a variation of the optical device 2 illustrated in FIG. 9, will be described with reference to FIG. 10. FIG. 10 is a block diagram illustrating the optical device 2A. The optical device 2A is obtained, based on the configuration of the optical device 2, by making the following changes to the optical device 2: a change from the switch group 22 to a switch group 22A; and a change of a port connected to the port $q_4$ of the wavelength multiplexer/demultiplexer 21 to a third light entering port of the switch SW (see FIG. 10).

As illustrated in FIG. 10, the optical device 2A includes a wavelength multiplexer/demultiplexer 21 and a switch group 22A. The wavelength multiplexer/demultiplexer 21 is configured in the same manner as in the wavelength multiplexer/demultiplexer 21 of the optical device 2.

The switch group 22A is obtained by making the following changes to the switch group 22 of the optical device 2: (1) a removal of the wavelength selective switch $WSS_i$, and (2) an increase in number of light entering ports of the switch SW to three. That is, the switch SW includes three light entering ports, i.e. first to third light entering ports, and one light exiting port.

The first light entering port and the second light entering port of the switch SW are connected to the ports $q_1$ and $q_2$ of the wavelength multiplexer/demultiplexer 21, respectively. The third light entering port of the switch SW is connected to the port $q_4$ of the wavelength multiplexer/demultiplexer 21.

The switch SW switches, under control from an external member, among causing the light beam $L_5$ having entered the first light entering port to exit the light exiting port, causing the light beam $L_5$ having entered the second light entering port to exit the light exiting port, and causing the light beam $L_5$ having entered the third light entering port to exit the light exiting port.

The port $P_a$ of the wavelength selective switch $WSS_2$ is connected to the light exiting port of the switch SW. The port $P_b$ of the wavelength selective switch $WSS_2$ is connected to the port $q_3$ of the wavelength multiplexer/demultiplexer 21. The port $P_c$ of the wavelength selective switch $WSS_2$ is connected to the port Q.

The optical device 2A has the same functions as those of the optical device 2. However, the optical device 2A can omit the wavelength selective switch $WSS_i$, as compared to the optical device 2. That is, the optical device 2A can be simpler than the optical device 2. The fact that it is possible to reduce the number of optical components means that is it possible to suppress a total optical loss that can occur in the optical components. Thus, the optical device 2A can suppress an optical loss, as compared to the optical device 2.

(Variation of Optical Device 2A)

Figure 11:
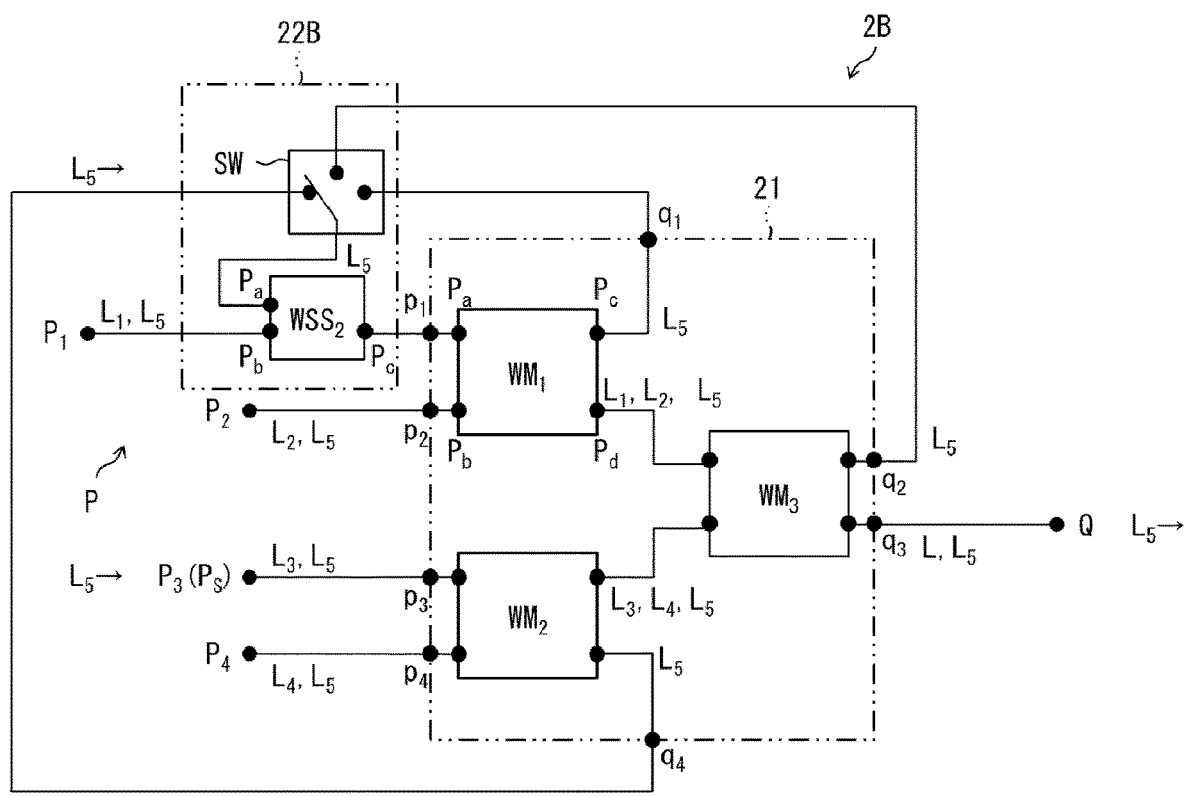
FIG. 11 is a block diagram illustrating another variation of the optical device illustrated in FIG. 9.

An optical device 2B, which is a variation of the optical device 2A illustrated in FIG. 10, will be described with reference to FIG. 11. FIG. 11 is a block diagram illustrating the optical device 2B. The optical device 2B is obtained, based on the configuration of the optical device 2A, by changing the placement of a switch group 22B (see FIG. 11). Note that the switch group 22B included in the optical device 2B is configured in the same manner as in the switch group 22A included in the optical device 2A. The switch group 22B is different from the switch group 22A only in that the switch group 22B is provided between a port $P_j$ (j is any of 1, 2, . . . , N; j=1 in this variation), which is any one of ports $P_i$, and a wavelength multiplexer/demultiplexer 21.

In FIG. 11, a first light entering port of a switch SW is illustrated on the right side of the switch SW, a second light entering port of the switch SW is illustrated on the upper side of the switch SW, and a third light entering port of the switch SW is illustrated on the left side of the switch SW.

Connections in the switch SW of the switch group 22B are the same as those in the switch SW of the switch group 22A. Specifically, in the switch SW of the switch group 22B, the first light entering port, the second light entering port, and the third light entering port are connected to the ports $q_1$ to $q_3$ of the wavelength multiplexer/demultiplexer 21, respectively, and a light exiting port is connected to the port $P_a$ of the wavelength selective switch $WSS_2$.

The switch SW and the wavelength selective switch $WSS_2$ in the switch group 22B are configured in the same manner as in the switch SW and the wavelength selective switch $WSS_2$ in the switch group 22A. However, the wavelength selective switch $WSS_2$ in the switch group 22B is different from the wavelength selective switch $WSS_2$ in the switch group 22A in that the ports $P_b$ and $P_c$ are connected to different ports.

In the wavelength selective switch $WSS_2$ in the switch group 22B, the port $P_b$ is connected to a port $P_1$, and the port $P_c$ is connected to the port $p_1$ of the wavelength multiplexer/demultiplexer 21.

As described above, the optical device 2B includes the switch group 22B which is provided between the port $P_1$ and the wavelength multiplexer/demultiplexer 21.

The wavelength multiplexer/demultiplexer 21 (1) has: N ports $p_i$ (i=1, 2, . . . , N) connected directly or via the above-described switch group to the ports $P_i$ (i=1, 2, . . . , N); and N ports $q_i$ (i=1, 2, . . . , N), (2) in a case where the light beams $L_i$ have been inputted to the corresponding ports $P_i$, multiplexes the light beams $L_i$ to emit light L and couples the light L to a predetermined port $q_Q$ of the ports $q_i$, (3) in a case where light L' has been inputted to the port $q_Q$, demultiplexes the light L' to emit light beams $L'_i$ of wavelengths $\lambda_i$ and outputs the light beams $L'_i$ to the corresponding ports $P_i$, and (4) selectively couples the light beam $L_5$ or $L'_5$ between the ports $p_i$ and the ports $q_i$ and couples the light beam $L_5$ or $L'_5$ between the port $p_j$, of the ports $p_i$, corresponding to the port $P_j$ and the port $q_Q$.

The switch group 22B, under control from an external member, couples the light beam $L_5$ or $L'_5$ between one port $q_i$ (i is any of 1, 2, . . . , N) selectively coupled to the selected port $P_S$ and the port $p_j$.

The optical device 2B configured as described above produces the same effect as the effect produced by the optical device 2A. Thus, the optical device 2B can output the light L to the port Q without causing the light beams $L_2$ to $L_4$ to pass through the switch group 22B (more specifically, the wavelength selective switch $WSS_2$). This allows the optical device 22B to have a reduced loss of the light beams $L_2$ to $L_4$, as compared to the optical device 22A.

(Power Consumption of Individual Optical Devices)

The above descriptions have discussed the optical device 1 illustrated in FIG. 1, the optical device 1A illustrated in FIG. 5, the optical device 2A illustrated in FIG. 10, and the optical device 2B illustrated in FIG. 11. Here, out of the optical components included in the optical devices 1, 1A, 2A, and 2B, the wavelength selective switches WSS (see FIG. 6) use the metal films $ML_1$, $ML_2$, and $ML_3$ as heaters, but the wavelength splitter $WD_i$ and the wavelength combiner $WM_i$ do not use such metal films. Thus, if importance is placed on low power consumption rather than on reduction in loss of the light beams $L_i$ and suppression of crosstalk between the light beams $L_i$ and the light beam $L_5$, the optical devices 1 and 1A are more suitable than the optical devices 2A and 2B.

Figure 12A:
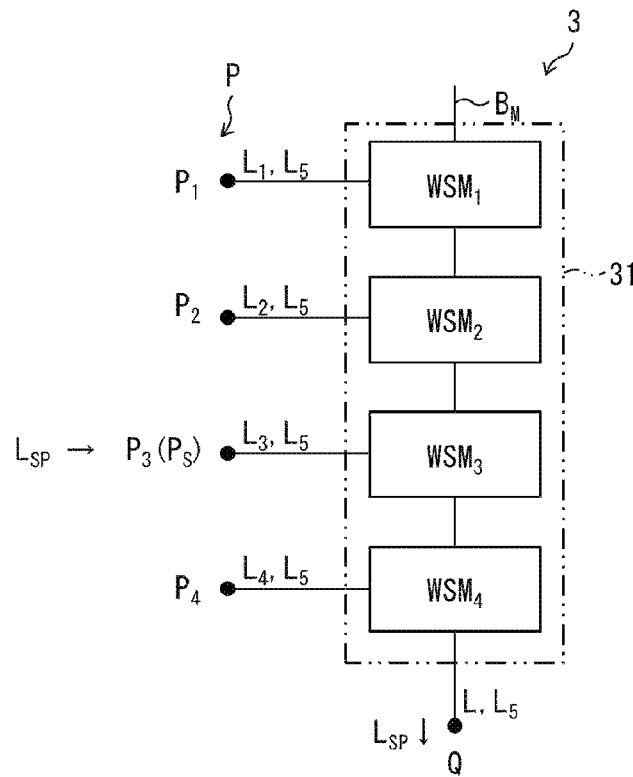
FIG. 12A is a block diagram illustrating an optical device in accordance with one or more embodiments of the present invention.
Figure 12B:
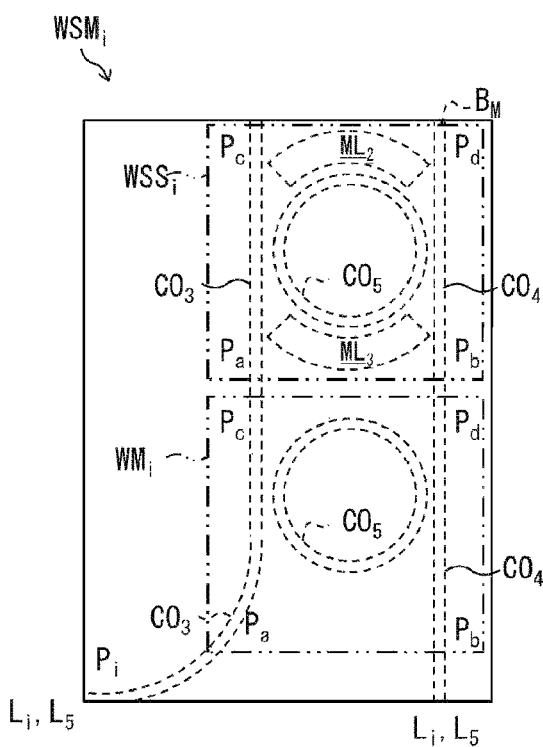
FIG. 12B is a plan view illustrating a wavelength selective combiner $WSM_i$ included in the optical device illustrated in FIG. 12A.
Figure 12C:
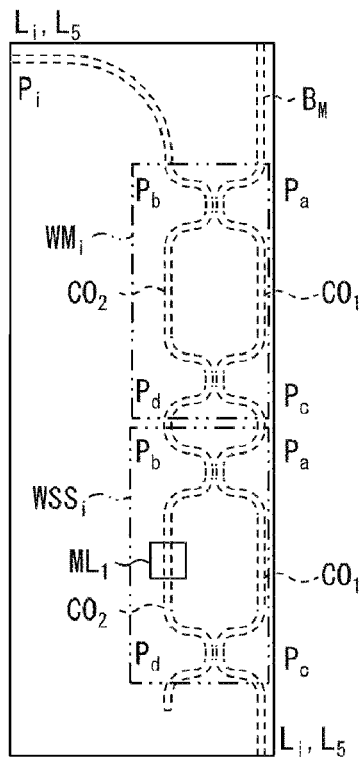
FIG. 12C is a plan view illustrating a variation of the wavelength selective combiner $WSM_i$ illustrated in FIG. 12B.

The following will describe an optical device 3 in accordance with one or more embodiments of the present invention with reference to FIGS. 12A to 12C. FIG. 12A is a block diagram illustrating the optical device 3. FIG. 12B is a plan view illustrating a wavelength selective combiner $WSM_i$ included in the optical device 3. FIG. 12C is a plan view illustrating a variation of the wavelength selective combiner $WSM_i$ illustrated in FIG. 12B. As illustrated in FIG. 12A, the optical device 3 is an optical device including: a first port group P including n ports $P_i$ (i=1, 2, . . . , n, wherein n=4 in one or more embodiments); a second port Q; and a wavelength multiplexer/demultiplexer 31 provided between the first port group P and the second port Q.

The wavelength multiplexer/demultiplexer 31, in a case where light beams $L_i$ of predetermined different n wavelengths $\lambda_i$ (i=1, 2, . . . , n) corresponding to the respective ports $P_i$ have been inputted to the wavelength multiplexer/demultiplexer 31, combines the light beams $L_i$ into light L and outputs the light L to the second port Q. Further, the wavelength multiplexer/demultiplexer 31, in a case where light L' has been inputted to the second port Q, separates the light L' into light beams $L'_i$ of the wavelengths $\lambda_i$ and outputs the light beams $L'_i$ to the corresponding ports $P_i$.

Further, the wavelength multiplexer/demultiplexer 31, in a case where light L', which is combined light of light beams $L'_1$, $L'_2$, $L'_3$, and $L'_4$ of predetermined different wavelengths $\lambda_1$, $\lambda_2$, $\lambda_3$, and $\lambda_4$, has been inputted to the second port Q, separates the light L' into the light beams $L'_1$, $L'_2$, $L'_3$, $L'_4$ and outputs the light beams $L'_1$, $L'_2$, $L'_3$, $L'_4$ to the corresponding ports $P_1$, $P_2$, $P_3$, and $P_4$.

Assume that one port selected from among the ports $P_i$ (the ports $P_1$, $P_2$, $P_3$, and $P_4$ in one or more embodiments) is a selected port $P_S$. The selected port $P_S$ is a port to which a light beam $L_i$ brought into correspondence with that port has not been inputted.

The optical device 3 is configured such that a light beam $L_5$ of a wavelength $\lambda_5$, which is different from the wavelengths $\lambda_i$ ($\lambda_1$, $\lambda_2$, $\lambda_3$, and $\lambda_4$ in one or more embodiments), is inputted to the selected port $P_S$. The optical device 3 is configured such that in a case where the light beam $L_5$ has been inputted to the selected port $P_S$, the light beam $L_5$ is outputted to the second port Q, and in a case where a light beam $L'_5$ of a wavelength $\lambda_5$ has been inputted to the second port Q, the light beam $L'_5$ is outputted to the selected port $P_S$.

Note that FIG. 12A illustrates the flows of only the light beams $L_1$ to $L_4$, light beam $L_5$, and light L from the first port group P toward the second port Q. However, flows of the light L', light beam $L'_5$, and light beams $L'_1$ to $L'_4$ from the second port Q toward the first port group P are similar to those of the light L, light beam $L_5$, and the light beams $L_1$ to $L_4$, respectively, except that the light L', light beam $L'_5$, and light beams $L'_1$ to $L'_4$ flow opposite to the directions of the flows of the light L, light beam $L_5$, and the light beams $L_1$ to $L_4$, respectively.

As described above, the optical device 3 has the same functions as those of the optical device 1 illustrated in FIG. 1 and those of the optical device 2 illustrated in FIG. 9. However, the optical device 3 achieves the same functions by using the configurations different from those of the optical devices 1 and 2. The following description will discuss a more specific configuration of the optical device 3.

As illustrated in FIG. 12A, the optical device 3 further includes a main bus $B_M$ one end of which constitutes the second port Q. N wavelength selective combiners $WSM_i$ (i=1, 2, . . . , n; n=4 in one or more embodiments) constituting the wavelength multiplexer/demultiplexer 31 are inserted in series with the main bus $B_M$.

The ports $P_i$ (i=1, 2, . . . , n) are connected directly to the corresponding wavelength selective combiners $WSM_i$.

Each of the wavelength selective combiners $WSM_i$ is constituted by a combination of a corresponding one of wavelength combiners $WM_i$ (i=1, 2, . . . , n) and a corresponding one of wavelength selective switches $WSS_i$ (i=1, 2, . . . , N) (see FIG. 12B). In one or more embodiments, the wavelength combiner $WM_i$ is configured as illustrated in FIG. 4B, and the wavelength selective switch $WSS_i$ is configured as illustrated in FIG. 6B.

As illustrated in FIG. 12B, the port $P_i$ is connected to a port $P_a$ of the wavelength combiner $WM_i$. The ports $P_c$ and $P_d$ of the wavelength combiner $WM_i$ are connected to the ports $P_a$ and $P_b$ of the wavelength selective switch $WSS_i$, respectively. The port $P_c$ of the wavelength selective switch $WSS_i$ is a dummy port. The port $P_b$ of the wavelength combiner $WM_i$ and the port $P_d$ of the wavelength selective switch $WSS_i$ are connected to the main bus $B_M$. Further, it can be said that a second waveguide $CO_4$ of the wavelength combiner $WM_i$ and a second waveguide $CO_4$ of the wavelength selective switch $WSS_i$ constitute part of the main bus $B_M$.

In the wavelength combiner $WM_i$, a circumferential length of a ring resonator $CO_5$ is set such that the light beam $L_i$ only is transferred between a first waveguide $CO_3$ and the second waveguide $CO_4$.

In the wavelength selective switch $WSS_i$, a circumferential length of a ring resonator $CO_5$ is set such that (1) in a case where the heater is not in operation, the light beams $L_1$ to $L_4$ and the light beam $L_5$ are not transferred between a first waveguide $CO_3$ and the second waveguide $CO_4$ under control from an external member, and (2) in a case where the heater is in operation, the light beam $L_5$ only is transferred between the first waveguide $CO_3$ and the second waveguide $CO_4$ under control from an external member.

To the port $P_i$, the light beam $L_i$ or the light beam $L_5$ is inputted. In a case where the light beam $L_i$ has been inputted to the port $P_i$, the wavelength combiner $WM_i$ couples the light beam $L_i$ having been propagated through the first waveguide $CO_3$ of the wavelength combiner $WM_i$ with respect to the second waveguide $CO_4$ of the wavelength combiner $WM_i$ via the ring resonator $CO_5$ of the wavelength combiner $WM_i$. The second waveguide $CO_4$ of the wavelength combiner $WM_i$ constitutes part of the main bus $B_M$. The light beam $L_i$ having been coupled to the main bus $B_M$ is outputted from the port $P_b$ of the wavelength combiner $WM_i$ and is then propagated through the main bus $B_M$ in a direction toward the second port Q.

In a case where the light beam $L_5$ has been inputted to the port $P_i$, the light beam $L_5$ passes through the first waveguide $CO_3$ of the wavelength combiner $WM_i$ and reaches the port $P_a$ of the wavelength selective switch $WSS_i$. In a case where the light beam $L_5$ is inputted to the port $P_i$, the heater of the wavelength selective switch $WSS_i$ is operated under control from an external member. Thus, the wavelength selective switch $WSS_i$ couples the light beam $L_5$ having been propagated through the wavelength combiner $WM_i$ and the wavelength selective switch $WSS_i$ with respect to the second waveguide $CO_4$ of the wavelength selective switch $WSS_i$ via the ring resonator $CO_5$ of the wavelength selective switch $WSS_i$. The second waveguide $CO_4$ of the wavelength selective switch $WSS_i$ constitutes part of the main bus $B_M$. The light beam $L_1$ having been coupled to the main bus $B_M$ is outputted from the port $P_b$ of the wavelength selective switch $WSS_i$, passes through the second waveguide $CO_4$ of the wavelength combiner $WM_1$, and is then propagated through the main bus $B_M$ in a direction toward the second port Q.

Further, in the wavelength selective combiner $WSM_i$ (i≥2), a light beam having been propagated through the second waveguides $CO_4$ of the wavelength selective switch $WSS_{i-1}$ and of the wavelength combiner $WM_{i-1}$, both of which constitute the wavelength selective combiner $WSM_{i-1}$, is inputted to the port $P_d$ of the wavelength selective switch $WSS_i$. For example, in the wavelength selective combiner $WSM_2$, the light beam $L_1$ or $L_5$ having been propagated through the wavelength selective switch $WSS_i$ and the wavelength combiner $WM_1$, both of which constitute the wavelength selective combiner $WSM_1$, is inputted to the port $P_d$ of the wavelength selective switch $WSS_2$. The light beam $L_1$ or $L_5$, without being coupled to the ring resonators $CO_5$ of the wavelength selective switch $WSS_2$ and of the wavelength combiner $WM_2$, is directly propagated through the second waveguides $CO_4$ in a direction toward the second port Q and is then outputted from the port $P_b$ of the wavelength selective combiner $WSM_2$. Note that the wavelength selective switch $WSS_i$, in accordance with whether the heater is in operation, selects whether or not to cause the light beam $L_5$ to be coupled between the first waveguide $CO_3$ and the second waveguide $CO_4$. In one or more embodiments, the wavelength selective switch $WSS_i$, in a case where the heater is in operation, causes the light beam $L_5$ to be coupled between the first waveguide $CO_3$ and the second waveguide $CO_4$. The wavelength selective switch $WSS_i$ configured as described above is configured such that, in a case where the heater is not in operation, the light beam $L_5$ having entered the port $P_d$ exits the port $P_b$ directly.

The wavelength selective combiner $WSM_2$ configured as described above combines the light beam $L_2$ or $L_5$ having entered the port $P_a$ of the wavelength combiner $WM_2$ and the light beam $L_1$ or $L_5$ having entered the port $P_d$ of the wavelength selective switch $WSS_2$, and then outputs two light beams of combined light beams $L_1$, $L_2$, and $L_5$ from the port $P_b$ of the wavelength combiner $WM_2$.

The wavelength selective combiners $WSM_3$ and $WSM_4$ function in the same manner as in the wavelength selective combiner $WSM_2$. Specifically, the wavelength selective combiner $WSM_3$ combines the light beam $L_3$ or $L_5$ having entered the port $P_a$ of the wavelength combiner $WM_3$ and two light beams of the light beams $L_1$, $L_2$, and $L_5$ having entered the port $P_d$ of the wavelength selective switch $WSS_3$, and then outputs three light beams of combined light beams $L_1$, $L_2$, $L_3$, and $L_5$ from the port $P_b$ of the wavelength combiner $WM_3$. Further, the wavelength selective combiner $WSM_4$ combines the light beam $L_4$ or $L_5$ having entered the port $P_a$ of the wavelength combiner $WM_4$ and three light beams of the light beams $L_1$, $L_2$, $L_3$, and $L_5$ having entered the port $P_d$ of the wavelength selective switch $WSS_4$, and then outputs three light beams of combined light beams $L_1$, $L_2$, $L_3$, $L_4$, and $L_5$ from the port $P_b$ of the wavelength combiner $WM_3$.

In the wavelength multiplexer/demultiplexer 31 including the wavelength selective combiners $WSM_1$ to $WSM_4$ configured as described above, (1) in a case where individual light beams $L_i$ have been inputted to the corresponding ports $P_i$, the wavelength combiners $WM_i$ couple the light beams $L_i$ to the main bus $B_M$ so that the wavelength multiplexer/demultiplexer 31 emits light L into which the light beams $L_i$ are multiplexed and outputs the light L to the second port Q, (2) in a case where the light L' has been inputted to the second port Q, the wavelength combiners $WM_i$ separate the light L' into light beams $L'_i$ so that the wavelength multiplexer/demultiplexer 31 emits the light beams $L'_i$ into which the light L' is demultiplexed and outputs the light beams $L'_i$ to the corresponding ports $P_i$, and (3) one of the wavelength selective switches $WSS_i$ (i is any of 1, 2, . . . , N) corresponding to the selected port $P_S$ couples the light beam $L_5$ or $L'_5$ between the selected port $P_S$ and the main bus $B_M$ under control from an external member.

In the example illustrated in FIG. 12A, the port $P_3$ is selected as the selected port $P_S$. Thus, (1) the wavelength selective combiner $WSM_1$ causes the light beam $L_1$ having been inputted to the port $P_1$ to be coupled to the main bus $B_M$ and propagates the light beam $L_1$ in a direction toward the second port Q, (2) the wavelength selective combiner $WSM_2$ causes the light beam $L_2$ having been inputted to the port $P_2$ to be coupled to the main bus $B_M$ and propagates the light beam $L_2$ in a direction toward the second port Q, (3) the wavelength selective combiner $WSM_3$ propagates the light beam $L_5$ having been inputted to the port $P_3$ in a direction toward the second port Q, and (4) the wavelength selective combiner $WSM_4$ causes the light beam $L_4$ having been inputted to the port $P_4$ to be coupled to the main bus $B_M$ and propagates the light beam $L_4$ in a direction toward the second port Q.

According to the optical device 3, it is possible to realize an optical device in accordance with one or more embodiments of the present invention with use of an optical waveguide in a bus form. Further, in the optical device 3, when viewed from the ports $P_i$, the wavelength combiners $WM_i$ are arranged at the front stage, and the wavelength selective switches $WSS_i$ are arranged at the rear stage. This allows the light beams $L_i$ to be coupled to the main bus $B_M$ without passing through the wavelength selective switches $WSS_i$ and thus enables reduction in loss of the light beams $L_i$.

(Variation of Wavelength Selective Combiner $WSM_i$)

A variation of the wavelength selective combiner $WSM_i$ can be configured as illustrated in FIG. 12C. The wavelength selective combiner $WSM_i$ in this variation includes a wavelength combiner $WM_i$ configured as illustrated in FIG. 3B and a wavelength selective switch $WSS_i$ configured as illustrated in FIG. 6A.

As illustrated in FIG. 12C, the port $P_i$ is connected to a port $P_b$ of the wavelength combiner $WM_i$. The ports $P_c$ and $P_d$ of the wavelength combiner $WM_i$ are connected to the ports $P_a$ and $P_b$ of the wavelength selective switch $WSS_i$, respectively. The port $P_c$ of the wavelength selective switch $WSS_i$ is a dummy port. The port $P_a$ of the wavelength combiner $WM_i$ and the port $P_d$ of the wavelength selective switch $WSS_i$ are connected to the main bus $B_M$. Further, it can be said that a first waveguide $CO_1$ of the wavelength combiner $WM_i$ and a first waveguide $CO_1$ of the wavelength selective switch $WSS_i$ constitute part of the main bus $B_M$.

In the wavelength combiner $WM_i$, the optical path length difference between the optical path length $L_1$ and the optical path length $L_2$ is set such that the light beam $L_i$ only is transferred between the first waveguide $CO_1$ and the second waveguide $CO_2$.

In the wavelength selective switch $WSS_i$, the optical path length difference between the optical path length $L_1$ and the optical path length $L_2$ is set such that (1) in a case where the heater is not in operation, the light beams $L_1$ to $L_4$ and the light beam $L_5$ are not transferred between the first waveguide $CO_1$ and the second waveguide $CO_2$ under control from an external member, and (2) in a case where the heater is in operation, the light beam $L_5$ only is transferred between the first waveguide $CO_1$ and the second waveguide $CO_2$ under control from an external member.

According to the wavelength selective combiner $WSM_i$ in this variation, it is possible to realize an optical device in accordance with one or more embodiments of the present invention with use of a lattice filter-type wavelength combiner $WM_i$ and a wavelength selective switch $WSS_i$. The lattice filter-type wavelength combiner $WM_i$ and the wavelength selective switch $WSS_i$ produce low loss, and it is thus possible to realize an optical device that produces low loss by employing the wavelength selective combiner $WSM_i$ in this variation.

Figure 13A:
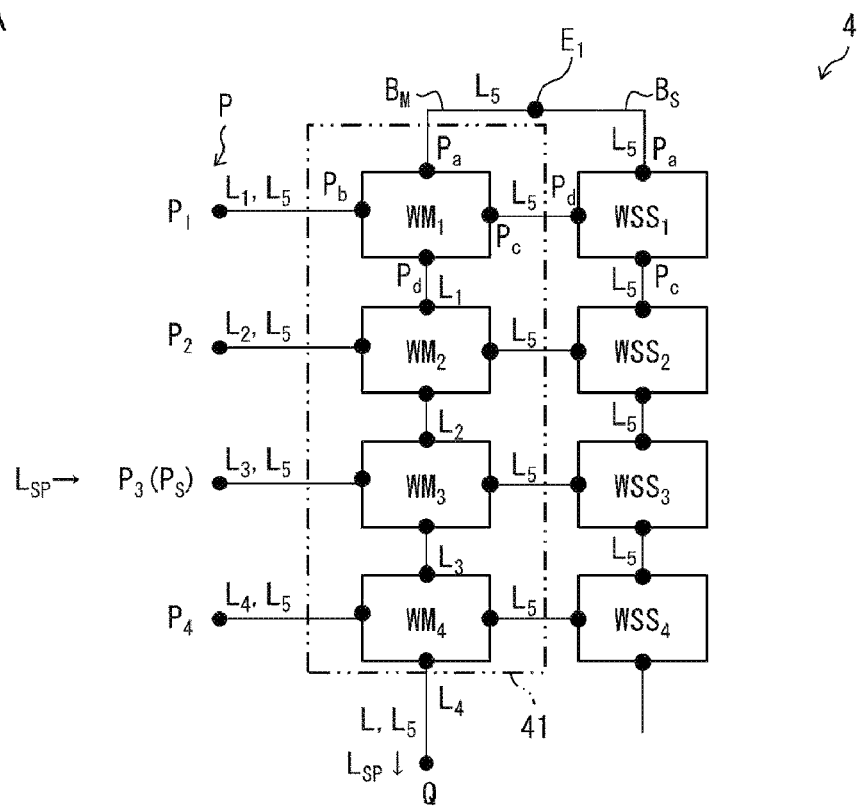
FIG. 13A is a block diagram illustrating an optical device in accordance with one or more embodiments of the present invention.
Figure 13B:
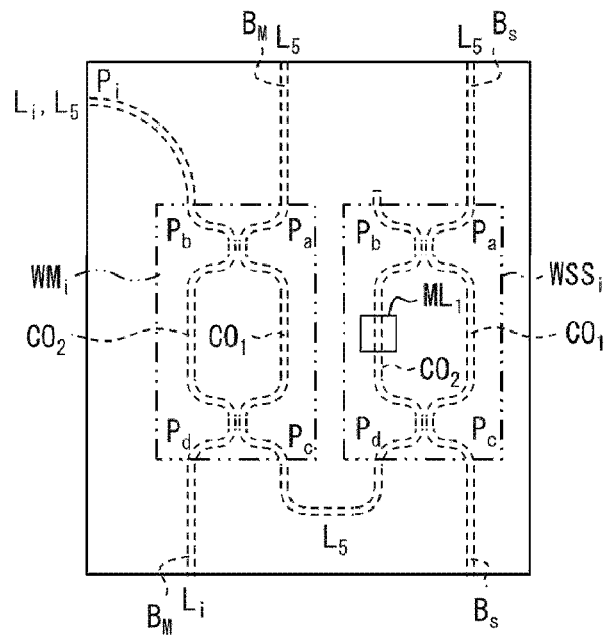
FIG. 13B is a plan view illustrating a wavelength combiner and a wavelength selective switch included in the optical device illustrated in FIG. 13A.

The following will describe an optical device 4 in accordance with one or more embodiments of the present invention with reference to FIGS. 13A and 13B. FIG. 13A is a block diagram illustrating the optical device 4. FIG. 13B is a plan view illustrating a wavelength combiner $WM_i$ and a wavelength selective switch $WSS_i$ both of which are included in the optical device 4. The optical device 4 is an optical device including: a first port group P including n ports $P_i$ (i=1, 2, ..., n, wherein n=4 in one or more embodiments); a second port Q; and a wavelength multiplexer/demultiplexer 41 provided between the first port group P and the second port Q.

The wavelength multiplexer/demultiplexer 41, in a case where light beams $L_i$ of predetermined different n wavelengths $\lambda_i$ (i=1, 2, ..., n) corresponding to the respective ports $P_i$ have been inputted to the wavelength multiplexer/demultiplexer 41, combines the light beams $L_i$ into light L and outputs the light L to the second port Q. Further, the wavelength multiplexer/demultiplexer 41, in a case where light has been inputted to the second port Q, separates the light L' into light beams $L'_i$ of the wavelengths $\lambda_i$ and outputs the light beams to the corresponding ports $P_i$.

Further, the wavelength multiplexer/demultiplexer 41, in a case where light L', which is combined light of light beams $L'_1$, $L'_2$, $L'_3$, and $L'_4$ of predetermined different wavelengths $\lambda_1$, $\lambda_2$, $\lambda_3$, and $\lambda_4$, has been inputted to the second port Q, separates the light L' into the light beams $L'_1$, $L'_2$, $L'_3$, $L'_4$ and outputs the light beams $L'_1$, $L'_2$, $L'_3$, $L'_4$ to the corresponding ports $P_1$, $P_2$, $P_3$, and $P_4$.

Assume that one port selected from among the ports $P_i$ (the ports $P_1$, $P_2$, $P_3$, and $P_4$ in one or more embodiments) is a selected port $P_S$. The selected port $P_S$ is a port to which a light beam $L_i$ brought into correspondence with that port has not been inputted.

The optical device 4 is configured such that a light beam $L_5$ of a wavelength $\lambda_5$, which is different from the wavelengths $\lambda_i$ ($\lambda_1$, $\lambda_2$, and $\lambda_4$ in one or more embodiments), is inputted to the selected port $P_S$.

The optical device 4 is configured such that in a case where the light beam $L_5$ has been inputted to the selected port $P_S$, the light beam $L_5$ is outputted to the second port Q, and in a case where a light beam $L'_5$ of a wavelength $\lambda_5$ has been inputted to the second port Q, the light beam $L'_5$ is outputted to the selected port $P_S$.

Note that FIG. 12 illustrates the flows of only the light beams $L_1$ to $L_4$, light beam $L_5$, and light L from the first port group P toward the second port Q. However, flows of the light L', light beam $L'_5$, and light beams $L'_1$ to $L'_4$ from the second port Q toward the first port group P are similar to those of the light L, light beam $L_5$, and the light beams $L_1$ to $L_4$, respectively, except that the light L', light beam $L'_5$, and light beams $L'_1$ to $L'_4$ flow opposite to the directions of the flows of the light L, light beam $L_5$, and the light beams $L_1$ to $L_4$, respectively.

As described above, the optical device 4 has the same functions as those of the optical device 1 illustrated in FIG. 1, those of the optical device 2 illustrated in FIG. 9, and those of the optical device 3 illustrated in FIG. 12. However, the optical device 4 achieves the same functions as those of the optical devices 1 to 3 by using the configuration different from the configurations of the optical devices 1 to 3. The following description will discuss a more specific configuration of the optical device 4.

As illustrated in FIG. 13A, the optical device 4 further includes a main bus $B_M$ and a secondary bus $B_S$. The main bus $B_M$ has one end which constitutes the second port Q. Further, n wavelength combiners $WM_i$ (i=1, 2, ..., n) constituting the wavelength multiplexer/demultiplexer 41 are inserted in series with the main bus $B_M$.

The secondary bus $B_S$ is arranged in parallel to the main bus $B_M$. Wavelength selective switches $WSS_i$ (i=1, 2, ..., n) connected to the corresponding wavelength combiners $WM_i$ (i=1, 2, ..., n) are inserted in series with the secondary bus $B_S$.

The secondary bus $B_S$ has a first end $E_1$ which is connected to a subsequent stage (another end of the main bus $B_M$) of the wavelength multiplexer/demultiplexer 41 when viewed from the second port Q side. Ports $P_i$ are connected directly to the corresponding wavelength combiners $WM_i$.

Each of the wavelength combiners $WM_i$ (1) couples the light beam $L_i$ or $L'_i$ between a corresponding one of the ports $P_i$ and the main bus and (2) couples the light beam $L_5$ or $L'_5$ between a corresponding one of the ports $P_i$ and a corresponding one of the wavelength selective switches $WSS_i$.

Each of the wavelength selective switches $WSS_i$, when selected under control from an external member, couples the light beam $L_5$ or $L'_5$ between a corresponding one of the wavelength combiners $WM_i$ and the secondary bus.

In the wavelength multiplexer/demultiplexer 41, in a case where the light beams $L_i$ have been inputted to the corresponding ports $P_i$, the wavelength combiners $WM_i$ couple the light beams $L_i$ to the main bus so that the wavelength multiplexer/demultiplexer 41 emits light L into which the light beams $L_i$ are multiplexed and outputs the light L to the second port Q. Further, in the wavelength multiplexer/demultiplexer 41, in a case where the light L' has been inputted to the second port Q, the wavelength combiners $WM_i$ separate the light beams L' into light beams $L'_i$ so that the wavelength multiplexer/demultiplexer 41 emits the light beams $L'_i$ into which the light L' is demultiplexed and outputs the light beams $L'_i$ to the corresponding ports $P_i$.

One of the wavelength selective switches $WSS_i$ (i is any of 1, 2, ..., n) connected to a corresponding one of the wavelength combiners $WM_i$ (i is any of 1, 2, ..., n) corresponding to the selected port $P_S$ couples the light beam $L_5$ or $L'_5$ between the corresponding one of the wavelength combiners $WM_i$ and the secondary bus under control from an external member.

Further, the wavelength multiplexer/demultiplexer 41 couples the light beam $L_5$ or $L'_5$ between the first end $E_1$ of the secondary bus $B_S$ and the second port Q.

In one or more embodiments, the wavelength combiner $WM_i$ is configured as illustrated in FIG. 3B, and the wavelength selective switch $WSS_i$ is configured as illustrated in FIG. 6A.

In the wavelength combiner $WM_i$, an optical path length difference $\Delta L_{i5}$, which is a difference between the optical path length $L_1$ of the first waveguide $CO_1$ and the optical path length $L_2$ of the second waveguide $CO_2$, is set such that the distribution ratio between the port $P_c$ and the port $P_d$ is approximately 0:100 with respect to the light beam $L_1$ having entered the port $P_b$, and the distribution ratio between the port $P_c$ and the port $P_d$ is approximately 100:0 with respect to the light beam $L_5$ having entered the port $P_b$. In the wavelength combiner $WM_i$ configured as above, the distribution ratio between the port $P_c$ and the port $P_d$ is approximately 0:100 with respect to the light beam $L_5$ having entered the port $P_a$.

In the wavelength selective switch $WSS_i$, the optical path length difference between the optical path length $L_1$ and the optical path length $L_2$ is set such that (1) in a case where the heater is not in operation, the light beam $L_5$ is not transferred between the first waveguide $CO_1$ and the second waveguide $CO_2$ under control from an external member, and (2) in a case where the heater is in operation, the light beam $L_5$ only is transferred between the first waveguide $CO_1$ and the second waveguide $CO_2$ under control from an external member. In other words, in the wavelength selective switch $WSS_i$, the optical path length difference between the optical path length $L_1$ and the optical path length $L_2$ is set such that (1) in a case where the heater is not in operation, the light beam $L_5$ is coupled between the port $P_b$ and the port $P_d$ and between the port $P_a$ and the port $P_c$, and (2) in a case where the heater is in operation, the light beam $L_5$ is coupled between the port $P_a$ and the port $P_d$ and between the port $P_b$ and the port $P_c$.

As illustrated in FIG. 13B, the port $P_i$ is connected to the port $P_b$ of the wavelength combiner $WM_i$. As illustrated in FIG. 13A, the port $P_c$ of the wavelength combiner $WM_i$ is connected to the port $P_d$ of the wavelength selective switch $WSS_i$. The port $P_b$ of each of the wavelength selective switches $WSS_i$ is a dummy port. Thus, in FIG. 13A, the port $P_b$ of the wavelength selective switch $WSS_i$ is not illustrated. The ports $P_a$ and $P_d$ of each of the wavelength combiners $WM_i$ are connected to the main bus $B_M$. The ports $P_a$ and $P_c$ of each of the wavelength selective switches $WSS_i$ are connected to the secondary bus $B_S$. Note that, in FIG. 13A, alphabetic suffixes on the individual ports of the wavelength combiner $WM_i$ and the wavelength selective switch $WSS_i$ are illustrated only in a case where i=1, and the alphabetic suffixes are not illustrated in cases where i=2 to 4.

To the port $P_i$, the light beam $L_i$ or the light beam $L_5$ is inputted. In a case where the light beam $L_i$ has been inputted to the port $P_i$, the wavelength combiner $WM_i$ outputs the light beam $L_i$ having been inputted to the port $P_b$ to the port $P_d$. The light beam $L_i$ having been outputted to the port $P_d$ is propagated through the main bus $B_M$ in a direction toward the second port Q.

In a case where the light beam $L_5$ has been inputted to the port $P_i$, the wavelength combiner $WM_i$ outputs the light beam $L_5$ having been inputted to the port $P_b$ to the port $P_c$. The light beam $L_5$ having been outputted from the port $P_c$ of the wavelength combiner $WM_i$ is inputted to the port $P_d$ of the wavelength selective switch $WSS_i$. In a case where the light beam $L_5$ is inputted to the port $P_i$, the heater of the wavelength selective switch $WSS_i$ is operated under control from an external member. Thus, the wavelength selective switch $WSS_i$ outputs the light beam $L_5$ having been inputted to the port $P_d$ to the port $P_a$. The light beam $L_5$ having been outputted from the port $P_a$ of the wavelength selective switch $WSS_i$ is propagated through the secondary bus $B_S$ in a direction toward the first end $E_1$ of the secondary bus $B_S$.

In a case where the light beam $L_i$ is inputted to the port $P_i$, the heater of the wavelength selective switch $WSS_i$ is not operated under control from an external member. In this case, the wavelength selective switch $WSS_i$ outputs the light beam $L_5$ having been inputted to the port $P_c$ to the port $P_a$. Further, in a case where the light beam $L_i$ is inputted to the port $P_i$, the light beam $L_5$ is not inputted to the port $P_d$ of the wavelength selective switch $WSS_i$. However, if the light beam $L_5$ is inputted to the port $P_d$, the wavelength selective switch $WSS_i$ outputs the light beam $L_5$ to the port $P_b$ which is a dummy port.

The wavelength selective switch $WSS_i$ configured as described above, (1) in a case where the light beam $L_5$ is inputted to the port $P_i$, couples the light beam $L_5$ between the port $P_d$ and the port $P_a$, and, (2) in a case where the light beam $L_i$ is inputted to the port $P_i$, couples the light beam $L_5$ between the port $P_c$ and the port $P_a$. In either case, the wavelength selective switch $WSS_i$ leads the light beam $L_5$ toward the first end $E_1$ of the secondary bus $B_S$.

The light beam $L_5$ having been inputted to the main bus $B_M$ through the first end $E_1$ of the secondary bus $B_S$ reaches the port $P_a$ of the wavelength combiner $WM_1$. As described earlier, the wavelength combiner $WM_1$ transfers the light beam $L_5$ between the first waveguide $CO_1$ and the second waveguide $CO_2$. Thus, the wavelength combiner $WM_1$ combines the light beam $L_5$ having been inputted to the port $P_a$ and the light beam $L_1$ having been inputted to the port $P_b$ and outputs the combined light beams $L_1$ and $L_5$ from the port $P_d$.

The wavelength combiners $WM_i$ where i=2 to 4 function in the same manner as in the wavelength combiner $WM_1$. Specifically, the wavelength selective combiner $WSM_2$ combines the light beam $L_2$ or $L_5$ having been inputted to the port $P_b$ with at least one of the light beams $L_1$ and $L_5$ having been inputted to the port $P_a$ and outputs two or three light beams of the combined light beams $L_1$, $L_2$, and $L_5$ from the port $P_d$. Further, the wavelength selective combiner $WSM_3$ combines the light beam $L_3$ or $L_5$ having been inputted to the port $P_b$ with two or three light beams of the light beams $L_1$, $L_2$, and $L_5$ having been inputted to the port $P_a$ and outputs three or four light beams of the combined light beams $L_1$, $L_2$, $L_3$, and $L_5$ from the port $P_d$. Further, the wavelength selective combiner $WSM_4$ combines the light beam $L_4$ or $L_5$ having been inputted to the port $P_b$ with three or four light beams of the light beams $L_1$, $L_2$, $L_3$, and $L_5$ having been inputted to the port $P_a$ and outputs four light beams of the combined light beams $L_1$, $L_2$, $L_3$, $L_4$, and $L_5$ from the port $P_d$.

In the wavelength multiplexer/demultiplexer 41 configured as described above, (1) in a case where individual light beams $L_i$ have been inputted to the corresponding ports $P_i$, the wavelength combiners $WM_i$ couple the light beams $L_i$ to the main bus so that the wavelength multiplexer/demultiplexer 41 emits light L into which the light beams $L_i$ are multiplexed and outputs the light L to the second port Q, (2) in a case where light L' has been inputted to the second port Q, the wavelength combiners $WM_i$ separate the light L' into light beams $L'_i$ so that the wavelength multiplexer/demultiplexer 41 emits the light beams $L'_i$ into which the light L' is demultiplexed and outputs the light beams $L'_i$ to the corresponding ports $P_i$, and the wavelength selective switch $WSS_i$ (i is any of 1, 2, . . . , n) connected to the wavelength combiner $WM_i$ (i is any of 1, 2, . . . , n) corresponding to the selected port $P_S$ couples the light beam $L_5$ or $L'5$ between the wavelength combiner $WM_i$ and the secondary bus $B_S$ under control from an external member.

In the example illustrated in FIG. 13A, the port $P_3$ is selected as the selected port $P_S$. Thus, (1) the wavelength combiner $WM_1$ causes the light beam $L_1$ having been inputted to the port $P_1$ to be coupled to the main bus $B_M$ and propagates the light beam $L_1$ in a direction toward the second port Q, (2) the wavelength combiner $WM_2$ causes the light beam $L_2$ having been inputted to the port $P_2$ to be coupled to the main bus $B_M$ and propagates the light beam $L_2$ in a direction toward the second port Q, (3) the wavelength combiner $WM_3$ causes the light beam $L_5$ having been inputted to the port $P_3$ to be outputted to the wavelength selective switch $WSS_3$, (4) the wavelength selective switch $WSS_3$ causes the light beam $L_5$ having been inputted from the wavelength combiner $WM_3$ to be coupled to the secondary bus $B_S$ and propagates the light beam $L_5$ in a direction toward the first end $E_1$ of the secondary bus $B_S$, (5) the wavelength combiner $WM_4$ causes the light beam $L_4$ having been inputted to the port $P_4$ to be coupled to the main bus $B_M$ and propagates the light beam $L_4$ in a direction toward the second port Q, and (6) each of the wavelength combiners $WM_1$ to $WM_4$ causes the light beam $L_5$ having been inputted from the first end $E_1$ of the secondary bus $B_S$ to the main bus $B_M$ to be propagated in a direction toward the second port Q.

As described above, the optical device 4 further includes: the main bus $B_M$ with which the wavelength selective combiners $WSM_i$ are inserted in series; and the secondary bus $B_S$ with which the wavelength selective switches $WSS_i$ are inserted in series. The main bus $B_M$ and the secondary bus $B_S$ are arranged in parallel to each other. Besides, the main bus $B_M$ guides at least the light beams $L_i$, and the secondary bus $B_S$ guides the light beam $L_5$ in a direction toward the second port Q.

Unlike the optical device 3 illustrated in FIG. 12, the optical device 4 configured as above eliminates the need to cause the light beams $L_i$ to pass through the wavelength selective switches $WSS_i$, which are inserted in series with the main bus $B_M$, in the way to the second port Q, and thus enables reduction in loss of the light beams $L_i$. This makes it possible to reduce power of, for example, an optical source which emits the light beam $L_5$, thus enabling reduction in power consumption.

In the optical device 3, the wavelength combiners $WM_i$ and the wavelength selective switches $WSS_i$ are inserted with the main bus $B_M$. On the contrary, in the optical device 4, only the wavelength combiners $WM_i$ are inserted with the main bus $B_M$, while the wavelength selective switches $WSS_i$ are inserted with the secondary bus $B_S$ (not inserted with the main bus $B_M$). Consequently, the optical device 4 enables reduction in crosstalk between the light beam $L_i$ and the light beam $L_5$, as compared to the optical device 3.

(Variation of Optical Device 4)

Figure 14A:
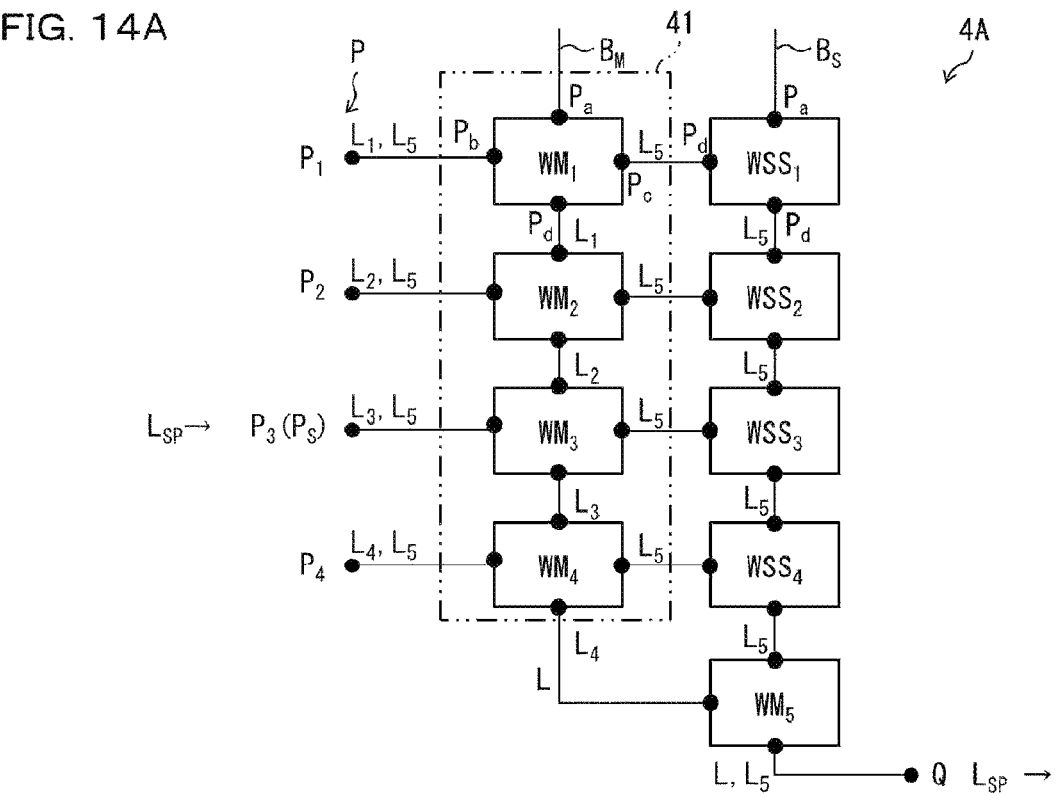
FIG. 14A is a block diagram illustrating a variation of the optical device illustrated in FIG. 13.
Figure 14B:
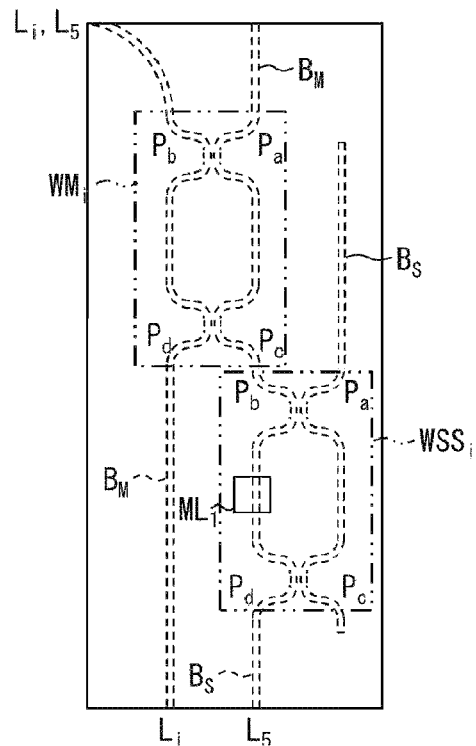
FIG. 14B is a plan view illustrating a wavelength combiner and a wavelength selective switch included in the optical device illustrated in FIG. 14A.

An optical device 4A, which is a variation of the optical device 4 illustrated in FIG. 13, will be described with reference to FIG. 14. FIG. 14A is a block diagram illustrating the optical device 4A. FIG. 14B is a plan view illustrating a wavelength combiner $WM_i$ and a wavelength selective switch $WSS_i$ both of which are included in the optical device 4A. The optical device 4A, like the optical device 4, is an optical device including: a first port group P including n ports $P_i$ (i=1, 2, . . . , n, wherein n=4 in one or more embodiments); a second port Q; and a wavelength multiplexer/demultiplexer 41A provided between the first port group P and the second port Q.

The optical device 4A further includes a wavelength combiner $WM_5$ which is provided between the wavelength multiplexer/demultiplexer 41 and the second port Q.

In the optical device 4, the first end $E_1$ of the secondary bus $B_S$ is connected to the subsequent stage (another end of the main bus $B_M$) of the wavelength multiplexer/demultiplexer 41 when viewed from the second port Q side. On the contrary, in the optical device 4A, a first end of the secondary bus $B_S$ is connected to the wavelength combiner $WM_5$ arranged at a preceding stage of the wavelength multiplexer/demultiplexer 41 when viewed from the second port Q side (see FIG. 14A).

The wavelength combiner $WM_5$ couples the light beam $L_i$ between the wavelength multiplexer/demultiplexer 41 and the second port Q, and couples the light beam $L_5$ or $L'_5$ between the secondary bus and the second port Q.

Note that, in FIG. 14A, a port $P_a$ of the wavelength combiner $WM_i$ is illustrated on the upper side of the wavelength combiner $WM_i$, a port $P_b$ of the wavelength combiner $WM_i$ is illustrated on the left side of the wavelength combiner $WM_i$, a port $P_c$ of the wavelength combiner $WM_i$ is illustrated on the right side of the wavelength combiner $WM_i$, and a port $P_d$ of the wavelength combiner $WM_i$ is illustrated on the lower side of the wavelength combiner $WM_i$. A port $P_c$ of the wavelength combiner $WM_5$ is a dummy port and is thus not illustrated in FIG. 14A.

Further, in FIG. 14A, a port $P_a$ of the wavelength selective switch $WSS_i$ is illustrated on the upper side of the wavelength selective switch $WSS_i$, a port $P_b$ of the wavelength selective switch $WSS_i$ is illustrated on the left side of the wavelength selective switch $WSS_i$, and a port $P_d$ of the wavelength selective switch $WSS_i$ is illustrated on the lower side of the wavelength selective switch $WSS_i$. A port $P_c$ of the wavelength selective switch $WSS_i$ is a dummy port and is thus not illustrated in FIG. 14A.

Note that, in FIG. 14A, alphabetic suffixes on the individual ports of the wavelength combiner $WM_i$ and the wavelength selective switch $WSS_i$ are illustrated only in a case where i=1, and the alphabetic suffixes are not illustrated in cases where i=2 to 4.

In each wavelength combiner $WM_i$, the port $P_b$ is connected to a corresponding port $P_i$, the port $P_c$ is connected to the port $P_b$ of the wavelength selective switch $WSS_i$, and the ports $P_a$ and $P_d$ are connected to the main bus $B_M$ (see FIG. 14B).

In each wavelength selective switch $WSS_i$, the ports $P_a$ and $P_d$ are connected to the secondary bus $B_S$, and the port $P_b$ is connected to the port $P_c$ of the wavelength combiner $WM_i$ (see FIG. 14B).

In the wavelength combiner $WM_1$, the optical path length difference between the optical path length $L_1$ and the optical path length $L_2$ is set such that the light beam $L_1$ is not transferred between the first waveguide $CO_1$ and the second waveguide $CO_2$, and the light beam $L_5$ is transferred between the first waveguide $CO_1$ and the second waveguide $CO_2$.

In the wavelength combiner $WM_2$, the optical path length difference between the optical path length $L_1$ and the optical path length $L_2$ is set such that the light beam $L_2$ is not transferred between the first waveguide $CO_1$ and the second waveguide $CO_2$, and the light beams $L_1$ and $L_5$ are transferred between the first waveguide $CO_1$ and the second waveguide $CO_2$.

In the wavelength combiner $WM_3$, the optical path length difference between the optical path length $L_1$ and the optical path length $L_2$ is set such that the light beam $L_3$ is not transferred between the first waveguide $CO_1$ and the second waveguide $CO_2$, and the light beams $L_1$, $L_2$, and $L_5$ are transferred between the first waveguide $CO_1$ and the second waveguide $CO_2$.

In the wavelength combiner $WM_4$, the optical path length difference between the optical path length $L_1$ and the optical path length $L_2$ is set such that the light beam $L_4$ is not transferred between the first waveguide $CO_1$ and the second waveguide $CO_2$, and the light beams $L_1$, $L_2$, $L_3$, and $L_5$ are transferred between the first waveguide $CO_1$ and the second waveguide $CO_2$.

In the wavelength combiner $WM_5$, the optical path length difference between the optical path length $L_1$ and the optical path length $L_2$ is set such that the light beams $L_1$, $L_2$, $L_3$, and $L_4$ are not transferred between the first waveguide $CO_1$ and the second waveguide $CO_2$, and the light beam $L_5$ is transferred between the first waveguide $CO_1$ and the second waveguide $CO_2$.

In the wavelength selective switch $WSS_i$, the optical path length difference between the optical path length $L_1$ and the optical path length $L_2$ is set such that (1) in a case where the heater is not in operation, the light beams $L_1$ to $L_4$ and the light beam $L_5$ are not transferred between the first waveguide $CO_1$ and the second waveguide $CO_2$ under control from an external member, and (2) in a case where the heater is in operation, the light beam $L_5$ only is transferred between the first waveguide $CO_1$ and the second waveguide $CO_2$ under control from an external member.

In the optical device 4A, the main bus $B_M$ is connected to a port $P_a$ located at the upper right of the wavelength combiner $WM_i$ and to a port $P_d$ located at the lower left thereof. Similarly, the secondary bus $B_S$ is connected to a port $P_a$ located at the upper right of the wavelength selective switch $WSS_i$ and to a port $P_d$ located at the lower left thereof. This allows a waveguide connecting between a port $P_c$ located at the lower right of the wavelength combiner $WM_i$ and a port $P_b$ located at the upper left of the wavelength selective switch $WSS_i$ to be arranged so as not to cross other waveguides (e.g., the main bus $B_M$ and the secondary bus $B_S$). Thus, the optical device 4A enables reduction in loss.

Further, in the optical device 4 illustrated in FIG. 13, since the first end $E_1$ of the secondary bus $B_S$ is connected directly to the subsequent stage of the wavelength combiners $WM_1$ to $WM_4$ when viewed from the second port Q side, the light beam $L_5$ having been inputted from the secondary bus $B_S$ to the main bus $B_M$ propagates the main bus $B_M$ with which the wavelength combiners $WM_1$ to $WM_4$ are inserted in series and then reaches the second port Q.

On the contrary, in the optical device 4A, the first end of the secondary bus $B_S$ is connected to the wavelength combiner $WM_5$ arranged at the preceding stage of the wavelength combiners $WM_1$ to $WM_4$ when viewed from the second port Q side. Thus, the light beam $L_5$ having been inputted from the secondary bus $B_S$ to the main bus $B_M$ reaches the second port Q without propagating through portions of the main bus $B_M$ where the wavelength combiners $WM_1$ to $WM_4$ are inserted in series with the main bus $B_M$. This allows the optical device 4A to reduce loss of the light beam $L_5$. This makes it possible to reduce power of, for example, an optical source which emits the light beam $L_5$, and thus enables reduction in power consumption.

Figure 15:
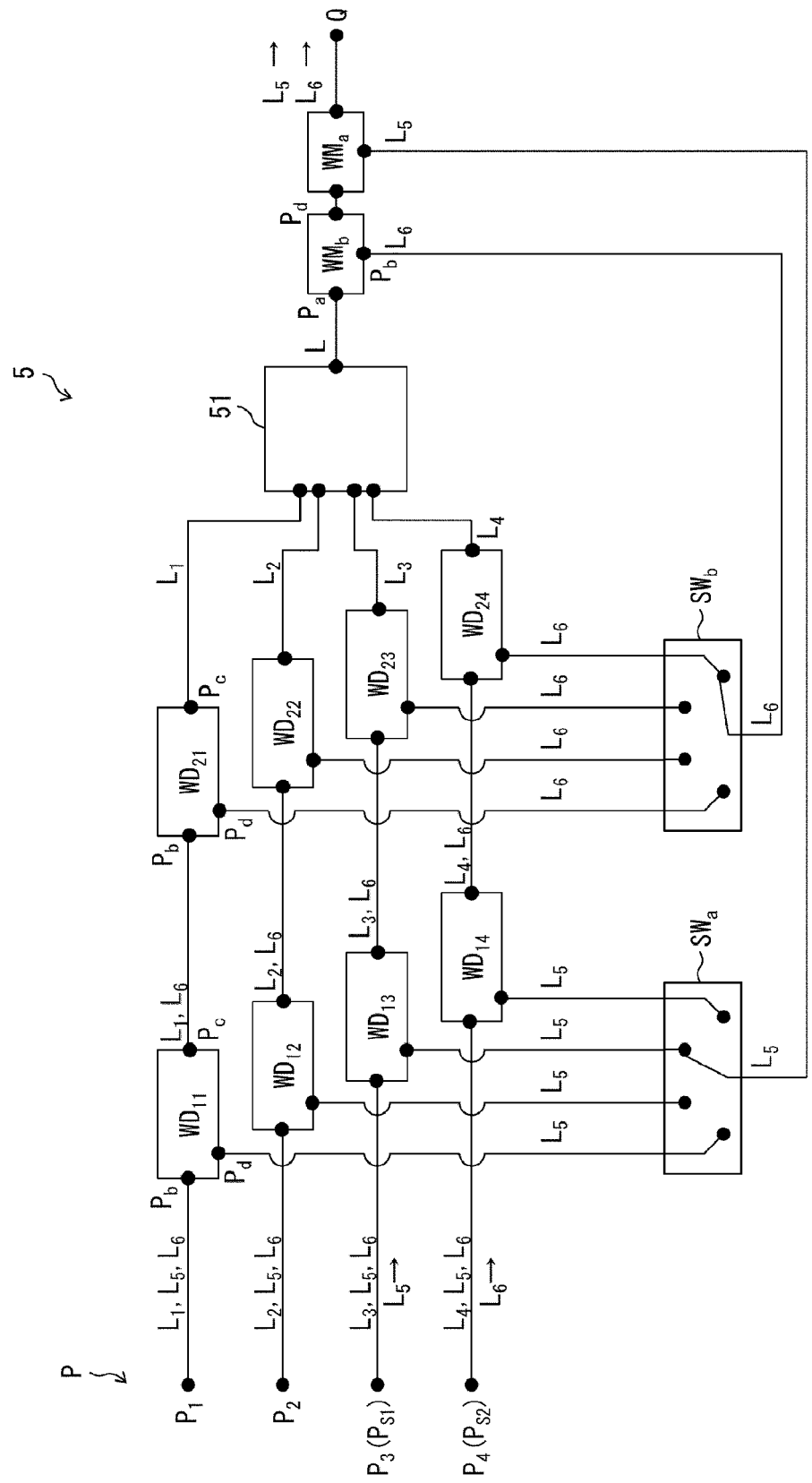
FIG. 15 is a block diagram illustrating an optical device in accordance with one or more embodiments of the present invention.

The following will describe an optical device 5 in accordance with one or more embodiments of the present invention with reference to FIG. 15. FIG. 15 is a block diagram illustrating the optical device 5. The optical device 5 is an optical device including: a first port group P including n ports $P_i$ (i=1, 2, . . . , n, wherein n=4 in one or more embodiments); a second port Q; and a wavelength multiplexer/demultiplexer 51 provided between the first port group P and the second port Q. The wavelength multiplexer/demultiplexer 51 is configured in the same manner as in the wavelength multiplexer/demultiplexer 11 of the optical device 1 illustrated in FIG. 1.

Thus, the optical device 5 has the same functions as those of the optical device 1. However, the optical device 5 is different from the optical device 1 in that a plurality of ports can be selected as the selected ports $P_{Sj}$. The following description in one or more embodiments discusses the optical device 5 in which two ports can be selected as the selected ports $P_{S1}$ and $P_{S2}$.

In one or more embodiments, the port referred to as the selected port $P_S$ for the optical device 1 is referred to as a first selected port $P_{S1}$. Further, a light beam $L_5$ is an example of a light beam $L_{SP1}$ in the claims.

In addition, m ports (m is an integer which satisfies 1≤m<n; m=1 in one or more embodiments), selected from among the ports $P_i$, different from the first selected port $P_{S1}$ are each referred to as j-th selected port $P_{Sj}$ (j=2, 3, . . . , m+1; j=2 in one or more embodiments). That is, in one or more embodiments, not only the first selected port $P_{S1}$ but also a second selected port $P_{S2}$ are used. Further, a light beam having a wavelength $\lambda_6$ different from the wavelengths $\lambda_1$ to $\lambda_4$ and the wavelength $\lambda_5$ is referred to as a light beam $L_6$. The wavelength $\lambda_6$ and the light beam $L_6$ are examples of a wavelength $\lambda_{SPj}$ and a light beam $L_{SPj}$ in the claims, respectively. Further, a light beam $L'_6$, which is another light beam having the wavelength $\lambda_6$, is an example of a light beam $L'_{SPj}$ in the claims.

The optical device 5 is configured such that in a case where the light beam $L_6$ has been inputted to the second selected port $P_{S2}$, the light beam $L_6$ is outputted to the second port Q, and in a case where a light beam $L'_6$ has been inputted to the second port Q, the light beam $L'_6$ is outputted to the second selected port $P_{S2}$.

Specifically, the optical device 5 further includes: first wavelength splitters $WD_{1i}$ (i=1, 2, . . . , N) provided between the corresponding ports $P_i$ and the wavelength multiplexer/demultiplexer 51; second wavelength splitters $WD_{2i}$ (i=1, 2, . . . , N) provided between the corresponding ports $P_i$ and the wavelength multiplexer/demultiplexer 51; a first wavelength combiner $WM_a$ provided between the second port Q and the wavelength multiplexer/demultiplexer 51; a second wavelength combiner $WM_b$ provided between the second port Q and the wavelength multiplexer/demultiplexer 51; a first switch $SW_a$ provided between the first wavelength splitters $WD_{1i}$ and the first wavelength combiner $WM_a$ and arranged in parallel to the wavelength multiplexer/demultiplexer 51; and a second switch $SW_b$ which is provided between the second wavelength splitters $WD_{2i}$ and the second wavelength combiner $WM_b$ and is arranged in parallel to the wavelength multiplexer/demultiplexer 51 (see FIG. 15).

Each of the first wavelength splitters $WD_{1i}$ couples a corresponding one of the light beams $L_i$ or a corresponding one of the light beams $L'_i$ between a corresponding one of the ports $P_i$ and the wavelength multiplexer/demultiplexer 51, and couples the light beam $L_5$ or the light beam $L'_5$ between a corresponding one of the ports $P_i$ and the first switch $SW_a$.

Each of the second wavelength splitters $WD_{2i}$ couples a corresponding one of the light beams $L_i$ or a corresponding one of the light beams $L'_i$ between a corresponding one of the ports $P_i$ and the wavelength multiplexer/demultiplexer 51, and couples the light beam $L_6$ and the light beam $L'_6$ between a corresponding one of the ports $P_i$ and the second switch $SW_b$.

The first wavelength combiner $WM_a$ couples the light beams $L_i$ or the light beams $L'_i$ between the wavelength multiplexer/demultiplexer 51 and the second port Q, and couples the light beam $L_5$ or the light beam $L'_5$ between the first switch $SW_a$ and the second port Q.

The second wavelength combiner $WM_b$ couples the light beam $L_i$ or the light beam $L'_i$ between the wavelength multiplexer/demultiplexer 51 and the second port Q, and couples the light beam $L_6$ or the light beam $L'_6$ between the second switch $SW_b$ and the second port Q.

The first switch $SW_a$, under control from an external member, selects a wavelength splitter corresponding to the first selected port $P_{S1}$ as the first selected wavelength splitter from among the first wavelength splitters $WD_{1i}$, and couples the light beam $L_5$ or $L'_5$ between the first selected wavelength splitter and the first wavelength combiner $WM_a$.

The second switch $SW_b$, under control from an external member, selects a wavelength splitter corresponding to the second selected port $P_{S2}$ as the second selected wavelength splitter from among the second wavelength splitters $WD_{2i}$, and couples the light beam $L_6$ or $L'_6$ between the second selected wavelength splitter and the second wavelength combiner $WM_b$.

The first wavelength splitters $WD_{1i}$, the first switch $SW_a$, and the first wavelength combiner $WM_a$ correspond to the wavelength splitters $WD_i$, the switch SW, and the wavelength combiner WM of the optical device 1, respectively. Thus, the descriptions of the first wavelength splitters $WD_{1i}$, the first switch $SW_a$, and the first wavelength combiner $WM_a$ are omitted.

Further, the second wavelength splitters $WD_{2i}$, the second switch $SW_b$, and the second wavelength combiner $WM_b$ are configured in the same manner as in the first wavelength splitters $WD_{1i}$, the first switch $SW_a$, and the first wavelength combiner $WM_a$, respectively. However, the second wavelength splitters $WD_{2i}$, the second switch $SW_b$, and the second wavelength combiner $WM_b$ each operate with respect to the light beam $L_6$ or $L'_6$, but do not operate with respect to the light beam $L_5$ or $L'_5$. This is a point of difference from the first wavelength splitters $WD_{1i}$, the first switch $SW_a$, and the first wavelength combiner $WM_a$. The respective configurations of the second wavelength splitters $WD_{2i}$, the second switch $SW_b$, and the second wavelength combiner $WM_b$ are self-evident. Thus, the descriptions of the second wavelength splitters $WD_{2i}$, the second switch $SW_b$, and the second wavelength combiner $WM_b$ are omitted.

According to the optical device 5 configured as described above, it is possible to secure redundancy in case of the occurrence of not only an event in which one of the light beams $L_i$ is not inputted to a corresponding one of the ports $P_i$, but also an event in which two or more of the light beams $L_i$ are not inputted to corresponding two or more of the ports $P_i$.

(Variation of Optical Device 5)

An optical device 5A, which is a variation of the optical device 5 illustrated in FIG. 15, will be described with reference to FIG. 16. FIG. 16 is a block diagram illustrating the optical device 5A. The optical device 5A includes: a first port group P including N ports $P_i$ (i=1, 2, . . . , N); a second port Q; and a wavelength multiplexer/demultiplexer 51 provided between the first port group P and the second port Q. The optical device 5A, like the optical device 5, is an optical device configured such that in a case where the light beam $L_{SPj}$ has been inputted to the j-th selected port $P_{Sj}$, the light beam $L_{SPj}$ is outputted to the second port Q, and in a case where a light beam $L'_{SPj}$ has been inputted to the second port Q, the light beam $L'_{SPj}$ is outputted to the j-th selected port $P_{Sj}$.

The optical device 5A further includes: wavelength splitters $WD_i$ (i=1, 2, . . . , N) which are provided between the corresponding ports $P_i$ and the wavelength multiplexer/demultiplexer 51; a wavelength combiner WM which is provided between the second port Q and the wavelength multiplexer/demultiplexer 51; and a switch SW which is provided between the wavelength splitters $WD_i$ and the wavelength combiner WM and is arranged in parallel to the wavelength multiplexer/demultiplexer 51.

Each of the wavelength splitters $WD_i$ couples a corresponding one of the light beams $L_i$ or a corresponding one of the light beams $L'_i$ between a corresponding one of the ports $P_i$ and the wavelength multiplexer/demultiplexer 51, and couples the light beam $L_5$ or $L'_5$ and the light beam $L_6$ or $L'_6$ between a corresponding one of the ports $P_i$ and the switch.

The wavelength combiner WM couples the light L or the light L' between the wavelength multiplexer/demultiplexer 51 and the second port Q, and couples the light beam $L_5$ or $L'_5$ and the light beam $L_6$ or $L'_6$ between the switch and the second port Q.

The switch SW, under control from an external member, (A1) selects a wavelength splitter corresponding to the first selected port $P_{S1}$ as the first selected wavelength splitter from among the wavelength splitters $WD_i$ and (A2) selects a wavelength splitter corresponding to the second selected port $P_{S2}$ as the second selected wavelength splitter from among the wavelength splitters $WD_i$. Further, the switch SW (B1) couples the light beam $L_5$ or $L'_5$ between the first selected wavelength splitter and the wavelength combiner WM and (B2) couples the light beam $L_6$ or $L'_6$ between the second selected wavelength splitter and the wavelength combiner WM.

The wavelength splitters $WD_i$, the switch SW, and the wavelength combiners WM of the optical device 5A are configured in the same manner as in the wavelength splitters $WD_i$, the switch SW, and the wavelength combiners WM of the optical device 1, respectively. However, the wavelength splitters $WD_i$, the switch SW, and the wavelength combiners WM of the optical device 5A each operate not only with respect to the light beam $L_5$, but also with respect to the light beam $L_6$. This is a point of difference from the wavelength splitters $WD_i$, the switch SW, and the wavelength combiners WM of the optical device 1. The respective configurations of the wavelength splitters $WD_i$, the switch SW, and the wavelength combiners WM of the optical device 5A are self-evident. Thus, the descriptions of the second wavelength splitters $WD_{2i}$, the second switch $SW_b$, and the second wavelength combiner $WM_b$ are omitted.

Even with use of the optical device 5A configured as described above, it is possible to secure redundancy in case of the occurrence of not only an event in which one of the light beams $L_i$ is not inputted to a corresponding one of the ports $P_i$, but also an event in which two or more of the light beams $L_i$ are not inputted to corresponding two or more ports $P_i$ rather than one of the ports $P_i$.

The following will describe a wavelength division multiplexing transmission and receiving system S in accordance with one or more embodiments of the present invention with reference to FIG. 17. FIG. 17 is a block diagram illustrating the wavelength division multiplexing transmission and receiving system S.

The wavelength division multiplexing transmission and receiving system S includes: a wavelength division multiplexing transmitter TX in accordance with one or more embodiments of the present invention; and a wavelength division multiplexing receiver RX in accordance with one or more embodiments of the present invention (see FIG. 17).

The wavelength division multiplexing transmitter TX includes: the optical device 1 illustrated in FIG. 1; modulators $M_i$ having respective input ports $PI_i$ (i=1, 2, . . . , N) and respective output ports $PO_i$, wherein the output ports $PO_i$ are connected to corresponding ports $P_i$; optical sources $OS_i$, connected to the corresponding input ports $PI_i$, configured to output the respective light beams $L_i$; a spare optical source $OS_{SP}$ configured to output a light beam $L_{SP}$; a spare optical source switch, provided between the spare optical source $OS_{SP}$ and the input ports $PI_i$, configured to select one input port as a selected input port from among the input ports $PI_i$ under control from an external member and input the light beam $L_{SP}$ to the selected input port; and a control section $CU_A$.

Note that in one or more embodiments, laser diodes are employed as the optical sources $OS_i$ and the spare optical source $OS_{SP}$. Thus, the optical sources $OS_i$ and the spare optical source $OS_{SP}$ are referred to as laser diodes $LD_i$ and spare laser diode $LD_{SP}$, respectively. The laser diodes $LD_i$ emit light beams $L_i$, and the spare laser diode $LD_{SP}$ emits a light beam $L_5$ (i.e., light beam $L_{SP}$).

Further, in one or more embodiments, the optical device 1 included in the wavelength division multiplexing transmitter TX is referred to as optical device $1_A$ for the sake of identification from an optical device 1 included in the wavelength division multiplexing receiver RX. Further, in one or more embodiments, the optical device 1 included in the wavelength division multiplexing receiver RX is referred to as optical device $1_B$. For the sake of identification, the ports $P_i$, the first port group P, and the second port Q are also referred to as ports $P_{iA}$, first port group $P_A$, second port $Q_A$, port $P_{iB}$, first port group $P_B$, and second port $Q_B$.

The wavelength division multiplexing receiver RX includes: an optical device $1_B$ which is the optical device 1 illustrated in FIG. 1; photodetectors $D_i$ having respective light receiving elements $D_{OPi}$ (i=1, 2, . . . , N) coupled to corresponding ones of the ports $P_i$; and a control section $CU_B$.

The wavelength division multiplexing transmission and receiving system S includes: in addition to the above-described wavelength division multiplexing transmitter TX and wavelength division multiplexing receiver RX, an optical fiber connecting between the second port $Q_A$ of the wavelength division multiplexing transmitter TX and the second port $Q_B$ of the wavelength division multiplexing receiver RX; and a metal cable MC connecting between the control section $CU_A$ and the control section $CU_B$.

(Functions of Control Section)

The control section $CU_A$ is a control section which controls the laser diodes $LD_i$, the spare laser diode $LD_{SP}$, the switch SW, and the optical device $1_A$. The control section $CU_A$ is, for example, a microcomputer, and executes a predetermined program to perform a desired function. The control section $CU_A$ controls driving currents of the laser diodes $LD_i$ and the spare laser diode $LD_{SP}$, controls a switching operation of the switch SW, and controls a switching operation of the switch SW of the optical device $1_A$.

When any one of the laser diodes $LD_i$ does not produce a respective light beam $L_i$, the control section $CU_A$ stops supplying a driving current to that laser diode $LD_i$ and supplies a driving current to the spare laser diode $LD_{SP}$.

The control section $CU_A$ causes the switch SW to perform switching so that the light beam $L_5$ enters one of the modulators $M_i$ corresponding to the laser diode $LD_i$ which does not produce the respective light beam $L_i$.

Further, the control section $CU_A$ selects, as a selected port $P_S$, one port $P_{iA}$ corresponding to the laser diode $LD_i$ which does not produce the respective light beam $L_i$, selects one wavelength splitter corresponding to the selected port $P_S$ as a selected wavelength splitter from among the wavelength splitters $WD_i$ of the optical device $1_A$, and couples the light beam $L_{SP}$ or $L'_{SP}$ between the selected wavelength splitter and the wavelength combiner WM.

Further, the control section $CU_A$ notifies the control section $CU_B$ of port information indicative of which one of the ports $P_{iA}$ is the selected port $P_S$, via the metal cable MC illustrated in FIG. 17.

The control section $CU_B$ identifies the selected port $P_S$ in accordance with the port information having been notified by the control section $CU_A$, selects one wavelength splitter corresponding to the selected port $P_S$ as a selected wavelength splitter from among the wavelength splitters $WD_i$ of the optical device $1_B$, and couples the light beam $L_{SP}$ or $L'_{SP}$ between the selected wavelength splitter and the wavelength combiner WM.

According to the wavelength division multiplexing transmission and receiving system S configured as described above, it is possible to secure redundancy in case of the occurrence of an event in which any one of the light beams $L_i$ is not inputted to a corresponding one of the ports $P_{iA}$.

Note that the description in the previously-described embodiments describes the wavelength division multiplexing transmission and receiving system S in which the wavelength division multiplexing transmitter TX and the wavelength division multiplexing receiver RX include the optical devices $1_A$ and $1_B$ in accordance with one or more embodiments, respectively. However, in the wavelength division multiplexing transmission and receiving system S, it is only necessary that the wavelength division multiplexing transmitter TX and the wavelength division multiplexing receiver RX each include an optical device in accordance with one or more embodiments of the present invention. Particularly, in a case where it is necessary to increase the level of redundancy, it is possible to employ, as each of the optical devices included in the wavelength division multiplexing transmitter TX and the wavelength division multiplexing receiver RX, one of the optical devices 5 and 5A in accordance with one or more embodiments of the present invention and a plurality of spare laser diodes $LD_{SP}$.

According to such a configuration, it is possible to secure redundancy in case of the occurrence of an event in which two or more of the laser diodes $LD_i$ do not produce their respective light beams $L_i$.

(Variation of Wavelength Division Multiplexing Transmission and Receiving System S)

Note that, although the description in the previously-described embodiments describes the configuration in which the metal cable MC is used to allow the control section $CU_A$ to notify the port information of the control section $CU_B$, the metal cable MC can be omitted in one or more embodiments of the wavelength division multiplexing transmission and receiving system S.

For example, the control section $CU_B$ is configured to monitor the strengths of electric signals, generated by the photodetectors $D_i$, into which optical signals have been converted, wherein the optical signals are superimposed on the respective light beams $L_i$ having been received by the photodetectors $D_i$, and is configured to, in a case where the strength of any of the electric signals generated by the photodetectors $D_i$ has become lower than a predetermined threshold value, determine that a corresponding one of the laser diodes $LD_i$ has malfunctioned. According to such configurations, the control section $CU_B$ can identify the port $P_i$ corresponding to the malfunctioned laser diode $LD_i$, i.e., the selected port $P_S$. Thus, even in a case where the metal cable MC is omitted, the control section $CU_B$ controls the switch SW of the optical device $1_B$ so that one wavelength splitter corresponding to the selected port $P_S$ is selected as a selected wavelength splitter from among the wavelength splitters $WD_i$ of the optical device $1_B$, and the light beam $L_{SP}$ or $L'_{SP}$ is coupled between the selected wavelength splitter and the wavelength combiner WM.

Further, the description in the previously-described embodiments describes that the wavelength division multiplexing transmitter TX and the wavelength division multiplexing receiver RX include the optical device $1_A$ and the optical device $1_B$, respectively, each of which is the optical device 1 illustrated in FIG. 1. However, the optical device $1_A$ and the optical device $1_B$ included in the wavelength division multiplexing transmitter TX and the wavelength division multiplexing receiver RX, respectively, are not limited to the optical device 1 illustrated in FIG. 1. The optical device $1_A$ and the optical device $1_B$ may be any of the following optical devices: the optical device 1A illustrated in FIG. 5; the optical device 2 illustrated in FIG. 9; the optical device 2A illustrated in FIG. 10; the optical device 2B illustrated in FIG. 11; the optical device 3 illustrated in FIG. 12; the optical device 4 illustrated in FIG. 13; the optical device 4A illustrated in FIG. 14; the optical device 5 illustrated in FIG. 15; and the optical device 5A illustrated in FIG. 16. Even in a case where any of these optical devices are employed as the optical device $1_A$ and the optical device $1_B$, the metal cable MC can be omitted by causing the control section $CU_B$ to be configured as described above.

Further, in a case where the optical device 1A illustrated in FIG. 5 is employed as the optical device $1_A$ and the optical device $1_B$, and the port $P_4$ is selected as the selected port $P_S$, there may be a case where the strength of an electric signal generated by the photodetector $D_4$ corresponding to the port $P_4$ cannot become lower than a predetermined threshold value since the light beam $L_{SP}$ does not pass through the switch SW. However, in this case, no particular control by the optical device $1_B$ is necessary, and the control section $CU_B$ does not need to identify the selected port $P_S$.

Further, in a case where the optical device 1A illustrated in FIG. 5 is employed as the optical device $1_A$ and the optical device $1_B$, the optical device $1_B$ may further include a power monitor provided in a path via which the wavelength selective switch WSS and the switch SW are connected to each other. According to such a configuration, it is possible to reliably detect the occurrence of a malfunction of any of the laser diodes $LD_i$. This allows the control section $CU_B$ to identify the selected port $P_S$ even in a case where the metal cable MC is omitted.

As described above, one or more embodiments of the present invention is also applicable to a wavelength division multiplexing transmission and receiving system S including no metal cable MC.

[Recap]

An optical device in accordance with one or more embodiments of the present invention is an optical device including:

a first port group P including n ports $P_i$ (i=1, 2, . . . ; n);

a second port Q; and a wavelength multiplexer/demultiplexer being provided between the first port group P and the second port Q, the wavelength multiplexer/demultiplexer, (1) in a case where light beams $L_i$ of predetermined different n wavelengths $\lambda_i$ (i=1, 2, . . . , n) corresponding to the respective ports $P_i$ have been inputted to the wavelength multiplexer/demultiplexer, combining the light beams $L_i$ into light L and outputting the light L to the second port Q, and, (2) in a case where light L' has been inputted to the second port Q, separating the light L' into light beams $L'_i$ of the wavelengths $\lambda_i$ and outputting the light beams $L'_i$ to the corresponding ports $P_i$, wherein one port is selected as a selected port $P_S$ from among the ports $P_i$, and in a case where a light beam $L_{SP}$ of a wavelength $\lambda_{SP}$ different from the wavelengths $\lambda_i$ has been inputted to the selected port $P_S$, the light beam $L_{SP}$ is outputted to the second port Q, and, in a case where a light beam $L'_{SP}$ of the wavelength $\lambda_{SP}$ has been inputted to the second port Q, the light beam $L'_{SP}$ is outputted to the selected port $P_S$.

The optical device configured as described above is an optical device that includes a n:1 wavelength multiplexer/demultiplexer, and is configured such that the light beam $L_{SP}$ of the wavelength $\lambda_{SP}$ is inputted to the selected port $P_S$, which is a port $P_i$ to which a light beam $L_i$ previously brought into correspondence with that port $P_i$ has not been inputted. In other words, the optical device in accordance with one or more embodiments of the present invention need only be configured such that only the light beam $L_{SP}$ is supplied as a spare light beam corresponding to each of the light beams $L_i$, and does not need to be configured such that n spare light beams are supplied. Thus, according to an optical device in accordance with one or more embodiments of the present invention, by using one spare light beam, it is possible to secure redundancy in case of the occurrence of an event in which any of the light beams $L_i$ having predetermined wavelengths $\lambda_i$ (i=1, 2, . . . , n) has not been inputted to a corresponding one or more of the ports.

Note that an optical device in accordance with one or more embodiments of the present invention need only be configured so as to use at least one spare light beam, and may be configured so as to use a plurality of spare light beams. Thus, according to an optical device in accordance with one or more embodiments of the present invention, it is possible to secure any level of redundancy.

Further, an optical device in accordance with one or more embodiments of the present invention may be configured so as to further include:

wavelength splitters $WD_i$ (i=1, 2, . . . , n) being provided between the corresponding ports $P_i$ and the wavelength multiplexer/demultiplexer;

a wavelength combiner WM being provided between the second port Q and the wavelength multiplexer/demultiplexer; and a switch being provided between the wavelength splitters $WD_i$ and the wavelength combiner WM and arranged in parallel to the wavelength multiplexer/demultiplexer, each of the wavelength splitters $WD_i$ coupling a corresponding one of the light beams $L_i$ or a corresponding one of the light beams $L'_i$ between a corresponding one of the ports $P_i$ and the wavelength multiplexer/demultiplexer, and coupling the light beam $L_{SP}$ or the light beam $L'_{SP}$ between a corresponding one of the ports $P_i$ and the switch, the wavelength combiner WM coupling the light L or the light L' between the wavelength multiplexer/demultiplexer and the second port Q, and coupling the light beam $L_{SP}$ or the light beam $L'_{SP}$ between the switch and the second port Q, the switch, under control from an external member, selecting a wavelength splitter corresponding to the selected port $P_S$ as a selected wavelength splitter from among the wavelength splitters $WD_i$, and coupling the light beam $L_{SP}$ or the light beam $L'_{SP}$ between the selected wavelength splitter and the wavelength combiner WM.

In Japanese Patent Application Publication, *Tokukai*, No. 2000-183817 (publication date: Jun. 30, 2000; hereinafter referred to as Patent Literature 2), FIG. 1 illustrates a transmitter (a wavelength division multiplexing transmission apparatus in Patent Literature 2). Unlike the transmitter illustrated in FIG. 1 of Patent Literature 2, the optical device in accordance with one or more embodiments of the present invention does not need to secure redundancy by use of optical four-wave mixing. This allows the optical device in accordance with one or more embodiments of the present invention to consume less power than the transmitter illustrated in FIG. 1 of Patent Literature 2.

Further, in Japanese Translation of PCT International Application, *Tokuhyo*, No. 2002-505546 (publication date: Feb. 19, 2002; hereinafter referred to as Patent Literature 3), FIG. 2 illustrates a wavelength division multiplexing device (WDM equipment in Patent Literature 3). Unlike the wavelength division multiplexing device illustrated in FIG. 2 of Patent Literature 3, the optical device in accordance with one or more embodiments of the present invention does not need to secure redundancy with use of a (n+m):1 light multiplexer/demultiplexer. Thus, the optical device in accordance with one or more embodiments of the present invention enables reduction in substrate size, as compared to the wavelength division multiplexing device disclosed in Patent Literature 3.

In Japanese Patent Application Publication, *Tokukai*, No. 2013-126193 (publication date: Jun. 24, 2013; hereinafter referred to as Patent Literature 4), FIG. 1 illustrates a wavelength division multiplexing device (a wavelength multiplexing optical transmission system in Patent Literature 4). Unlike the wavelength division multiplexing device illustrated in FIG. 1 of Patent Literature 4, the optical device configured as described above does not need to have a filter module mounted on a substrate. Further, unlike the wavelength division multiplexing device illustrated in FIG. 1 of Patent Literature 4, the optical device configured as described above does not need to have a heating section. Thus, the optical device in accordance with one or more embodiments of the present invention does not require a transmitter capable of performing outputs corresponding to the individual wavelengths and does not require complex control or expensive parts, as compared to the wavelength division multiplexing device illustrated in FIG. 1 of Patent Literature 4.

Still further, an optical device in accordance with one or more embodiments of the present invention may be configured such that the first port group P further includes a port $P_{n+1}$ which is arranged in parallel to the ports $P_i$ and is connected directly to the wavelength multiplexer/demultiplexer, the wavelength combiner WM is a wavelength selective switch, the wavelength multiplexer/demultiplexer, (1) in a case where the light beams $L_i$ (i=1, 2, ..., n) have been inputted to the corresponding ports $P_i$ (i=1, 2, ..., n), and a light beam $L_{n+1}$ of a wavelength $\lambda_{n+1}$ different from the wavelengths $\lambda_i$ (i=1, 2, ..., n) and $\lambda_{SP}$ has been inputted to the port $P_{n+1}$, multiplexes the light beams $L_i$ (i=1, 2, ..., n, n+1) to emit the light L and outputs the light L to the second port Q, and, (2) in a case where the light L' has been inputted to the second port Q, demultiplexes the light L' to emit the light beams $L'_i$ (i=1, 2, ..., n, n+1) of the wavelengths $\lambda_i$ (i=1, 2, ..., n, n+1) and outputs the light beams $L'_i$ to the corresponding ports $P_i$ (i=1, 2, ..., n, n+1), the wavelength selective switch, under the condition where one port is selected as the selected port $P_S$ from among the ports $P_i$ (i=1, 2, ..., n, n+1), coupling the light beams $L_i$(i=1, 2, ..., n, n+1) between the wavelength multiplexer/demultiplexer and the second port Q, (B) in a case where one port is selected as the selected port $P_S$ from among the ports $P_i$ (i=1, 2, ..., n), coupling the light beam $L_{SP}$ or $L'_{SP}$ between the switch and the second port Q under control from the external member, and (C) in a case where the port $P_{n+1}$ is selected as the selected port $P_S$, coupling the light beam $L_{SP}$ or $L'_{SP}$ between the wavelength multiplexer/demultiplexer and the second port Q under control from an external member.

The optical device configured as described above, even in a case where any one of the wavelength splitters $WD_i$ provided between the corresponding ports $P_i$ and the wavelength multiplexer/demultiplexer is omitted, can obtain the same effect as the effect produced by the optical devices in accordance with one or more embodiments of the present invention.

Yet further, an optical device in accordance with one or more embodiments of the present invention may further include:

a switch group being provided between the wavelength multiplexer/demultiplexer and the second port Q, the wavelength multiplexer/demultiplexer (1) having n ports $p_i$ (i=1, 2, ..., n) connected directly to the ports $P_i$ (i=1, 2, ..., n) and n ports $q_i$ (i=1, 2, ..., n) connected to the second port Q via the switch group, (2) in a case where the light beams $L_i$ have been inputted to the corresponding ports $P_i$, multiplexing the light beams $L_i$ to emit the light L and coupling the light L to a predetermined port $q_Q$ of the ports $q_i$, (3) in a case where the light L' has been inputted to the port $q_Q$, demultiplexing the light L' to emit the light beams $L'_i$ of the wavelengths $\lambda_i$ and outputting the light beams $L'_i$ to the corresponding ports $P_i$, and (4) selectively coupling the light beam $L_{SP}$ or $L'_{SP}$ between the ports $p_i$ and the ports $q_i$, the switch group, under control from an external member, coupling the light beam $L_{SP}$ or $L'_{SP}$ between one port $q_i$ (i is any of 1, 2, ..., n) selectively coupled to the selected port $P_S$ and the second port Q.

The optical device configured as described above enables elimination of an intersection of waveguides, as compared to the optical device in accordance with one or more embodiments of the present invention. This is because the optical device configured as described above, which includes no wavelength splitters $WD_i$ included in the optical device in accordance with one or more embodiments of the present invention, enables elimination of branched waveguides. Consequently, the optical device in accordance with one or more embodiments of the present invention enables reduction in loss of the light beams $L_i$ and enables suppression of crosstalk between the light beams $L_i$ and the light beam $L_{SP}$, as compared to the optical device in accordance with one or more embodiments of the present invention. The crosstalk between the light beams $L_i$ and the light beam $L_{SP}$, is likely to occur at crossed waveguides including an intersection between the waveguides. The optical device in accordance with one or more embodiments of the present invention includes no intersection as described above and thus enables suppression of crosstalk between the light beams $L_i$ and the light beam $L_{SP}$.

Further, an optical device in accordance with one or more embodiments of the present invention may further include:

a switch group being provided between a port $P_j$ (j is any of 1, 2, ..., n), which is any one of the ports $P_i$, and the wavelength multiplexer/demultiplexer, the wavelength multiplexer/demultiplexer (1) having n ports $p_i$ (i=1, 2, ..., n) connected directly or via the switch group to the ports $P_i$ (i=1, 2, ..., n) and n ports $q_i$ (i=1, 2, ..., n), (2) in a case where the light beams $L_i$ have been inputted to the corresponding ports $P_i$, multiplexing the light beams $L_i$ to emit the light L and coupling the light L to a predetermined port $q_Q$ of the ports $q_i$, (3) in a case where the light L' has been inputted to the port $q_Q$, demultiplexing the light L' to emit the light beams $L'_i$ of the wavelengths $\lambda_i$ and outputting the light beams $L'_i$ to the corresponding ports $P_i$, and (4) selectively coupling the light beam $L_{SP}$ or $L'_{SP}$ between the ports $p_i$ and the ports $q_i$ and coupling the light beam $L_{SP}$ or $L'_{SP}$ between a port $p_j$, of the ports $p_i$, corresponding to the port $P_j$ and the port $q_Q$, the switch group, under control from an external member, coupling the light beam $L_{SP}$ or $L'_{SP}$ between one port $q_i$ (i is any of 1, 2, ..., n) selectively coupled to the selected port $P_S$ and the port $p_j$.

The optical device configured as described above produces the same effect as the effect produced by the optical device in accordance with one or more embodiments of the present invention. That is, the optical device in accordance with one or more embodiments of the present invention enables reduction in loss of the light beams $L_i$ and enables reduction in crosstalk between the light beams $L_i$ and the light beam $L_{SP}$, as compared to the optical device in accordance with one or more embodiments of the present invention.

Furthermore, the optical device in accordance with one or more embodiments of the present invention enables reduction in loss of the light beams $L_i$ corresponding to the ports other than the port $P_j$ (i.e., light beams other than the light beam $L_j$) wherein the switch group is provided between the port $P_j$ and the wavelength multiplexer/demultiplexer, as compared to the optical device in accordance with one or more embodiments of the present invention.

Still further, an optical device in accordance with one or more embodiments of the present invention may further include:

a main bus having one end constituting the second port Q, wherein n wavelength selective combiners $WSM_i$ (i=1, 2, ..., n) constituting the wavelength multiplexer/demultiplexer are inserted in series with the main bus, the ports $P_i$ (i=1, 2, ..., n) being connected directly to the corresponding wavelength selective combiners $WSM_i$, each of the wavelength selective combiners $WSM_i$ being constituted by a combination of a corresponding one of wavelength combiners $WM_i$ (i=1, 2, ..., n) and a corresponding one of wavelength selective switches $WSS_i$ (i=1, 2, ..., n), wherein in the wavelength multiplexer/demultiplexer, (1) in a case where the light beams $L_i$ have been inputted to the corresponding ports $P_i$, the wavelength combiners $WM_i$ couple the light beams $L_i$ to the main bus so that the wavelength multiplexer/demultiplexer emits the light L into which the light beams $L_i$ are multiplexed and outputs the light L to the second port Q, (2) in a case where the light L' has been inputted to the second port Q, the wavelength combiners $WM_i$ separate the light L' into light beams $L'_i$ so that the wavelength multiplexer/demultiplexer emits the light beams $L'_i$ into which the light L' is demultiplexed and outputs the light beams $L'_i$ to the corresponding ports $P_i$, and (3) one of the wavelength selective switches $WSS_i$ (i is any of 1, 2, ..., n) corresponding to the selected port $P_S$ couples the light beam $L_{SP}$ or $L'_{SP}$ between the selected port $P_S$ and the main bus under control from an external member.

According to the optical device configured as described above, it is possible to realize an optical device in accordance with one or more embodiments of the present invention with use of an optical waveguide in a bus form.

Further, the optical device in accordance with one or more embodiments of the present invention has a simple configuration, as compared to an optical device which includes no main bus (e.g., an optical device in accordance with one or more embodiments of the present invention). Thus, the optical device in accordance with one or more embodiments of the present invention produces, as a secondary effect, the effect of decreasing the substrate size, as compared to the optical device which includes no main bus. Still further, the optical device in accordance with one or more embodiments of the present invention is configured such that the ratio between the number of the ports $P_i$ (i.e., n ports) and the number of the wavelength selective combiners $WSM_i$ constituting the wavelength multiplexer/demultiplexer is 1:1. Thus, in a case where a design change to increase the number of the ports $P_i$ is made based on the optical device in accordance with one or more embodiments of the present invention, the optical device in accordance with one or more embodiments of the present invention produces, as a secondary effect, the effect of preventing the substrate area from becoming large even though the number of the ports P, is increased by one.

Yet further, an optical device in accordance with one or more embodiments of the present invention may further include:

a main bus having one end constituting the second port Q, wherein n wavelength combiners $WM_i$ (i=1, 2, ..., n) constituting the wavelength multiplexer/demultiplexer are inserted in series with the main bus; and a secondary bus being arranged in parallel to the main bus, wherein wavelength selective switches $WSS_i$ (i=1, 2, ..., n) connected to the corresponding wavelength combiners $WM_i$ (i=1, 2, ..., n) are inserted in series with the secondary bus, the secondary bus having a first end which is connected to a preceding stage or a subsequent stage of the wavelength multiplexer/demultiplexer when viewed from a second port Q side, the ports $P_i$ being connected directly to the corresponding wavelength combiners $WM_i$, each of the wavelength combiners $WM_i$ (1) coupling a corresponding one of the light beams $L_i$ or $L'_i$ between a corresponding one of the ports $P_i$ and the main bus and (2) coupling the light beam $L_{SP}$ or $L'_{SP}$ between a corresponding one of the ports $P_i$ and a corresponding one of the wavelength selective switches $WSS_i$, each of the wavelength selective switches $WSS_i$ when selected under control from an external member, coupling the light beam $L_{SP}$ or $L'_{SP}$ between a corresponding one of the wavelength combiners $WM_i$ and the secondary bus, the wavelength multiplexer/demultiplexer being configured such that:

(1) in a case where the light beams $L_i$ have been inputted to the corresponding ports $P_i$, the wavelength combiners $WM_i$ couple the light beams $L_i$ to the main bus so that the wavelength multiplexer/demultiplexer emits the light L into which the light beams $L_i$ are multiplexed and outputs the light L to the second port Q; and (2) in a case where the light L' has been inputted to the second port Q, the wavelength combiners $WM_i$ separate the light L' into light beams $L'_i$ so that the wavelength multiplexer/demultiplexer emits the light beams $L'_i$ into which the light L' is demultiplexed and outputs the light beams $L'_i$ to the corresponding ports $P_i$, one of the wavelength selective switches $WSS_i$ (i is any of 1, 2, ..., n) connected to a corresponding one of the wavelength combiners $WM_i$ (i is any of 1, 2, ..., n) corresponding to the selected port $P_S$, coupling the light beam $L_{SP}$ or $L'_{SP}$ between the corresponding one of the wavelength combiners $WM_i$ and the secondary bus under control from an external member.

Further, an optical device in accordance with one or more embodiments of the present invention may be configured such that the first end of the secondary bus is connected directly to the subsequent stage of the wavelength multiplexer/demultiplexer when viewed from the second port Q side, and the wavelength multiplexer/demultiplexer couples the light beam $L_{SP}$ or $L'_{SP}$ between the first end of the secondary bus and the second port Q.

The optical devices configured as described above enable reduction in loss of the light beams $L_i$ and enables reduction in crosstalk between the light beams $L_i$ and the light beam $L_{SP}$, as compared to the optical device in accordance with one or more embodiments of the present invention.

Still further, an optical device in accordance with one or more embodiments of the present invention may be configured so as to further include another wavelength combiner being provided between the wavelength multiplexer/demultiplexer and the second port Q, wherein the first end of the secondary bus is connected, via the another wavelength combiner, to the preceding stage of the wavelength multiplexer/demultiplexer when viewed from the second port Q side, and the another wavelength combiner couples the light beams $L_i$ between the wavelength multiplexer/demultiplexer and the second port Q and couples the light beam $L_{SP}$ or $L'_{SP}$ between the secondary bus and the second port Q.

In the optical device in accordance with one or more embodiments of the present invention, since the first end of the secondary bus is connected directly to the subsequent stage of the wavelength multiplexer/demultiplexer when viewed from the second port Q side, the light beam $L_{SP}$ having been inputted from the secondary bus to the main bus propagates the main bus with which the wavelength combiners $WM_i$ are inserted in series and then reaches the second port Q.

On the contrary, in the optical device in accordance with one or more embodiments of the present invention, the first end of the secondary bus is connected to the preceding stage of the wavelength multiplexer/demultiplexer via the wavelength combiner when viewed from the second port Q side. Thus, the light beam $L_{SP}$ having been inputted from the secondary bus to the main bus reaches the second port Q without propagating through portions of the main bus where the wavelength combiners $WM_i$ are inserted in series with the main bus. This allows the optical device in accordance with one or more embodiments of the present invention to reduce loss of the light beam $L_{SP}$. This makes it possible to reduce power of, for example, an optical source which emits the light beam $L_{SP}$, and thus enables reduction in power consumption. In addition, the optical device in accordance with one or more embodiments of the present invention can reduce crosstalk between the light beam $L_{SP}$ and the light beams $L_i$.

Yet further, an optical device in accordance with one or more embodiments of the present invention may be such that the selected port $P_S$ is a first selected port $P_{S1}$, the light beam $L_{SP}$ of the wavelength $\lambda_{SP}$ is a light beam $L_{SP1}$, each of m ports (m is an integer which satisfies 1≤m≤n), selected from among the ports $P_i$, different from the first selected port $P_{S1}$ is a j-th selected port $P_{Sj}$ (j=2, 3, . . . , m+1), and light beams of different wavelengths $\lambda_{SPj}$, which are different from the wavelengths $\lambda_i$ and $\lambda_{SP1}$, are light beams $L_{SPj}$ and $L'_{SPj}$, and wherein in a case where the light beam $L_{SPj}$ has been inputted to the j-th selected port $P_{Sj}$, the light beam $L_{SPj}$ is outputted to the second port Q, and in a case where the light beam $L'_{SPj}$ has been inputted to the second port Q, the light beam $L'_{SPj}$ is outputted to the j-th selected port $P_{Sj}$.

According to the optical device configured as described above, it is possible to secure redundancy in case of the occurrence of not only an event in which one of the light beams $L_i$ is not inputted to a corresponding one of the ports $P_i$, but also an event in which two or more of the light beams $L_i$ are not inputted to corresponding two or more of the ports $P_i$.

Further, an optical device in accordance with one or more embodiments of the present invention may be configured so as to further include:

first wavelength splitters $WD_{1i}$ (i=1, 2, . . . , n) being provided between the corresponding ports $P_i$ and the wavelength multiplexer/demultiplexer;

second wavelength splitters $WD_{2i}$ (i=1, 2, . . . , n) being provided between the corresponding ports $P_i$ and the wavelength multiplexer/demultiplexer;

a first wavelength combiner $WM_a$ being provided between the second port Q and the wavelength multiplexer/demultiplexer;

a second wavelength combiner $WM_b$ being provided between the second port Q and the wavelength multiplexer/demultiplexer;

a first switch being provided between the first wavelength splitters $WD_{1i}$ and the first wavelength combiner $WM_a$ and arranged in parallel to the wavelength multiplexer/demultiplexer; and a second switch being provided between the second wavelength splitters $WD_{2i}$ and the second wavelength combiner $WM_b$ and arranged in parallel to the wavelength multiplexer/demultiplexer, each of the first wavelength splitters $WD_{1i}$ coupling a corresponding one of the light beams $L_i$ or a corresponding one of the light beams $L'_i$ between a corresponding one of the ports $P_i$ and the wavelength multiplexer/demultiplexer, and coupling a light beam $L_{SP1}$ or a light beam $L'_{SP1}$ between a corresponding one of the ports $P_i$ and the first switch, each of the second wavelength splitters $WD_{2i}$ coupling a corresponding one of the light beams $L_i$ or a corresponding one of the light beams $L'_i$ between a corresponding one of the ports $P_i$ and the wavelength multiplexer/demultiplexer, and coupling a light beam $L_{SP2}$ or a light beam $L'_{SP2}$ between a corresponding one of the ports $P_i$ and the second switch, the first wavelength combiner $WM_a$ coupling the light beams $L_i$ or the light beams $L'_i$ between the wavelength multiplexer/demultiplexer and the second port Q, and coupling the light beam $L_{SP1}$ or the light beam $L'_{SP1}$ between the first switch and the second port Q, the second wavelength combiner $WM_b$ coupling the light beams $L_i$ or the light beams $L'_i$ between the wavelength multiplexer/demultiplexer and the second port Q, and coupling the light beam $L_{SP2}$ or the light beam $L'_{SP2}$ between the second switch and the second port Q, the first switch, under control from an external member, selecting a wavelength splitter corresponding to the first selected port $P_{S1}$ as the first selected wavelength splitter from among the first wavelength splitters $WD_{1i}$, and coupling the light beam $L_{SP1}$ or $L'_{SP1}$ between the first selected wavelength splitter and the first wavelength combiner $WM_a$, the second switch, under control from an external member, selecting a wavelength splitter corresponding to the second selected port $P_{S2}$ as the second selected wavelength splitter from among the second wavelength splitters $WD_{2i}$, and coupling the light beam $L_{SP2}$ or $L'_{SP2}$ between the second selected wavelength splitter and the second wavelength combiner $WM_b$.

Still further, an optical device in accordance with one or more embodiments of the present invention may be configured so as to further include:

wavelength splitters $WD_i$ (i=1, 2, . . . , n) being provided between the corresponding ports $P_i$ and the wavelength multiplexer/demultiplexer;

a wavelength combiner WM being provided between the second port Q and the wavelength multiplexer/demultiplexer; and a switch being provided between the wavelength splitters $WD_i$ and the wavelength combiner WM and arranged in parallel to the wavelength multiplexer/demultiplexer, each of the wavelength splitters $WD_i$ coupling a corresponding one of the light beams $L_i$ or a corresponding one of the light beams $L'_i$ between a corresponding one of the ports $P_i$ and the wavelength multiplexer/demultiplexer, and coupling the light beam $L_{SP1}$ or $L'_{SP1}$ and the light beam $L_{SP2}$ or $L'_{SP2}$ between a corresponding one of the ports $P_i$ and the switch, the wavelength combiner WM coupling the light L or the light L' between the wavelength multiplexer/demultiplexer and the second port Q, and coupling the light beam $L_{SP1}$ or $L'_{SP1}$ and the light beam $L_{SP2}$ or $L'_{SP2}$ between the switch and the second port Q, the switch, under control from an external member, (A1) selecting a wavelength splitter corresponding to the first selected port $P_{S1}$ as the first selected wavelength splitter from among the wavelength splitters $WD_i$, and (A2) selecting a wavelength splitter corresponding to the second selected port $P_{S2}$ as the second selected wavelength splitter from among the wavelength splitters $WD_i$, and (B1) coupling the light beam $L_{SP1}$ or the light beam $L'_{SP1}$ between the first selected wavelength splitter and the wavelength combiner WM and (B2) coupling the light beam $L_{SP2}$ or the light beam $L'_{SP2}$ between the second selected wavelength splitter and the wavelength combiner WM.

The optical device configured as described above is one or more embodiments of the optical device which secures redundancy in case of the occurrence of an event in which two or more of the light beams $L_i$ are not inputted to corresponding two or more of the ports $P_i$.

Yet further, a wavelength division multiplexing transmitter in accordance with one or more embodiments of the present invention may include:

an optical device recited in the previously-described embodiments of the present invention;

modulators $M_i$ having respective input ports $PI_i$ (i=1, 2, ..., n) and respective output ports $PO_i$, wherein the output ports $PO_i$ are connected to corresponding ports $P_i$;

optical sources $OS_i$, connected to the corresponding input ports $PI_i$, being configured to output respective light beams $L_i$;

a spare optical source $OS_{SP}$ being configured to output a light beam $L_{SP}$; and a spare optical source switch, provided between the spare optical source $OS_{SP}$ and the input ports $PI_i$, being configured to select one input port as a selected input port from among the input ports $PI_i$ under control from an external member and input the light beam $L_{SP}$ to the selected input port.

Further, a wavelength division multiplexing receiver in accordance with one or more embodiments of the present invention may include:

an optical device recited in the previously-described embodiments of the present invention; and photodetectors $D_i$ having respective light receiving elements $D_{OPi}$ (i=1, 2, ..., n) coupled to corresponding ports $P_i$.

Still further, a wavelength division multiplexing transmission and receiving system in accordance with one or more embodiments of the present invention may include:

a wavelength division multiplexing transmitter recited in the previously-described embodiments of the present invention;

a wavelength division multiplexing receiver recited in the previously-described embodiments of the present invention; and an optical fiber connecting between a second port Q of the wavelength division multiplexing transmitter and a second port Q of the wavelength division multiplexing receiver.

The wavelength division multiplexing transmitter, wavelength division multiplexing receiver, and wavelength division multiplexing transmission and receiving system configured as described above produce the same effect as the effect produced by an optical device in accordance with one or more embodiments of the present invention.

The present invention is not limited to the previously-described embodiments, but can be altered by a skilled person in the art within the scope of the claims. The present invention also encompasses, in its technical scope, any embodiment derived by combining technical means disclosed in differing embodiments.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 1A, 2, 2A, 2B, 3, 4, 4A, 5, 5A: Optical device
11, 11A, 21, 21B, 31, 41, 51: Wavelength multiplexer/demultiplexer
$P_i$, $P_{n+1}$: Port
P: First port group
Q: Second port
$P_S$: Selected port
$WD_i$: Wavelength splitter
WM: Wavelength combiner
SW: Switch
$WSS_i$: Wavelength selective switch
22, 22A, 22B: Switch group
$B_M$: Main bus
$B_S$: Secondary bus
$WSM_i$: Wavelength selective combiner
TX: Wavelength division multiplexing transmitter
RX: Wavelength division multiplexing receiver
S: Wavelength division multiplexing transmission and receiving system

The invention claimed is:

1. An optical device according comprising:
a first port group P including n ports $P_i$ (i=1, 2, ...; n);
a second port Q;
a wavelength multiplexer/demultiplexer disposed between the first port group P and the second port Q;
wavelength splitters $WD_i$ (i=1, 2, ..., n) disposed between the corresponding ports $P_i$ and the wavelength multiplexer/demultiplexer;
a wavelength combiner WM disposed between the second port Q and the wavelength multiplexer/demultiplexer; and
a switch disposed between the wavelength splitters $WD_i$ and the wavelength combiner WM and arranged in parallel to the wavelength multiplexer/demultiplexer, wherein
the wavelength multiplexer/demultiplexer, in a case where light beams $L_i$ of predetermined different n wavelengths $\lambda_i$ (i=1, 2, ..., n) corresponding to the respective ports $P_i$ are inputted to the wavelength multiplexer/demultiplexer, combines the light beams $L_i$ into light L and outputs the light L to the second port Q,
the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$,
one port is selected as a selected port $P_S$ from among the ports $P_i$, in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, in a case where a light beam $L'_{SP}$ of the wavelength $\lambda_{SP}$ is inputted to the second port Q, the light beam $L'_{SP}$ is outputted to the selected port $P_S$, each of the wavelength splitters $WD_i$ couples a corresponding one of the light beams $L_i$ or a corresponding one of the light beams $L'_i$ between a corresponding one of the ports $P_i$ and the wavelength multiplexer/demultiplexer, and couples the light beam $L_{SP}$ or the light beam $L'_{SP}$ between a corresponding one of the ports $P_i$ and the switch, the wavelength combiner WM couples the light L or the light L' between the wavelength multiplexer/demultiplexer and the second port Q, and couples the light beam $L_{SP}$ or the light beam $L'_{SP}$ between the switch and the second port Q, and the switch, under control from an external member, selects a wavelength splitter corresponding to the selected port $P_S$ as a selected wavelength splitter from among the wavelength splitters $WD_i$, and couples the light beam $L_{SP}$ or the light beam $L'_{SP}$ between the selected wavelength splitter and the wavelength combiner WM.

2. The optical device according to claim 1, wherein the first port group P further comprises a port $P_{n+1}$ in parallel to the ports $P_i$ and connected directly to the wavelength multiplexer/demultiplexer, the wavelength combiner WM is a wavelength selective switch, the wavelength multiplexer/demultiplexer, in a case where the light beams $L_i$ (i=1, 2, . . . , n) are inputted to the corresponding ports $P_i$ (i=1, 2, . . . , n) and a light beam $L_{n+1}$ of a wavelength $\lambda_{n+1}$ different from the wavelengths $\lambda_i$ (i=1, 2, . . . , n) and $\lambda_{SP}$ is inputted to the port $P_{n+1}$, multiplexes the light beams $L_i$ (i=1, 2, . . . , n, n+1) to emit the light L and outputs the light L to the second port Q, and the wavelength multiplexer/demultiplexer, in a case where the light L' is inputted to the second port Q, demultiplexes the light L' to emit the light beams $L'_i$ (i=1, 2, . . . , n, n+1) of the wavelengths $\lambda i$ (i=1, 2, . . . , n, n+1) and outputs the light beams $L'_i$ to the corresponding ports $P_i$ (i=1, 2, . . . , n, n+1), the wavelength selective switch, in a case where one port is selected as the selected port $P_S$ from among the ports $P_i$ (i=1, 2, . . . , n, n+1), couples the light beams $L_i$ (i=1, 2, . . . , n, n+1) between the wavelength multiplexer/demultiplexer and the second port Q, the wavelength selective switch, in a case where one port is selected as the selected port $P_S$ from among the ports $P_i$ (i=1, 2, . . . , n), couples the light beam $L_{SP}$ or $L'_{SP}$ between the switch and the second port Q under control from the external member, and the wavelength selective switch, in a case where the port $P_{n+1}$ is selected as the selected port $P_S$, couples the light beam $L_{SP}$ or $L'_{SP}$ between the wavelength multiplexer/demultiplexer and the second port Q under control from an external member.

3. An optical device comprising:

a first port group P including n ports $P_i$ (i=1, 2, . . . ; n);

a second port Q;

a wavelength multiplexer/demultiplexer disposed between the first port group P and the second port Q; and a switch group disposed between the wavelength multiplexer/demultiplexer and the second port Q, wherein the wavelength multiplexer/demultiplexer, in a case where light beams $L_i$ of predetermined different n wavelengths $\lambda_i$ (i=1, 2, . . . , n) corresponding to the respective ports $P_i$ are inputted to the wavelength multiplexer/demultiplexer, combines the light beams $L_i$ into light L and outputs the light L to the second port Q, the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$, one port is selected as a selected port $P_S$ from among the ports $P_i$, in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, in a case where a light beam $L'_{SP}$ of the wavelength $\lambda_{SP}$ is inputted to the second port Q, the light beam $L'_{SP}$ is outputted to the selected port $P_S$, the wavelength multiplexer/demultiplexer comprises n ports $p_i$ (i=1, 2, . . . , n) connected directly to the ports $P_i$ (i=1, 2, . . . , n) and n ports $q_i$ (i=1, 2, . . . , n) connected to the second port Q via the switch group, the wavelength multiplexer/demultiplexer, in a case where the light beams $L_i$ are inputted to the corresponding ports $P_i$, multiplexes the light beams $L_i$ to emit the light L and couples the light L to a predetermined port $q_O$ of the ports $q_i$, the wavelength multiplexer/demultiplexer, in a case where the light L' is inputted to the port $q_O$, demultiplexes the light L' to emit the light beams $L'_i$ of the wavelengths $\lambda_i$ and outputs the light beams $L'_i$ to the corresponding ports $P_i$, and the wavelength multiplexer/demultiplexer selectively couples the light beam $L_{SP}$ or $L'_{SP}$ between the ports $p_i$ and the ports $q_i$, and the switch group, under control from an external member, couples the light beam $L_{SP}$ or $L'_{SP}$ between one port $q_i$ (i is any of 1, 2, . . . , n) selectively coupled to the selected port $P_S$ and the second port Q.

4. An optical device comprising:

a first port group P including n ports $P_i$ (i=1, 2, . . . ; n);

a second port Q;

a wavelength multiplexer/demultiplexer disposed between the first port group P and the second port Q; and a switch group disposed between a port $P_j$ (j is any of 1, 2, . . . , n) that is one of the ports $P_i$ and the wavelength multiplexer/demultiplexer, wherein the wavelength multiplexer/demultiplexer, in a case where light beams $L_i$ of predetermined different n wavelengths $\lambda_i$ (i=1, 2, . . . , n) corresponding to the respective ports $P_i$ are inputted to the wavelength multiplexer/demultiplexer, combines the light beams $L_i$ into light L and outputs the light L to the second port Q, the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$, one port is selected as a selected port $P_S$ from among the ports $P_i$, in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, in a case where a light beam $L'_{SP}$ of the wavelength $\lambda_{SP}$ is inputted to the second port Q, the light beam $L'_{SP}$ is outputted to the selected port $P_S$, the wavelength multiplexer/demultiplexer comprises n ports $p_i$ (i=1, 2, . . . , n) connected directly or via the switch group to the ports $P_i$ (i=1, 2, . . . , n) and n ports $q_i$ (i=1, 2, . . . , n), the wavelength multiplexer/demultiplexer, in a case where the light beams $L_i$ are inputted to the corresponding ports $P_i$, multiplexes the light beams $L_i$ to emit the light L and couples the light L to a predetermined port $q_Q$ of the ports $q_i$, the wavelength multiplexer/demultiplexer, in a case where the light L' is inputted to the port $q_Q$, demultiplexes the light L' to emit the light beams $L'_i$ of the wavelengths $\lambda_i$ and outputs the light beams $L'_i$ to the corresponding ports $P_i$, and the wavelength multiplexer/demultiplexer selectively couples the light beam $L_{SP}$ or $L'_{SP}$ between the ports $p_i$ and the ports $q_i$ and couples the light beam $L_{SP}$ or $L'_{SP}$ between a port $p_j$, of the ports $p_i$, corresponding to the port $P_j$ and the port $q_Q$, and the switch group, under control from an external member, couples the light beam $L_{SP}$ or $L'_{SP}$ between one port $q_i$ (i is any of 1, 2, . . . , n) selectively coupled to the selected port $P_S$ and the port $p_j$.

5. An optical device comprising:
a first port group P including n ports $P_i$ (i=1, 2, . . . ; n);
a second port Q;
a wavelength multiplexer/demultiplexer disposed between the first port group P and the second port Q; and
n wavelength selective combiners $WSM_i$ (i=1, 2, . . . , n) that constitute the wavelength multiplexer/demultiplexer and that are inserted in series with a main bus having one end as the second port Q, wherein the wavelength multiplexer/demultiplexer, in a case where light beams $L_i$ of predetermined different n wavelengths $\lambda_i$ (i=1, 2, . . . , n) corresponding to the respective ports $P_i$ are inputted to the wavelength multiplexer/demultiplexer, combines the light beams $L_i$ into light L and outputs the light L to the second port Q, the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$, one port is selected as a selected port $P_S$ from among the ports $P_i$, in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, in a case where a light beam $L'_{SP}$ of the wavelength $\lambda_{SP}$ is inputted to the second port Q, the light beam $L'_{SP}$ is outputted to the selected port $P_S$, the ports $P_i$ (i=1, 2, . . . , n) are connected directly to the corresponding wavelength selective combiners $WSM_i$, each of the wavelength selective combiners $WSM_i$ is constituted by a combination of a corresponding one of wavelength combiners $WM_i$ (i=1, 2, . . . , n) and a corresponding one of wavelength selective switches $WSS_i$ (i=1, 2, . . . , n), in a case where the light beams $L_i$ are inputted to the corresponding ports $P_i$, the wavelength combiners $WM_i$ couple the light beams $L_i$ to the main bus so that the wavelength multiplexer/demultiplexer emits the light L into which the light beams $L_i$ are multiplexed and outputs the light L to the second port Q, in a case where the light L' is inputted to the second port Q, the wavelength combiners $WM_i$ separate the light L' into light beams $L'_i$ so that the wavelength multiplexer/demultiplexer emits the light beams $L'_i$ into which the light L' is demultiplexed and outputs the light beams $L'_i$ to the corresponding ports $P_i$, and one of the wavelength selective switches $WSS_i$ (i is any of 1, 2, . . . , n) corresponding to the selected port $P_S$ couples the light beam $L_{SP}$ or $L'_{SP}$ between the selected port $P_S$ and the main bus under control from an external member.

6. An optical device comprising:
a first port group P including n ports $P_i$ (i=1, 2, . . . ; n);
a second port Q;
a wavelength multiplexer/demultiplexer disposed between the first port group P and the second port Q,
n wavelength combiners $WM_i$ (i=1, 2, . . . , n) that constitute the wavelength multiplexer/demultiplexer and that are inserted in series with a main bus having one end as the second port Q; and
wavelength selective switches $WSS_i$ (i=1, 2, . . . , n) connected to the corresponding wavelength combiners $WM_i$ (i=1, 2, . . . , n) are inserted in series with a secondary bus in parallel to the main bus, wherein the wavelength multiplexer/demultiplexer, in a case where light beams $L_i$ of predetermined different n wavelengths $\lambda_i$ (i=1, 2, . . . , n) corresponding to the respective ports $P_i$ are inputted to the wavelength multiplexer/demultiplexer, combines the light beams $L_i$ into light L and outputs the light L to the second port Q, the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$, one port is selected as a selected port $P_S$ from among the ports $P_i$, in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, in a case where a light beam $L'_{SP}$ of the wavelength $\lambda_{SP}$ is inputted to the second port Q, the light beam $L'_{SP}$ is outputted to the selected port $P_S$, the secondary bus has a first end connected to a preceding stage or a subsequent stage of the wavelength multiplexer/demultiplexer when viewed from a second port Q side, the ports $P_i$ are connected directly to the corresponding wavelength combiners $WM_i$, each of the wavelength combiners $WM_i$ couples a corresponding one of the light beams $L_i$ or $L'_i$ between a corresponding one of the ports $P_i$ and the main bus and couples the light beam $L_{SP}$ or $L'_{SP}$ between a corresponding one of the ports $P_i$ and a corresponding one of the wavelength selective switches $WSS_i$, each of the wavelength selective switches $WSS_i$, when selected under control from an external member, couples the light beam $L_{SP}$ or $L'_{SP}$ between a corresponding one of the wavelength combiners $WM_i$ and the secondary bus, the wavelength multiplexer/demultiplexer is configured such that:
  in a case where the light beams $L_i$ are inputted to the corresponding ports $P_i$, the wavelength combiners $WM_i$ couple the light beams $L_i$ to the main bus so that the wavelength multiplexer/demultiplexer emits the light L into which the light beams $L_i$ are multiplexed and outputs the light L to the second port Q; and
  in a case where the light L' is inputted to the second port Q, the wavelength combiners $WM_i$ separate the light L' into light beams $L'_i$ so that the wavelength multiplexer/demultiplexer emits the light beams $L'_i$ into which the light L' is demultiplexed and outputs the light beams $L'_i$ to the corresponding ports $P_i$, and one of the wavelength selective switches $WSS_i$ (i is any of 1, 2, . . . , n) connected to a corresponding one of the wavelength combiners $WM_i$ (i is any of 1, 2, . . . , n) corresponding to the selected port $P_S$ couples the light beam $L_{SP}$ or $L'_{SP}$ between the corresponding one of the wavelength combiners $WM_i$ and the secondary bus under control from an external member.

7. The optical device according to claim 6, wherein
the first end of the secondary bus is connected directly to the subsequent stage of the wavelength multiplexer/demultiplexer when viewed from the second port Q side, and
the wavelength multiplexer/demultiplexer couples the light beam $L_{SP}$ or $L'_{SP}$ between the first end of the secondary bus and the second port Q.

8. The optical device according to claim 6, further comprising another wavelength combiner disposed between the wavelength multiplexer/demultiplexer and the second port Q,
wherein the first end of the secondary bus is connected, via the another wavelength combiner, to the preceding stage of the wavelength multiplexer/demultiplexer when viewed from the second port Q side, and
the another wavelength combiner couples the light beams $L_i$ between the wavelength multiplexer/demultiplexer and the second port Q and couples the light beam $L_{SP}$ or $L'_{SP}$ between the secondary bus and the second port Q.

9. An optical device comprising:
a first port group P including n ports $P_i$ (i=1, 2, . . . ; n);
a second port Q; and
a wavelength multiplexer/demultiplexer disposed between the first port group P and the second port Q, wherein
the wavelength multiplexer/demultiplexer, in a case where light beams $L_i$ of predetermined different n wavelengths $\lambda_i$ (i=1, 2, . . . , n) corresponding to the respective ports $P_i$ are inputted to the wavelength multiplexer/demultiplexer, combines the light beams $L_i$ into light L and outputs the light L to the second port Q,
the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$, one port is selected as a selected port $P_S$ from among the ports $P_i$,
in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, and
in a case where a light beam $L'_{SP}$ of the wavelength $\lambda_{SP}$ is inputted to the second port Q, the light beam $L'_{SP}$ is outputted to the selected port $P_S$,
the selected port $P_S$ is a first selected port $P_{S1}$,
the wavelength $\lambda_{SP}$ is a wavelength $\lambda_{SP1}$,
the light beam $L_{SP}$ of the wavelength $\lambda_{SP}$ is a light beam $L_{SP1}$,
each of m ports (m is an integer that satisfies 1≤m<n) selected from among the ports $P_i$ and different from the first selected port $P_{S1}$ is a j-th selected port $P_{Sj}$ (j=2, 3, . . . , m+1),
light beams of different wavelengths $\lambda_{SPj}$ different from the wavelengths $\lambda_i$ and $\lambda_{SP1}$ are light beams $L_{SPj}$ and $L'_{SPj}$,
in a case where the light beam $L_{SPj}$ is inputted to the j-th selected port $P_{Sj}$, the light beam $L_{SPj}$ is outputted to the second port Q, and
in a case where the light beam $L'_{SPj}$ is inputted to the second port Q, the light beam $L'_{SPj}$ is outputted to the j-th selected port $P_{Sj}$.

10. The optical device according to claim 9, further comprising:
first wavelength splitters $WD_{1i}$ (i=1, 2, . . . , n) disposed between the corresponding ports $P_i$ and the wavelength multiplexer/demultiplexer;
second wavelength splitters $WD_{2i}$ (i=1, 2, . . . , n) disposed between the corresponding ports $P_i$ and the wavelength multiplexer/demultiplexer;
a first wavelength combiner $WM_a$ disposed between the second port Q and the wavelength multiplexer/demultiplexer;
a second wavelength combiner $WM_b$ disposed between the second port Q and the wavelength multiplexer/demultiplexer;
a first switch disposed between the first wavelength splitters $WD_{1i}$ and the first wavelength combiners $WM_a$ and arranged in parallel to the wavelength multiplexer/demultiplexer; and
a second switch disposed between the second wavelength splitters $WD_{2i}$ and the second wavelength combiner $WM_b$ and arranged in parallel to the wavelength multiplexer/demultiplexer,
wherein each of the first wavelength splitters $WD_{1i}$ couples a corresponding one of the light beams $L_i$ or a corresponding one of the light beams $L'_i$ between a corresponding one of the ports $P_i$ and the wavelength multiplexer/demultiplexer, and couples a light beam $L_{SP1}$ or a light beam $L'_{SP1}$ between a corresponding one of the ports $P_i$ and the first switch,
each of the second wavelength splitters $WD_{2i}$ couples a corresponding one of the light beams $L_i$ or a corresponding one of the light beams $L'_i$ between a corresponding one of the ports $P_i$ and the wavelength multiplexer/demultiplexer, and couples a light beam $L_{SP2}$ or a light beam $L'_{SP2}$ between a corresponding one of the ports $P_i$ and the second switch,
the first wavelength combiner $WM_a$ couples the light beams $L_i$ or the light beams $L'_i$ between the wavelength multiplexer/demultiplexer and the second port Q, and couples the light beam $L_{SP1}$ or the light beam $L'_{SP1}$ between the first switch and the second port Q, the second wavelength combiner $WM_b$ couples the light beams $L_i$ or the light beams $L'_i$ between the wavelength multiplexer/demultiplexer and the second port Q, and couples the light beam $L_{SP2}$ or the light beam $L'_{SP2}$ between the second switch and the second port Q, the first switch, under control from an external member, selects a wavelength splitter corresponding to the first selected port $P_{S1}$ as the first selected wavelength splitter from among the first wavelength splitters $WD_{1i}$, and couples the light beam $L_{SP1}$ or $L'_{SP1}$ between the first selected wavelength splitter and the first wavelength combiner $WM_a$, and the second switch, under control from an external member, selects a wavelength splitter corresponding to the second selected port $P_{S2}$ as the second selected wavelength splitter from among the second wavelength splitters $WD_{2i}$, and couples the light beam $L_{SP2}$ or $L'_{SP2}$ between the second selected wavelength splitter and the second wavelength combiner $WM_b$.

11. The optical device according to claim 9, further comprising:

wavelength splitters $WD_i$ (i=1, 2, . . . , n) disposed between the corresponding ports $P_i$ and the wavelength multiplexer/demultiplexer;

a wavelength combiner WM disposed between the second port Q and the wavelength multiplexer/demultiplexer; and a switch disposed between the wavelength splitters $WD_i$ and the wavelength combiner WM and arranged in parallel to the wavelength multiplexer/demultiplexer, wherein each of the wavelength splitters $WD_i$ couples a corresponding one of the light beams $L_i$ or a corresponding one of the light beams $L'_i$ between a corresponding one of the ports $P_i$ and the wavelength multiplexer/demultiplexer, and couples the light beam $L_{SP1}$ or $L'_{SP1}$ and the light beam $L_{SP2}$ or $L'_{SP2}$ between a corresponding one of the ports $P_i$ and the switch, the wavelength combiner WM couples the light L or the light L' between the wavelength multiplexer/demultiplexer and the second port Q, and couples the light beam $L_{SP1}$ or $L'_{SP1}$ and the light beam $L_{SP2}$ or $L'_{SP2}$ between the switch and the second port Q, and the switch, under control from an external member, selects a wavelength splitter corresponding to the first selected port $P_{S1}$ as the first selected wavelength splitter from among the wavelength splitters $WD_i$, selects a wavelength splitter corresponding to the second selected port $P_{S2}$ as the second selected wavelength splitter from among the wavelength splitters $WD_i$, couples the light beam $L_{SP1}$ or the light beam $L'_{SP1}$ between the first selected wavelength splitter and the wavelength combiner WM, and couples the light beam $L_{SP2}$ or the light beam $L'_{SP2}$ between the second selected wavelength splitter and the wavelength combiner WM.

12. A wavelength division multiplexing transmitter comprising:

an optical device that comprises:

a first port group P including n ports $P_i$ (i=1, 2, . . . ; n);

a second port Q; and a wavelength multiplexer/demultiplexer disposed between the first port group P and the second port Q, wherein the wavelength multiplexer/demultiplexer, in a case where light beams $L_i$ of predetermined different n wavelengths $\lambda_i$ (i=1, 2, . . . , n) corresponding to the respective ports $P_i$ are inputted to the wavelength multiplexer/demultiplexer, combines the light beams $L_i$ into light L and outputs the light L to the second port Q, the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$, one port is selected as a selected port $P_S$ from among the ports $P_i$, in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, and in a case where a light beam $L'_{SP}$ of the wavelength $\lambda_{SP}$ is inputted to the second port Q, the light beam $L'_{SP}$ is outputted to the selected port $P_S$;

modulators $M_i$ having respective input ports $PI_i$ (i=1, 2, . . . , n) and respective output ports $PO_i$, wherein the output ports $PO_i$ are connected to corresponding ports $P_i$;

optical sources $OS_i$ connected to the corresponding input ports $PI_i$ and that output respective light beams $L_i$;

a spare optical source $OS_{SP}$ that outputs a light beam $L_{SP}$; and a spare optical source switch disposed between the spare optical source $OS_{SP}$ and the input ports $PI_i$ and that selects one input port as a selected input port from among the input ports $PI_i$ under control from an external member and that inputs the light beam $L_{SP}$ to the selected input port.

13. A wavelength division multiplexing transmission and receiving system comprising:

a wavelength division multiplexing transmitter according to claim 12;

a wavelength division multiplexing receiver comprising:

an optical device comprising:

a first port group P including n ports $P_i$ (i=1, 2, . . . ; n);

a second port Q; and a wavelength multiplexer/demultiplexer disposed between the first port group P and the second port Q, wherein the wavelength multiplexer/demultiplexer, in a case where light beams $L_i$ of predetermined different n wavelengths $\lambda_i$ (i=1, 2, . . . , n) corresponding to the respective ports $P_i$ are inputted to the wavelength multiplexer/demultiplexer, combines the light beams $L_i$ into light L and outputs the light L to the second port Q, the wavelength multiplexer/demultiplexer, in a case where light L' is inputted to the second port Q, separates the light L' into light beams $L'_i$ of the wavelengths $\lambda_i$ and outputs the light beams $L'_i$ to the corresponding ports $P_i$, one port is selected as a selected port $P_S$ from among the ports $P_i$, in a case where a light beam $L_{SP}$ of a wavelength $\lambda_{SP}$ different from the wavelengths $\lambda_i$ is inputted to the selected port $P_S$, the light beam $L_{SP}$ is outputted to the second port Q, and in a case where a light beam $L'_{SP}$ of the wavelength $\lambda_{SP}$ is inputted to the second port Q, the light beam $L'_{SP}$ is outputted to the selected port $P_S$;

photodetectors $D_i$ that comprises respective light receiving elements $D_{OPi}$ (i=1, 2, . . . , n) coupled to corresponding ports $P_i$; and an optical fiber that connects between a second port Q of the wavelength division multiplexing transmitter and a second port Q of the wavelength division multiplexing receiver.

\* \* \* \* \*